United States Patent
Kim et al.

(10) Patent No.: US 10,683,644 B2
(45) Date of Patent: *Jun. 16, 2020

(54) SORPTION-BASED ATMOSPHERIC WATER HARVESTING DEVICE

(71) Applicants: The Regents of the University of California, Oakland, CA (US); Massachusetts Institute of Technology, Cambridge, MA (US)

(72) Inventors: Hyunho Kim, Cambridge, MA (US); Sungwoo Yang, Cambridge, MA (US); Sameer R. Rao, Colonie, NY (US); Shankar Narayanan, Cambridge, MA (US); Eugene A. Kapustin, Berkeley, CA (US); Hiroyasu Furukawa, Berkeley, CA (US); Ari S. Umans, Belmont, MA (US); Omar M. Yaghi, Berkeley, CA (US); Evelyn N. Wang, Cambridge, MA (US)

(73) Assignees: Massachusetts Institute of Technology, Cambridge, MA (US); The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,146

(22) Filed: Apr. 5, 2019

(65) Prior Publication Data

US 2019/0234053 A1    Aug. 1, 2019

Related U.S. Application Data

(63) Continuation of application No. 15/828,397, filed on Nov. 30, 2017.

(Continued)

(51) Int. Cl.
*E03B 3/28* (2006.01)
*C02F 1/28* (2006.01)
(Continued)

(52) U.S. Cl.
CPC .............. *E03B 3/28* (2013.01); *B01D 5/0003* (2013.01); *B01D 5/006* (2013.01); *B01D 5/0015* (2013.01);
(Continued)

(58) Field of Classification Search
CPC ...... E03B 3/28; C02F 1/14; C02F 1/28; C02F 1/288; C02F 2201/001; C02F 2201/32; B01D 5/0003; B01D 5/006; B01D 5/0015
See application file for complete search history.

(56) References Cited

U.S. PATENT DOCUMENTS

| | | | | |
|---|---|---|---|---|
| 2005/0044862 | A1* | 3/2005 | Vetrovec | B01D 5/0066 62/93 |
| 2009/0130411 | A1* | 5/2009 | Chang | B01J 20/02 428/219 |

* cited by examiner

*Primary Examiner* — Renee Robinson
(74) *Attorney, Agent, or Firm* — Richard Aron Osman

(57) ABSTRACT

A water-harvesting system can operate with a material that can take up and release water with minimum energy requirements and powered by low-grade energy sources, such as sunlight, in order to potentially allow its deployment into households, especially those located in sunny regions. A water-harvesting method and system can include vapor adsorption using a porous metal-organic framework. In certain embodiments, the porous metal-organic framework can include metal-organic framework in ambient air with low relative humidity, typical of the levels found in most dry regions of the world.

20 Claims, 40 Drawing Sheets

Related U.S. Application Data

(60) Provisional application No. 62/484,099, filed on Apr. 11, 2017, provisional application No. 62/436,543, filed on Dec. 20, 2016.

(51) Int. Cl.

| | |
|---|---|
| *B01D 5/00* | (2006.01) |
| *B01D 15/36* | (2006.01) |
| *B01J 20/22* | (2006.01) |
| *B01D 53/26* | (2006.01) |
| *B01J 20/20* | (2006.01) |
| *B01J 20/32* | (2006.01) |
| *B01J 20/10* | (2006.01) |
| *B01J 20/28* | (2006.01) |

(52) U.S. Cl.
CPC .......... *B01D 15/36* (2013.01); *B01D 53/261* (2013.01); *B01J 20/103* (2013.01); *B01J 20/20* (2013.01); *B01J 20/226* (2013.01); *B01J 20/28047* (2013.01); *B01J 20/3204* (2013.01); *B01J 20/324* (2013.01); *B01J 20/3236* (2013.01); *B01J 20/3238* (2013.01); *C02F 1/288* (2013.01); *B01D 2253/204* (2013.01); *B01D 2257/80* (2013.01); *B01D 2258/06* (2013.01); *B01D 2259/40098* (2013.01); *B01D 2259/80* (2013.01); *C02F 2201/001* (2013.01); *C02F 2201/32* (2013.01); *Y02A 20/109* (2018.01)

SORPTION-BASED ATMOSPHERIC WATER HARVESTING DEVICE

CLAIM OF PRIORITY

This application is a continuation of U.S. Ser. No. 15/828,397 filed Nov. 30, 2017, which claims the benefit of U.S. Ser. No. 62/484,099 filed on Apr. 11, 2017 and U.S. Ser. No. 62/436,543 filed on Dec. 20, 2016, each incorporated by reference in its entirety.

STATEMENT REGARDING FEDERALLY SPONSORED RESEARCH OR DEVELOPMENT

This invention was made with government support under Grant No. DE-AR0000185 awarded by the Department of Energy. The government has certain rights in this invention.

TECHNICAL FIELD

This invention relates to water-harvesting technology.

BACKGROUND

Two-thirds of the world's population is experiencing water shortages. See, M. M. Mekonnen, A. Y. Hoekstra, Four billion people facing severe water scarcity. Science Advances 2, e1500323 (2016), which is incorporated by reference in its entirety. The water vapor and droplets in the atmosphere, estimated to be around 13,000 trillion liters, is a natural resource that could address the global water problem. See, S. H. Schneider, Encyclopedia of climate and weather. (Oxford University Press, 1996), which is incorporated by reference in its entirety. Although there has been interest in dewing from moist air and fog capture, these processes require either frequent presence of 100% relative humidity (RH) or a large amount of energy, and are not viable solutions to the capture of water from air. See R. V. Wahlgren, Atmospheric water vapour processor designs for potable water production: a review. Water Research 35, 1 (2001), M. Muselli et al., Dew water collector for potable water in Ajaccio (*Corsica* Island, France). Atmospheric Research 64, 297 (2002), O. Clus, P. Ortega, M. Muselli, I. Milimouk, D. Beysens, Study of dew water collection in humid tropical islands. Journal of Hydrology 361, 159 (2008), A. Lee, M.-W. Moon, H. Lim, W.-D. Kim, H.-Y. Kim, Water harvest via dewing. Langmuir 28, 10183 (2012), R. S. Schemenauer, P. Cereceda, A proposed standard fog collector for use in high-elevation regions. Journal of Applied Meteorology 33, 1313 (1994), O. Klemm et al., Fog as a fresh-water resource: overview and perspectives. Ambio 41, 221 (2012), and K.-C. Park, S. S. Chhatre, S. Srinivasan, R. E. Cohen, G. H. McKinley, Optimal design of permeable fiber network structures for fog harvesting. Langmuir 29, 13269 (2013), each of which is incorporated by reference in its entirety. Atmospheric water exist is a resource equivalent to ~10% of all fresh water in lakes on earth. However, an efficient process for capturing and delivering water from air, especially at low humidity levels (down to 20%), have not been developed.

SUMMARY

In one aspect, a water-harvesting system can include an adsorbent layer including a material, and a condenser adjacent to the adsorbent layer.

In another aspect, a method of water-harvesting can include absorbing water from ambient atmosphere using a water-harvesting system comprising an adsorbent layer including a material, and a condenser adjacent to the adsorbent layer, applying energy to the water-harvesting system to desorb vapor, and collecting water with the condenser.

In another aspect, a method of making a water-harvesting system can include preparing an adsorbent layer including a material including a metal and an organic linker; infiltraining the material into a binder; adding a coating on the adsorbent layer; and including a condenser in the system adjacent to the adsorbent layer. In certain circumstances, the method can include housing the adsorbent layer and the condenser in an enclosure.

In certain circumstances, the adsorbent layer can include a binder. In certain circumstances, the binder can be porous. In certain circumstances, the material can be infiltrated in the binder. In certain circumstances, the binder can include copper.

In certain circumstances, the system can include a heatsink, for example a passive heatsick.

In certain circumstances, the system can include a coating on the adsorbent layer. In certain circumstances, the coating can be optically transparent and thermally insulating. In certain circumstances, the coating can be an aerogel. In certain circumstances, the coating can be absorptive for solar irradiation.

In certain circumstances, the system can include an enclosure containing the adsorbent layer and the condenser.

In certain circumstances, the material can include a metalorganic framework, a silica gel, a zeolite, a carbon fiber, a hydroscopic salt, or combinations thereof. For example, the material can include a porous metal-organic framework. In certain circumstances, the metal-organic framework can include zirconium (Zr). For example, the metal-organic framework can include MOF-801 ($Zr_6O_4(OH)_4$(fumarate)$_6$). In certain circumstances, the metal-organic framework can include cobalt (Co). In certain circumstances, the metal-organic framework can include $Co_2Cl_2BTDD$. In certain circumstances, a packing porosity of the metal-organic framework can be between 0.5 and 0.9, for example, between 0.6 to 0.8.

In certain circumstances, the system can be powered by solar irradiance.

In certain circumstances, the adsorbent layer can include a plurality of stacks.

In certain circumstances, the system can be powered by waste or biomass.

In another aspect, a method of water-harvesting can include absorbing water from ambient atmosphere using a water-harvesting system comprising an adsorbent layer including a material, and a condenser adjacent to the adsorbent layer, applying energy to the water-harvesting system to desorb vapor, and collecting water with the condenser.

In certain circumstances, the method can include dissipating heat from the condenser through a heat sink.

In certain circumstances, applying energy can include supplying solar irradiance, for example, to the adsorbent layer.

In certain circumstances, energy can be supplied by combustion of waste or biomass.

In certain circumstances, the enclosure can be opened during dark periods for water adsorption and the enclosure can be closed during light periods for water production. Alternatively, the adsorbent layer can be removed from the housing and replaced.

In certain circumstances, the vapor can diffuse from the adsorbent layer to the condenser following a concentration gradient.

In certain circumstances, the vapor can diffuse from the adsorbent layer to the condenser through buoyancy-assisted transport.

In certain circumstances, the condenser can be maintained at ambient temperature.

In certain circumstances, the ambient atmosphere can have a relative humidity of less than 30%.

Other aspects, embodiments, and features will be apparent from the following description, the drawings, and the claims.

BRIEF DESCRIPTION OF THE DRAWINGS

FIG. 1B shows water adsorption isotherms of Zr-based MOFs. FIG. 1C shows water adsorption isotherms of MOF-801. FIG. 1D shows a MOF water harvesting system. FIG. 1E shows $Zr_6O_4(OH)_4(-CO_2)_{12}$ secondary building units linked together with fumarates to form MOF-801.

FIG. 2A shows the image of MOF-801 layer and condenser. FIG. 2B shows schematic illustrates the vapor adsorption and desorption experiments carried out under isobaric conditions. FIG. 2C shows layer temperature and chamber vapor pressure as functions of time during the water harvesting cycle. FIG. 2D shows experimentally characterized water harvesting rate (L $kg^{-1}$ $s^{-1}$) and cumulative harvested water (L $kg^{-1}$) during desorption.

FIG. 4A shows the image of a water harvesting prototype with activated MOF-801 of weight of ~1.34 g and a packing porosity (ε) of ~0.85 with outer dimensions of 7 cm by 7 cm×4.5 cm. FIG. 4B shows formation and growth of droplets of water as a function of MOF temperatures ($T_{MOF}$) and time of day. FIG. 4C shows representative temperature profiles for MOF-801 layer, ambient air, condenser, and ambient dew point, and solar flux as functions of time of day.

FIG. 6A shows amount of harvested water from the first five water harvesting cycles. FIG. 6B shows XRD patterns of MOF-801 before and after 10 adsorption-desorption cycles.

FIG. 7A shows dynamic adsorption-desorption behavior of MOF-801 over 80 cycles. FIG. 7B shows water uptake as a function of cycle number.

FIG. 8A shows characteristic void size as a function of packed adsorbent porosity and adsorbent crystal radius. FIG. 8B shows effective intercrystalline diffusivities of vapor as functions of porosity and temperature estimated for MOF-801, crystal diameter of ~0.6 μm, at atmospheric pressure.

FIG. 11C shows estimated intracrystalline diffusivities using Eqn (12) as functions of relative humidity and temperature.

FIG. 12A shows porosity, ε, of 0.9 with layer thickness of 3, 5, 10 mm, FIG. 12B shows ε of 0.7 with layer thickness of 1, 3, 5 mm.

FIG. 13A shows illustrative schematic of the water harvesting device undergoing adsorption (night-time, left half) and solar-assisted water production (day-time, right half) processes. FIG. 13B shows water adsorption isotherms of MOF-801 in kg $kg^{-1}$ (kg of water per kg of MOF-801) as a function of relative humidity (P $P_{sat}^{-1}$, vapor pressure over saturation pressure) at various temperatures.

FIG. 14A shows a photo of the device test apparatus during the solar-assisted water production with 1.8× optical concentration.

FIG. 14B shows a photo of the water harvesting device showing the MOF layer, condenser, and thermocouples through the view port.

FIGS. 15A-15B show representative temperature profiles and solar flux as a function of local time for representative non-concentrated and concentrated with 1.8× cycles, respectively.

FIGS. 15C-15D show representative photos illustrating droplet condensation on the copper plate condenser during water harvesting process as a function of local time for representative non-concentrated (cycle 2) and concentrated (cycle 5) cycles, respectively.

DETAILED DESCRIPTION

Figure 1A:
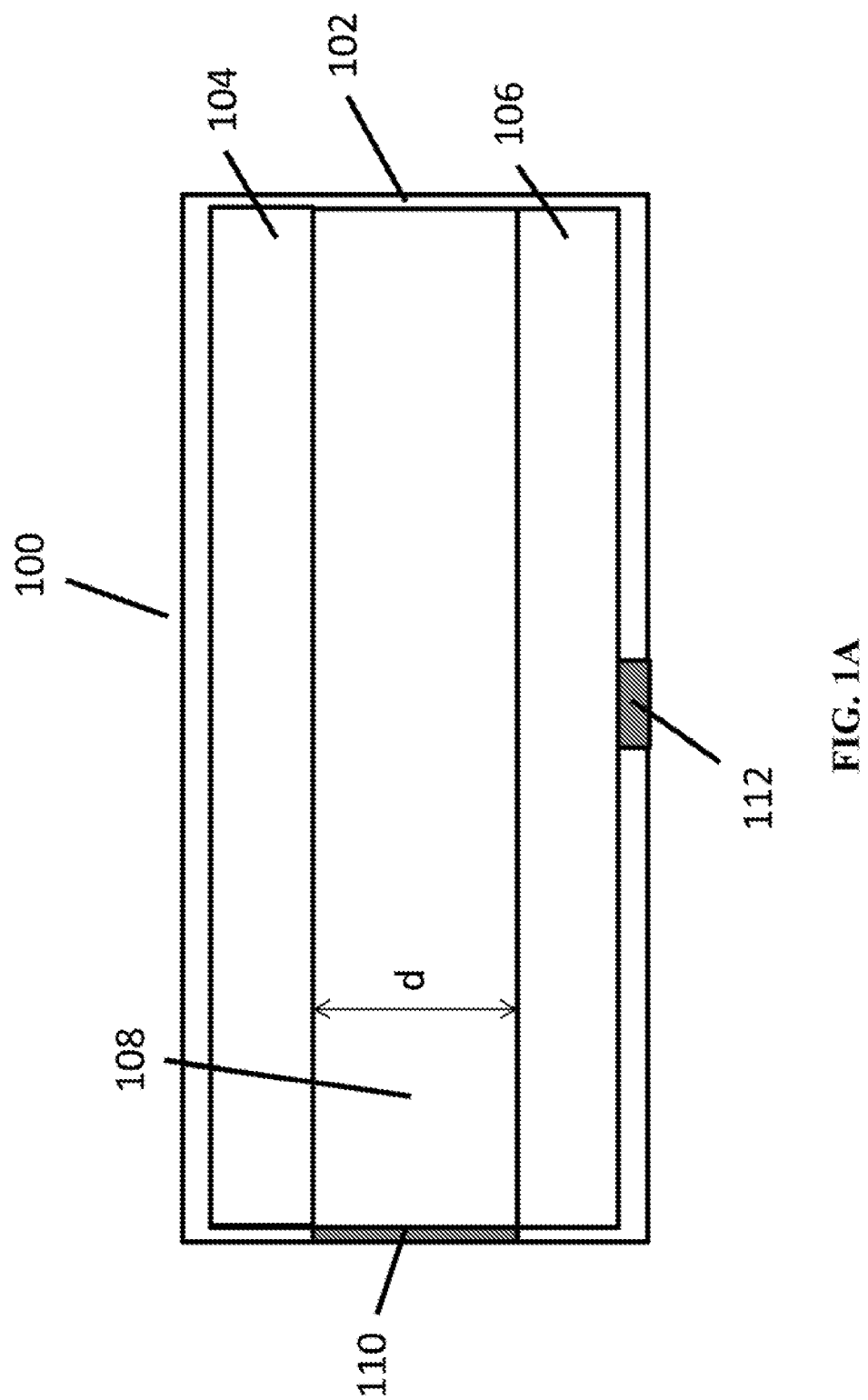
FIG. 1A shows a water-harvesting system.

Disclosed herein is a water-harvesting method and system that can operate with a material that can take up and release water with minimum energy requirements and powered by low-grade energy sources, such as sunlight, in order to potentially allow its deployment into households, especially those located in sunny regions. The system can include an adsorbent layer and a condenser. The adsorbent layer can include a material including a metal-organic framework, a silica gel, a zeolite, a carbon fiber, a hydroscopic salt, or combinations thereof. See H. Furukawa et al., Water adsorption in porous metal-organic frameworks and related materials. Journal of the American Chemical Society 136, 4369 (2014), Ji, J., Wang, R. & Li, L. New composite adsorbent for solar-driven fresh water production from the atmosphere. Desalination 212, 176-182 (2007), Wang, J., Liu, J., Wang, R. & Wang, L. Experimental investigation on two solar-driven sorption based devices to extract fresh water from atmosphere. Applied Thermal Engineering (2017), Gad, H., Hamed, A. & El-Sharkawy, I. Application of a solar desiccant/collector system for water recovery from atmospheric air. Renewable Energy 22, 541-556 (2001), Y. I. Aristov, "Challenging offers of material science for adsorption heat transformation: a review." Applied Thermal Engineering 50.2 (2013), Mitsubishi Plastics. Zeolitic Water Vapor Adsorbent: AQSOA. http://www.aaasaveenergy.com/products/001/pdf/AQSOA_1210 E.pdf (accessed 21 Nov. 2017). For example, an absorbent layer material can include a metal ion and an organic linker. Ideal sorbent characteristic for water harvesting from air is 1) high water uptake (e.g., greater than 0.3-0.5 kg of water per kg of adsorbent) and 2) steep increase in water uptake within narrow range of relative humidity conditions (stepwise isotherm) as shown in FIG. 1B. Relative humidity of stepwise adsorption isotherm needs to be higher than typical humidity available in a selected geographical region. Recent metal-organic frameworks exhibited ideal characteristic for water harvesting, see H. Furukawa et al., Water adsorption in porous metal-organic frameworks and related materials. Journal of the American Chemical Society 136, 4369 (2014). Recent zeolite have shown similar characteristic, see Mitsubishi Plastics. Zeolitic Water Vapor Adsorbent: AQSOA. http://www.aaasaveenergy.com/products/001/pdf/AQSOA_1210 E.pdf (accessed 21 Nov. 2017). 3) Optimum adsorbent packing density, and crystal diameter and density, that can lead to efficient vapor transport during adsorption and desorption. For example, large adsorbent crystal size (e.g., greater than ~10 micro-meter), crystal density (e.g., greater than 1400 kg m$^{-3}$) with sufficient intracrystalline vapor diffusivity (e.g., greater than $-1E-15$ m$_2$ s$^{-1}$), along with characteristics that satisfy criteria (1) and (2). In certain embodiments, the material can form a porous metal-organic framework. In certain embodiments, a method of water harvesting can include vapor adsorption using a porous metal-organic framework.

Figure 1B:
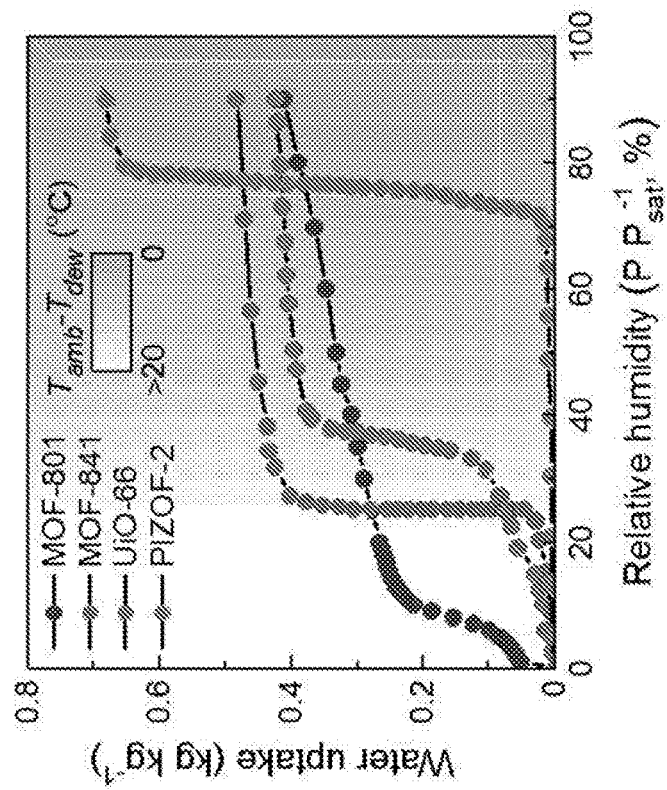
FIGS. 1B-1E show working principle of water harvesting with MOFs.

As exemplified in FIG. 1A, a water-harvesting system 100 can include an adsorbent layer 104 and a condenser 106. The adsorbent layer 104 and the condenser 106 can be contained in housing 102. Gas space 108, between adsorbent layer 104 and condenser 106, serves two roles during a water vapor adsorption cycle and a water vapor desorption cycle. During a water vapor adsorption cycle, gas space 108 contains water vapor, supplied from the ambient environment (i.e., the environment external to housing 102), that is adsorbed by the adsorbent layer. Access region 110 can be provide access of water vapor (for example, naturally-occurring water vapor in air) by allowing gas exchange between gas space 108 and the ambient environment, such as the atmosphere. Alternatively, simply exposing adsorbent layer 104 to air will be sufficient for vapor adsorption from air. That is taking out adsorbent layer 104 from the housing 102 for vapor adsorption from air and install back for desorption. For example, access region 110 can be a door that opens to the housing 102 or other opening. During a water vapor desorption cycle, access region 110 is closed to the ambient environment. Irradiation of adsorbent layer 104, for example, by sunlight, can cause the adsorbed water to be released from the adsorbent layer 104 into gas space 108. Condenser 106 then condenses the water vapor from gas space 108, creating liquid water that leaves housing 102 through outlet 112. Outlet 112 can be closed or open depending on timing of an adsorption/desorption cycle. Atmosphere can be actively exchanged, for example, with a fan, during an adsorption cycle or portions thereof.

Adsorbent layer 104 and condenser 106 can be separated by a distance d to create gas space 108. The distance d can be optimized on a basis of vapor transport between the adsorbent layer 104 and condenser 106 during desorption. Shorter d can be beneficial during vapor transport, however, simple geometric orientation, such as tilting of device configuration (FIG. 1A) can induce buoyancy transport of desorbed vapor and practical distance d can be chosen.

Housing 102 can be made from metal, plastic, glass, or combinations thereof. Condenser 106 can be made from a conductive metal, such as aluminum, steel, or copper. Housing 102 can be made from any material (e.g., glass, metal, plastic, or combinations thereof) that is reasonably stable at a prescribed temperature (e.g., ~100° C.). The solar absorber side of adsorbent layer 104 can be a conductive metal, such as aluminum, steel, or copper, that is coated with solar absorbing paint/spray (e.g., graphite coating or pyromark paint).

The adsorbent layer 104 can have an affinity to adsorb water vapor and can also absorb a portion of sunlight. In certain circumstances, the adsorbent layer is a metal-organic framework material (MOF). The MOF can be a network solid having a one-dimensional, two-dimensional, or three-dimensional character. The MOF can be based on one or more metal ions and a ligand. The ligand can have two or more metal ion binding sites. For example, the one-dimensional, two-dimensional, or three-dimensional character of the MOF leads to porosity that can alter the water vapor adsorption and desorption characteristics of the adsorbent layer. For example, the packing porosity of the metal-organic framework can be between 0.5 and 0.9. The metal ion can be zinc. The ligand can be a di-carboxylic acid or a tri-carboxylic acid, or combinations thereof. For example, the MOF can include $Zr_6O_4(OH)_4(fumarate)_6$, MOF-801. See H. Furukawa et al., Water adsorption in porous metal-organic frameworks and related materials. Journal of the American Chemical Society 136, 4369 (2014), which is incorporated by reference in its entirety. Several other examples of MOF include MOF-841, see H. Furukawa et al., Water adsorption in porous metal-organic frameworks and related materials. Journal of the American Chemical Society 136, 4369 (2014); $Co_2Cl_2BTDD$, see A. Rieth et al., "Record Atmospheric Fresh Water Capture and Heat Transfer with a Material Operating at the Water Uptake Reversibility Limit." ACS Central Science (2017); UiO-66, see J. H. Cavka et al., "A new zirconium inorganic building brick forming metal organic frameworks with exceptional stability." Journal of the American Chemical Society 130.42 (2008), each of which is incorporated by reference in its entirety.

The condenser 106 can be a finned heat sink that dissipates heat to ambient.

The timing of the water vapor desorption cycle and water vapor adsorption cycle can vary. For example, the water vapor desorption cycle can be during daylight hours and the water vapor adsorption cycle can be during nighttime hours. In this circumstance, the access region 110 can allow gas exchange between naturally-occurring water vapor in air or atmosphere surrounding the housing 102 by opening at or near sundown for the adsorption cycle. The access region 110 can then close for the desorption cycle at or near sunrise. As an alternative, the opening and closing of access region 110 can change based on the amount of sunlight impinging on a surface of the device. In this circumstance access region 110 may close during daylight hours if there is cloud cover that reduces the amount of sunlight contacting the adsorbent layer 104. In another embodiment, the timing of the cycle is independent of the time of day. In certain circumstances, the timing of the cycle can be irregular. In other circumstances, the timing of the cycle can be periodic on a daily or a semidaily basis. For example, the cycle can be 0.5 hour adsorption and 0.5 hour desorption—24 cycles per day, 1 hour adsorption and 1 hour desorption—12 cycles per day, or 2 hours adsorption and 2 hours desorption—6 cycles per day.

For example, in certain embodiments, the porous metal-organic framework can include microcrystalline powder MOF-801, $[Zr_6O_4(OH)_4(fumarate)_6]$ in ambient air with low RH, typical of the levels found in most dry regions of the world (down to RH of 20%). See, H. Furukawa et al., Water adsorption in porous metal-organic frameworks and related materials. Journal of the American Chemical Society 136, 4369 (2014), which is incorporated by reference in its entirety. Also disclosed herein is a device based on this MOF that can harvest and deliver water. In certain embodiments, the device can harvest and deliver water (2.8 L $kg^{-1}$ $day^{-1}$ at 20% RH) under a non-concentrated solar flux below 1 sun (1 kW $m^{-2}$), requiring no additional power input for producing water at ambient temperature outdoors.

Porous materials, such as zeolites, silica gels, and MOFs, can harvest water from air by adsorption over a wide range of humidity values. See, J. Canivet, A. Fateeva, Y. Guo, B. Coasne, D. Farrusseng, Water adsorption in MOFs: fundamentals and applications. Chemical Society Reviews 43, 5594 (2014), N. C. Burtch, H. Jasuja, K. S. Walton, Water stability and adsorption in metal-organic frameworks. Chemical Reviews 114, 10575 (2014), and C. Wang, X. Liu, N. K. Demir, J. P. Chen, K. Li, Applications of water stable metal-organic frameworks. Chemical Society Reviews 45, 5107 (2016), each of which is incorporated by reference in its entirety. However, these materials suffer from either low uptake of water or high energy consumption for its release. Although MOFs have already been considered in numerous applications, including gas storage, separation, and catalysis, heat pump, and dehumidification, the use of MOFs for water harvesting has only recently been proposed. See, J. Lee et al., Metal-organic framework materials as catalysts. Chemical Society Reviews 38, 1450 (2009), D. M. D'Alessandro, B. Smit, J. R. Long, Carbon dioxide capture: prospects for new materials. Angewandte Chemie International Edition 49, 6058 (2010), H.-C. Zhou, J. R. Long, O. M. Yaghi, Introduction to metal-organic frameworks. Chemical Reviews 112, 673 (2012), F. Jeremias, D. Frohlich, C. Janiak, S. K. Henninger, Water and methanol adsorption on MOFs for cycling heat transformation processes. New Journal of Chemistry 38, 1846 (2014), M. F. de Lange, K. J. Verouden, T. J. Vlugt, J. Gascon, F. Kapteijn, Adsorption-Driven Heat Pumps: The Potential of Metal-Organic Frameworks. Chemical Reviews 115, 12205 (2015), Y. K. Seo et al., Energy-Efficient Dehumidification over Hierachically Porous Metal-Organic Frameworks as Advanced Water Adsorbents. Advanced Materials 24, 806 (2012), and H. Furukawa et al., Water adsorption in porous metal-organic frameworks and related materials. Journal of the American Chemical Society 136, 4369 (2014), each of which is incorporated by reference in its entirety. The flexibility with which MOFs can be made and modified at the molecular level coupled to their ultra-high porosity make them ideally suited for overcoming the challenges mentioned above. See M. Eddaoudi et al., Systematic design of pore size and functionality in isoreticular MOFs and their application in methane storage. Science 295, 469 (2002), 0. M. Yaghi et al., Reticular synthesis and the design of new materials. Nature 423, 705 (2003), and H. Furukawa, K. E. Cordova, M. O'Keeffe, O. M. Yaghi, The chemistry and applications of metal-organic frameworks. Science 341, 1230444 (2013), each of which is incorporated by reference in its entirety.

A critical step is the release of water from the MOF, for which a low-grade heat driven vapor desorption process is applied. See I. Gur, K. Sawyer, R. Prasher, Searching for a better thermal battery. Science 335, 1454 (2012), and S. Chu, A. Majumdar, Opportunities and challenges for a sustainable energy future. Nature 488, 294 (2012), each of which is incorporated by reference in its entirety. Solar energy is particularly promising because sunlight is often abundant in arid regions with low RH (>7 kWh $m^{-2}$ $day^{-1}$, equivalent to 7 hours of 1 sun per day) where water resources are limited and where a natural diurnal temperature swing thermally assists the process (adsorption of water during the cooler night and release during the warmer day). This strategy is much more energy efficient compared to refrigeration-based dew harvesting systems because heat is directly used for desorption. The amount of water that can be harvested with MOFs can be much greater than dew harvesting systems, which become impractical at RHs<50%.

Figure 1C:
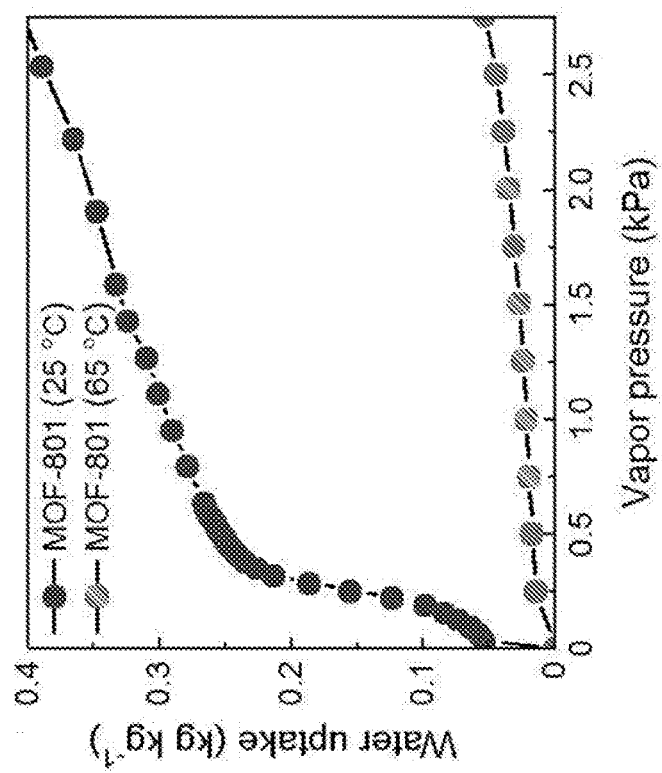
Figure 1E:
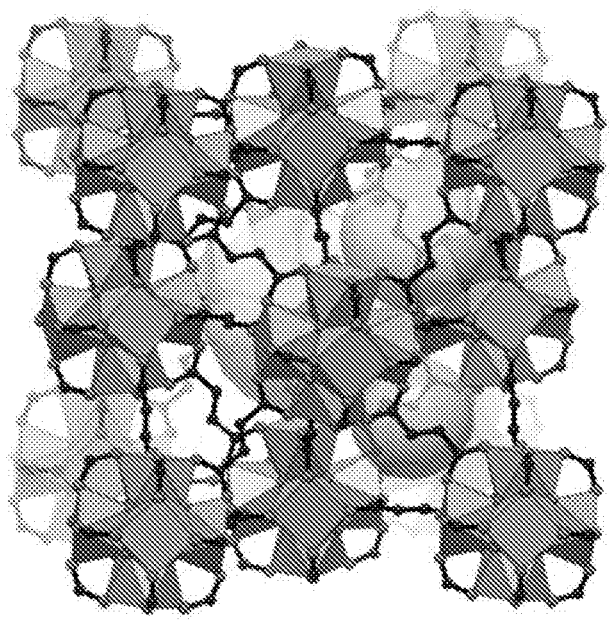
Figure 1D:
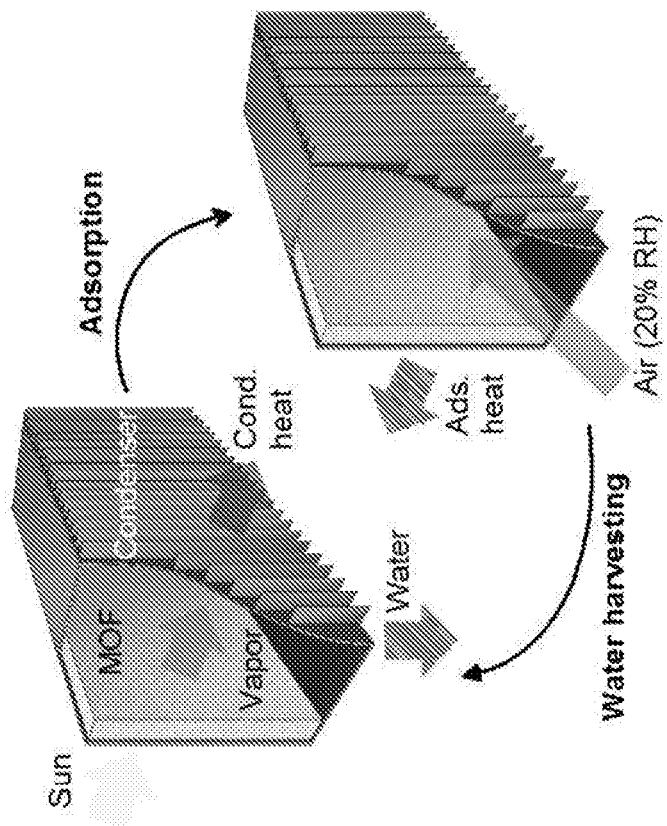

To harvest water using MOFs with maximum yield and minimal energy consumption, an isotherm with a steep increase in water uptake within a narrow range of RH is desired, which enables maximum regeneration with minimal temperature rise. Recent MOFs have exhibited such sorption characteristics (FIG. 1B). FIG. 1C shows water adsorption isotherms of Zr-based MOFs (MOF-801, MOF-841, UiO-66, and PIZOF-2) at 25° C., showing a rapid increase in adsorption capacities with a relatively small change in the relative humidity. See H. Furukawa et al., Water adsorption in porous metal-organic frameworks and related materials. Journal of the American Chemical Society 136, 4369 (2014), which is incorporated by reference in its entirety. The background color map shows the minimum temperature difference between the ambient air ($1_{amb}$) and the condenser ($T_{dew}$) required for dew collection with active cooling. In particular, MOF-801 is suitable for regions where RH is merely 20% (e.g., North Africa), and UiO-66 (see J. H. Cavka et al., A new zirconium inorganic building brick forming metal organic frameworks with exceptional stability. Journal of the American Chemical Society 130, 13850 (2008), which is incorporated by reference in its entirety) is suitable for regions with ~40% RH (e.g., Northern India). Water was harvest with MOF-801 and natural sunlight <1 sun in an environment at regeneration temperatures of ~65° C. Once water vapor adsorbed into the MOF, solar energy was used to release the adsorbate. Water was then harvested using a condenser maintained at temperatures near the surrounding environment. For MOF-801, a temperature swing between 25° C. and 65° C. can harvest over 0.25 L $kg^{-1}$ of water above 0.6 kPa vapor pressure (20% RH at 25° C. FIG. 1B). FIG. 1C shows water adsorption isotherms of MOF-801, measured at 25° and 65° C., illustrating that the temperature swing can harvest greater than 0.25 L $kg^{-1}$ of water above 0.6 kPa vapor pressure (20% RH at 25° C.). FIG. 1D shows a MOF water harvesting system, composed of a MOF layer and a condenser, undergoing solar-assisted water harvesting and adsorption processes. During water harvesting (left), the desorbed vapor is condensed at the ambient temperature and delivered via a passive heat sink, requiring no additional energy input. During water capture, the vapor is adsorbed on the MOF layer, rejecting the heat to the ambient (right). Ads. and Cond. represent adsorption and condensation, respectively. This water harvesting strategy is completely passive, relying only on the high water uptake capacity, low-grade heat requirement for desorption, and ambient to condense and collect the water (FIG. 1D).

MOF-801 has several advantages in that it has: (i) well-studied water adsorption behavior on a molecular level; (ii) good performance driven by aggregation of water molecules into clusters within the pores of the MOF; (iii) exceptional stability and recycling; and (iv) wide availability and low cost of its constituents. It is composed of 12-connected Zr-based clusters $Zr_6O_4(OH)_4(-COO)_{12}$ joined by fumarate linkers into a three-dimensional, extended porous framework of fcu topology. FIG. 1E shows $Zr_6O_4(OH)_4(-CO_2)_{12}$ secondary building units linked together with fumarates to form MOF-801. The large yellow, orange and green balls three different pores. Color code: black, C; red, O; blue polyhedra, Zr. The structure of MOF-801 contains three symmetrically independent cavities into which water molecules can be captured and concentrated (FIG. 1E).

The adsorption-desorption experiments were carried out for water harvesting with MOF-801 at 20% RH. A powder of MOF-801 was synthesized as reported (see H. Furukawa et al., Water adsorption in porous metal-organic frameworks and related materials. Journal of the American Chemical Society 136, 4369 (2014), which is incorporated by reference in its entirety) and then activated (solvent removal from the pores) by heating at 150° C. under vacuum for 24 hours. The powder was infiltrated into a porous copper foam with a thickness of 0.41 cm and porosity of ~0.95, brazed on a copper substrate, to create an adsorbent layer (5 cm by 5 cm by 0.41 cm) with 1.79 g of activated MOF-801 with an average packing porosity of ~0.85, with enhanced structural rigidity and thermal transport. This particular geometry with a high substrate area to thickness ratio was selected to reduce parasitic heat loss.

Experiments were performed in a RH-controlled environmental chamber interfaced with a solar simulator. The fabricated MOF-801 layer was placed in the chamber, and evacuated under high vacuum below 1 Pa at 90° C. Water vapor was then introduced inside the chamber to maintain a condition equivalent to a partial vapor pressure of 20% RH at 35° C., matching the step rise in water uptake for the MOF-801 (FIG. 1B). Vapor was adsorbed onto the sample surfaces by diffusion (FIG. 1B). Vapor adsorbed through the sample surface by diffusion. Desorption was achieved by applying an incident solar flux on an absorber with a solar absorptance of 0.91, and the desorbed vapor was condensed simultaneously in the condenser to harvest water. The condensation heat was monitored using a heat flux sensor (HFS) with active cooling through thermoelectric (TE) cooler. Ads. and Cond. represent adsorption and condensation, respectively. After saturation, the chamber was isolated from the vapor source. A solar flux (1 kW $m^{-2}$, AM1.5 spectrum) was introduced to the graphite coated substrate layer with a solar absorptance of 0.91 to desorb water from the MOF. This water was then collected via a condenser interfaced with a thermoelectric cooler which maintains the isobaric conditions of ~1.2 kPa (20% RH at 35° C., saturation temperature of ~10° C.). By maintaining the isobaric condition, all of the desorbed vapor was condensed and harvested by the condenser. During desorption, the water harvesting rate (or vapor desorption rate) was continuously monitored with a heat flux sensor interfaced to the condenser. The environmental temperature above standard ambient temperature was necessary to perform the experiments above 1 kPa; otherwise, a much lower condenser temperature is needed (e.g., ~0.5° C. for 20% RH at 25° C.). Thermocouples were placed on both sides of the MOF-801 layer to monitor the dynamic temperature response.

Figure 2B:
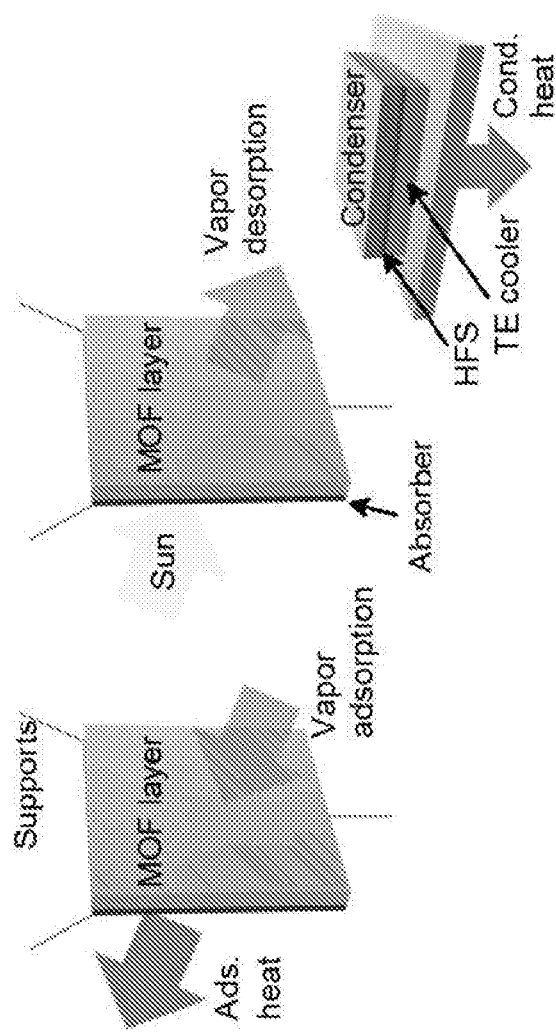
FIGS. 2A-2D show experimental characterization of harvested water from an adsorption-desorption cycle for MOF-801.
Figure 2A:
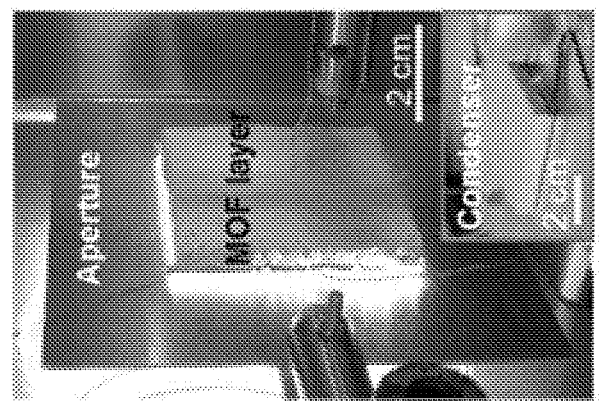
Figure 2D:
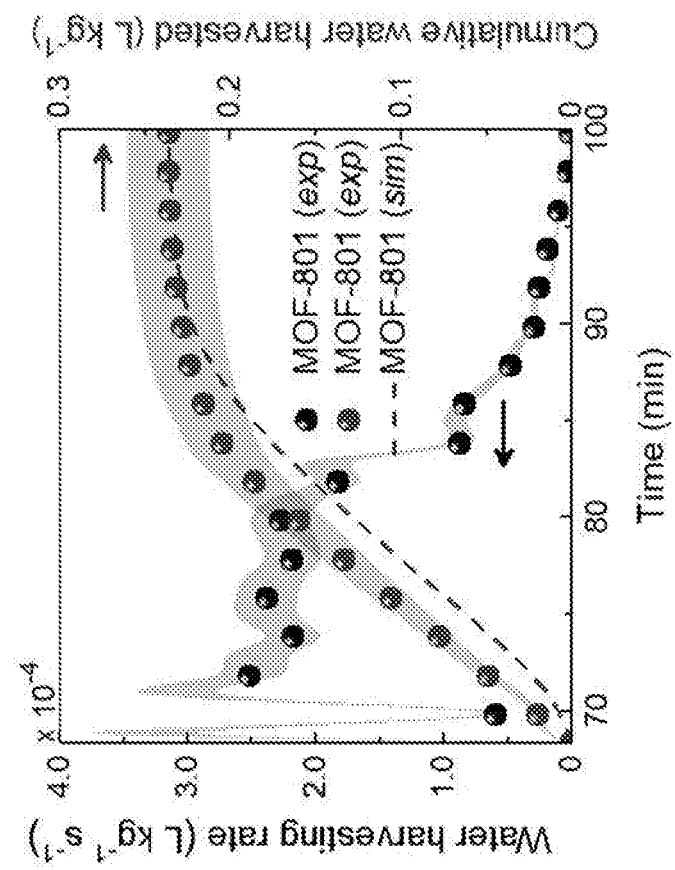
Figure 2C:
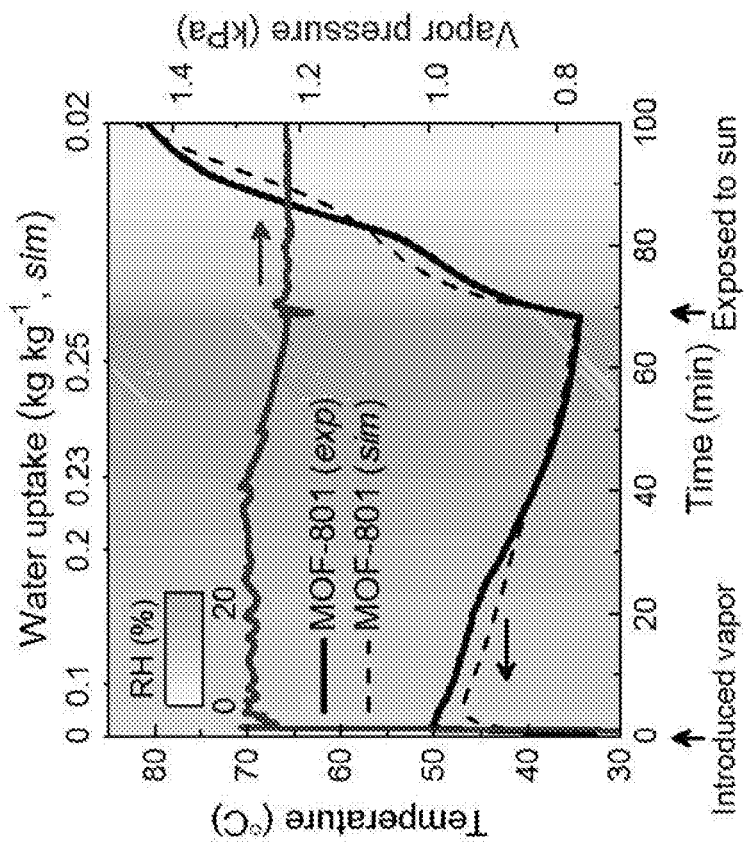
Figure 6A:
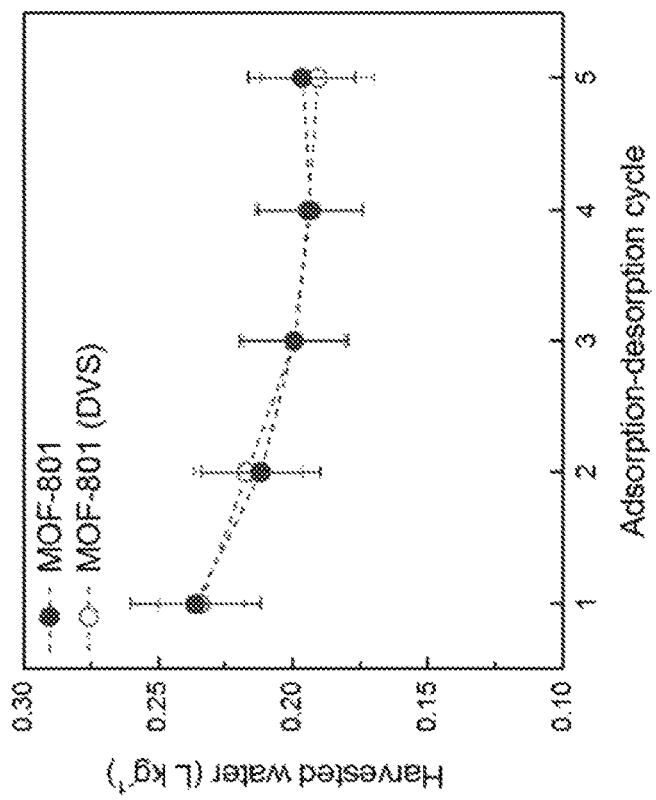
FIGS. 6A-6B show experimentally characterized harvested water from multiple water harvesting cycles using MOF-801.

FIG. 2C shows the temperature of the MOF-801 layer and pressure inside the chamber during the adsorption and solar-assisted desorption experiments. The background color map represents the estimated RH from the chamber pressure and the layer temperature, and the upper abscissa represents the predicted overall water uptake using the theoretical model as a function of time, lower abscissa. During adsorption, the temperature of the MOF-801 layer first rapidly increased because the exothermic adsorption process, and then slowly decreased as heat was lost to the surroundings. After ~70 min of adsorption, the MOF-801 temperature equilibrated with the surrounding vapor of ~35° C. At these given adsorption conditions, the predicted water uptake, or potential harvestable quantity of water, was estimated to be ~0.25 kg $H_2O$ $kg^{-1}$ MOF, as shown in the upper abscissa of FIG. 2C. For MOF-801, ~0.24 L kg$^{-1}$ of water was harvested per each water harvesting cycle (FIG. 2D), obtained by integrating the water harvesting rate. The shaded region represents the error based on uncertainties of the heat flux and MOF-801 weight measurements. The predicted temperature profile and cumulative water harvested are also included in FIG. 2C and FIG. 2D, showing good agreement. The activated MOF-801 weight is 1.79 g with a layer thickness of 0.41 cm and a packing porosity (ε) of ~0.85. Subscripts sim and exp denote simulated and experimental results, respectively. The experimental result was further confirmed with an adsorption analyzer under identical adsorption-desorption conditions (FIG. 6A). FIG. 6A shows amount of harvested water from the first five water harvesting cycles with a simulated solar flux of 1 kW m$^{-2}$ (blue circles). Amount of harvested water of powdered MOF-801 characterized with the adsorption analyzer at 35° C. and 1.2 kPa for adsorption, and 85° C. and 1.2 kPa for desorption (red circles) averaged over three different runs with error bar representing +/−SD.

Figure 9:
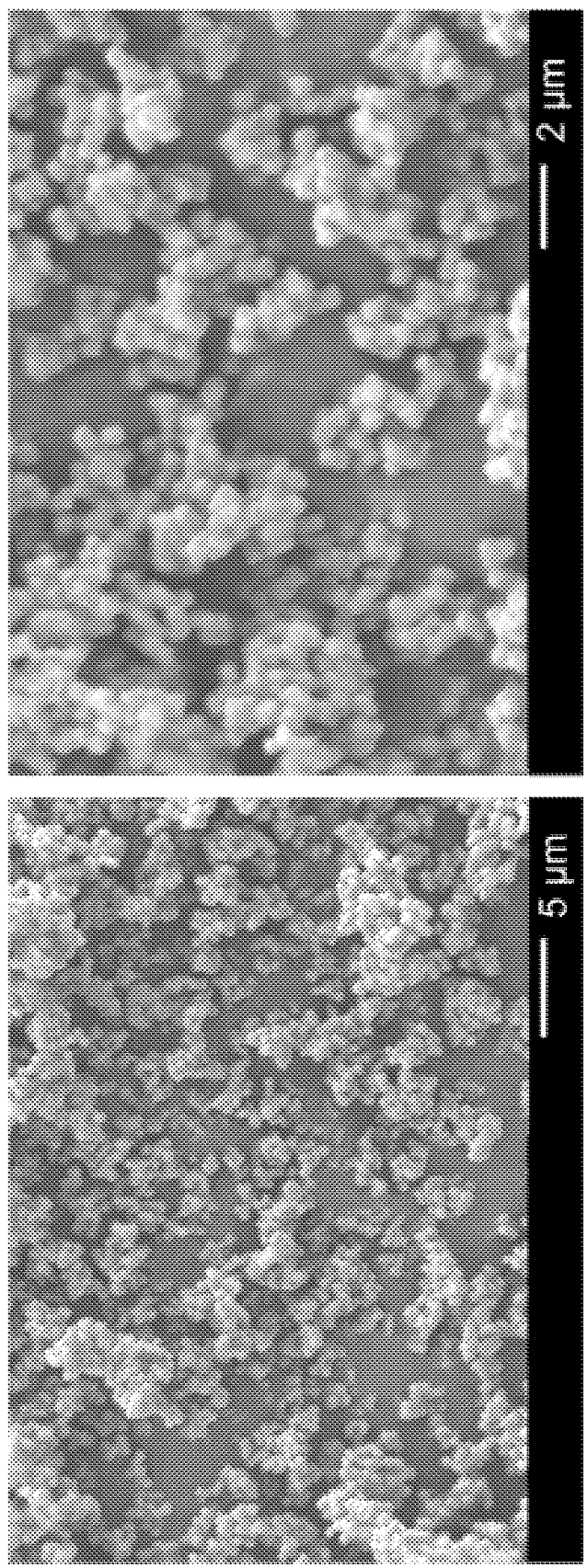
FIG. 9 shows SEM images of powdered MOF-801.

A theoretical model was developed to optimize the design of the water harvesting process with MOF-801, which was further validated with the experimental data. The model framework was based on mass and energy conservation incorporating adsorption dynamics parameters (see S. Narayanan, S. Yang, H. Kim, E. N. Wang, Optimization of adsorption processes for climate control and thermal energy storage. International Journal of Heat and Mass Transfer 77, 288 (2014), and S. Narayanan et al., A thermophysical battery for storage-based climate control. Applied Energy 189, 31 (2017), each of which is incorporated by reference in its entirety), and the analysis was carried out by using COMSOL Multiphysics. The inter- and intracrystalline vapor diffusion through the layer and within the crystals, as well as the thermal transport through the layer, were considered in the model. The theoretical model produced good agreement with the experimental data from the water-harvesting experiment (FIG. 2C). The water harvesting behavior was investigated under ambient air conditions by incorporating the diffusion and sorption characteristics of MOF-801 at ambient conditions into the theoretical model. A parametric study was performed, including varying the packing porosity (0.5, 0.7, and 0.9) and layer thickness (1, 3, 5, and 10 mm), and determined the time and amount of harvestable water using a solar flux of 1 sun (1 kW m$^{-2}$). By considering both the adsorption and desorption dynamics, a porosity of 0.7 was predicted to yield the largest quantity of water. At a porosity of ~0.5 or less, the adsorption kinetics is limited by Knudsen diffusion because the crystal diameter of MOF-801 is only ~0.6 μm (FIG. 9). The characteristic void spacing for Knudsen diffusion is a function of packing porosity and the crystal diameter. However, at higher porosities, a thicker MOF-801 layer is required to harvest a sufficient amount of water, but the time scale and transport resistance for intercrystalline diffusion also scales with the MOF layer thickness as $t \sim L_c^2/D_v$, where, t, $D_v$, and $L_c$ are the time scale, intercrystalline diffusivity, and characteristic length scale (i.e., layer thickness), respectively.

Figure 3:
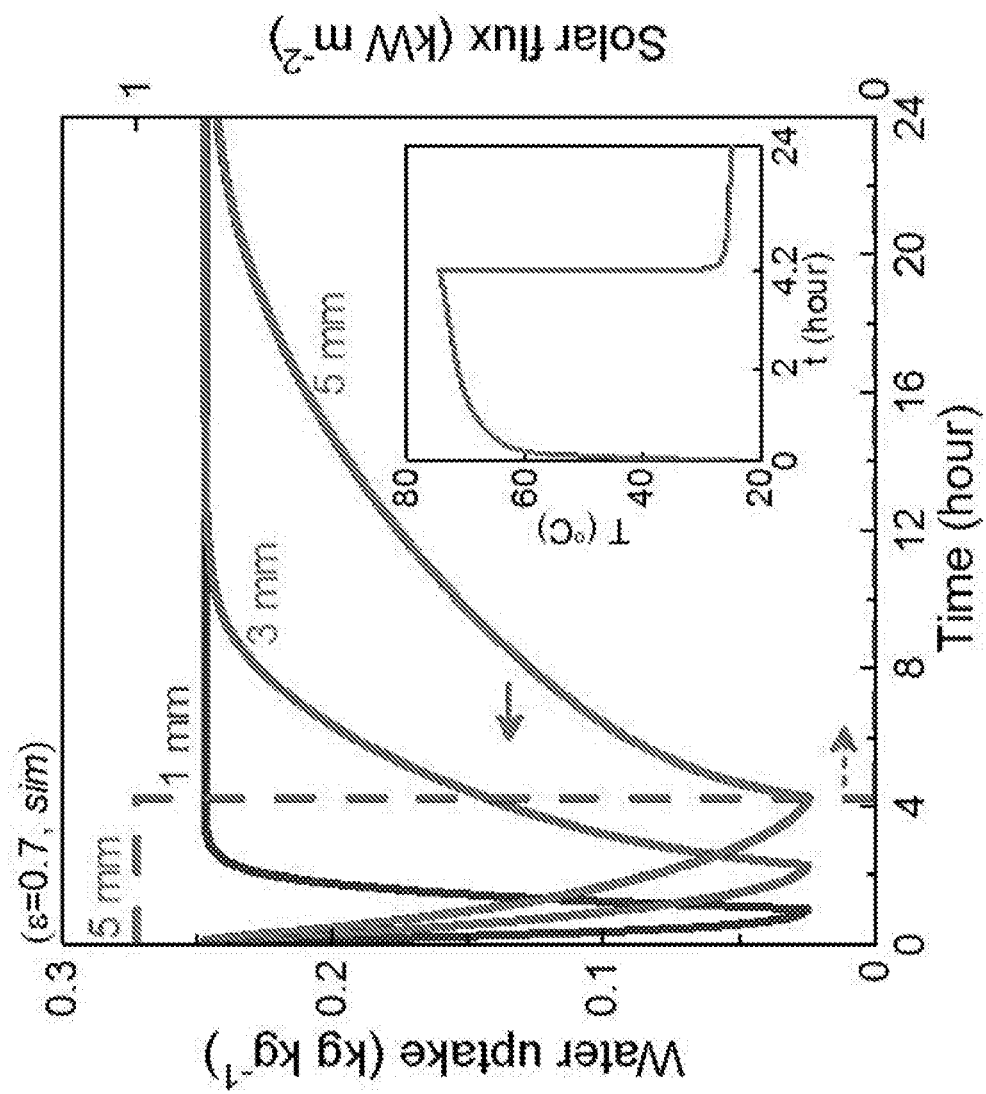
FIG. 3 shows adsorption-desorption dynamics of MOF-801 in ambient air with 1 sun flux.

Simulated adsorption-desorption dynamics for the MOF-801 layer of the optimized packing porosity of 0.7 are shown in FIG. 3 for 1 sun and realistic boundary conditions for heat loss (a natural heat transfer coefficient of 10 W m$^{-2}$ K$^{-1}$ and standard ambient temperature). Predicted adsorption-desorption dynamics with a packing porosity (ε) of 0.7, solar flux of 1 kW m$^{-2}$, and various thicknesses (1 to 5 mm). MOF-801 was initially equilibrated at 20% RH at 25° C. and the partial vapor pressure rapidly increased to 100% RH at 25° C. during desorption for vapor condensation. After desorption, the surrounding air-vapor mixture reverted to 20% RH. The duration of solar exposure for thicknesses of 1, 3, and 5 mm were 1, 2.3, and 4.2 hours, respectively. Note that only the duration of solar exposure for the 5-mm thick sample (red dotted line) is plotted for simplicity. The 1 mm, 3 mm, and 5 mm layers can harvest 0.08, 0.24, and 0.4 L m.sup.-2 of water per complete water harvesting cycle, respectively. More than 90% of the initially adsorbed water could be harvested under these conditions. Inset shows a predicted temperature profile of the 5 mm thick layer during the adsorption-desorption processes.

In this simulation, MOF-801 was initially equilibrated at 20% RH, and the vapor content in the air-vapor mixture that surrounds the layer during desorption increased rapidly from 20% RH to 100% RH at 25° C. This scenario is more realistic compared to the model experiment described above because water is harvested by a condenser at ambient temperature. Once solar irradiation was stopped, the air-vapor concentration reverted to 20% RH for vapor adsorption from ambient air, and the heat from the adsorption process was transferred to the surroundings. A detailed description of the boundary conditions and idealizations in the simulation are discussed in Section 8. First, water uptake decreased with time during solar heating and water condensation, and then increased through adsorption, as shown on the simulated water uptake profiles for the MOF-801 layer with a thickness of 1, 3, and 5 mm in FIGS. 4A-4C. The temperature correspondingly increased and then decreased with time. Continuously harvesting water in a cyclic manner for a 24-hour period with low-grade heat at 1 kW m$^{-2}$ can yield ~2.8 L kg$^{-1}$ day$^{-1}$ or ~0.9 L m$^{-2}$ day$^{-1}$ of water with a layer with 1 mm thickness. Alternatively, per one cycle, a 5 mm thick layer of MOF-801 can harvest ~0.4 L m$^{-2}$ of water. These findings indicate that MOFs with the enhanced sorption capacity and high intracrystalline diffusivity along with an optimized crystal diameter and density, and thickness of the MOF layer can boost the daily quantity of the harvested water from an arid environment.

Figures 4A, 4B:
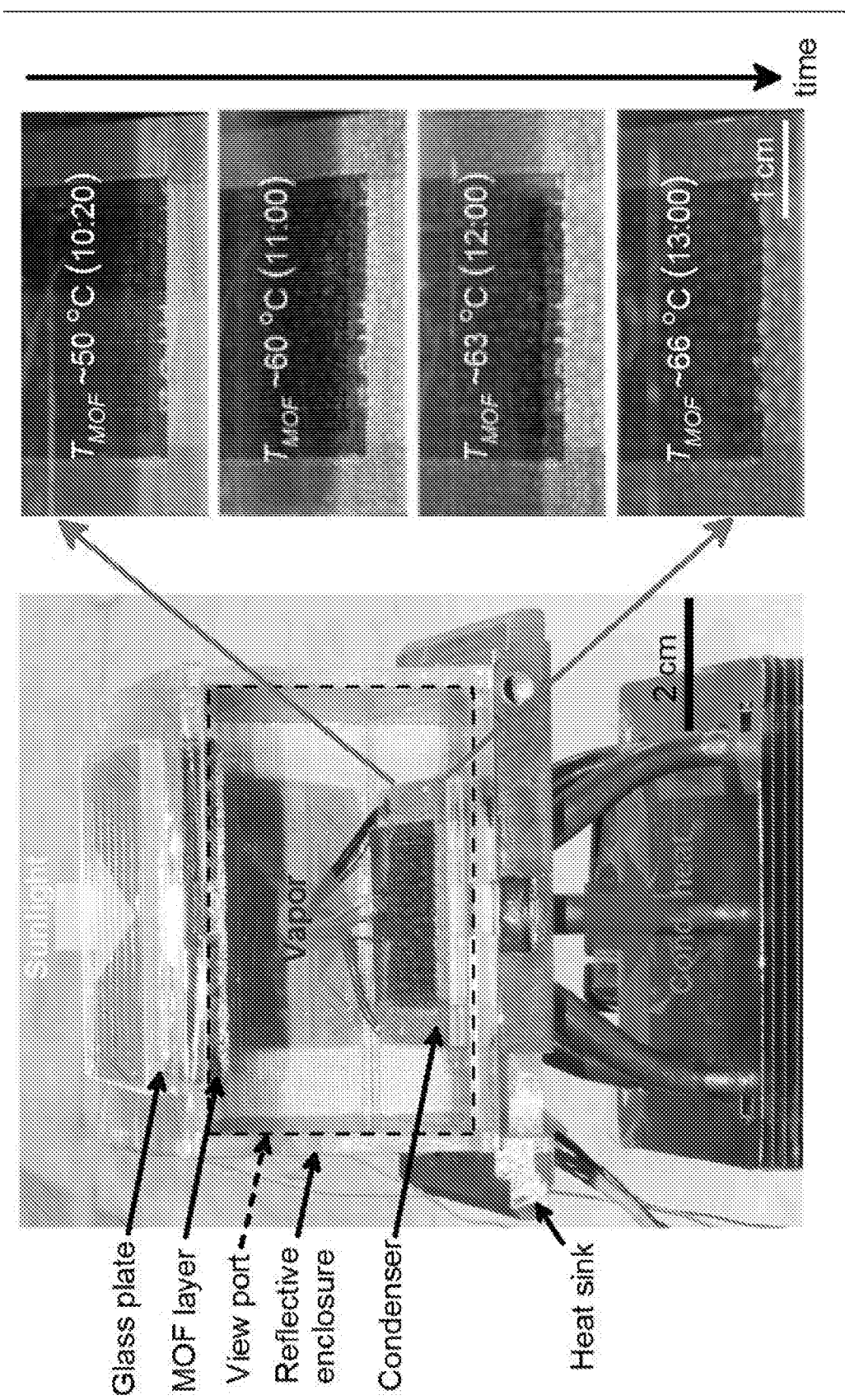
FIGS. 4A-4C show proof-of-concept water harvesting prototype.

Finally, a proof-of-concept MOF-801 water-harvesting prototype was built to demonstrate the viability of this approach outdoors (FIG. 4A). This prototype includes a MOF-801 layer (packing porosity of ~0.85 with outer dimensions of 7 cm by 7 cm×4.5 cm, 5 cm by 5 cm and 0.31 cm thick containing 1.34 g of activated MOF), an acrylic enclosure, and a condenser, which was tested on a roof at MIT. The spacing between the layer and condenser in the prototype was chosen to be large enough to enable ease of sample installation and visualization. The activated MOF-801 layer was left on the roof overnight for vapor adsorption from ambient air (day 1). The desorption process using natural sunlight was carried out on day 2 (ambient RH was ~65% at the start of experiment). For visualization purposes, a condenser was used with a temperature controller to maintain the temperature slightly below ambient, but above the dew point, to prevent vapor condensation on the inner walls of the enclosure. However, active cooling is not needed in a practical device since the hot desorbed vapor can condense at the cooler ambient temperature using a passive heat sink.

Figure 4C:
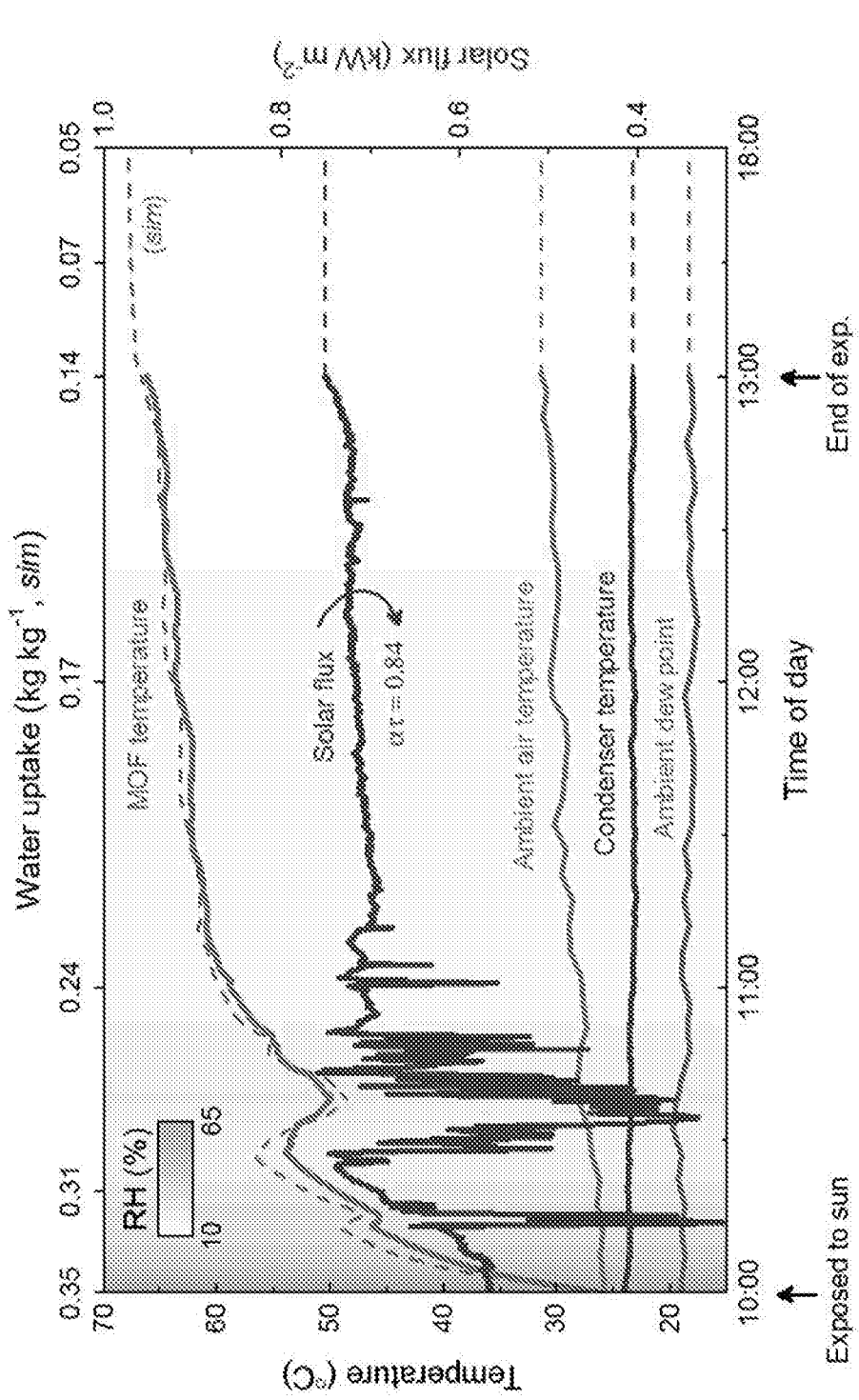

The formation, growth and multiplication of water droplets on the condenser with the change of the MOF layer temperature and time are shown in FIG. 4B. The temperature and solar flux (global horizontal irradiation) measurements during the solar-assisted desorption process revealed a rapid increase in the MOF-801 temperature accompanied with the relatively low solar fluxes (FIG. 4B). FIG. 4C shows representative temperature profiles for MOF-801 layer (experimental, red line; predicted, red dash), ambient air (grey line), condenser (blue line), and ambient dew point (green line), and solar flux (purple line) as functions of time of day (Sep. 14, 2016). The background color map represents the estimated RH from the condenser saturation pressure and the layer temperature, and the upper abscissa represents the predicted water uptake using the theoretical model as a function of time, lower abscissa. Because of losses from the absorber solar absorptance ($\alpha$, 0.91) and the glass plate solar transmittance ($\tau$, 0.92), 84% of the solar flux shown in FIG. 4C was used for desorption. The layer temperature and full water harvesting potential based on complete desorption was predicted using the solar flux and environmental conditions at the end of the experiment (dash lines). The fluctuations of the solar flux during time 10:20 to 11:00 were due to the presence of clouds. Subscripts sim and exp denote simulated and experimental results, respectively.

Figure 10B:
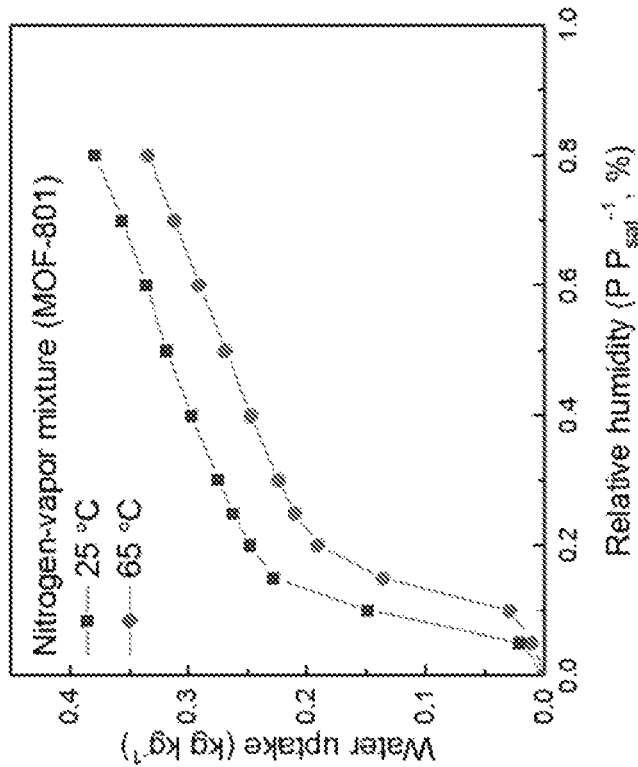
FIGS. 10A-10B show adsorption isotherms of MOF-801 measured in a pure vapor (FIG. 10A) and nitrogen-vapor mixture at atmospheric pressure at various temperatures (FIG. 10B).

Because water harvesting with vapor condensation is done with the presence of noncondensables (air), transport of desorbed vapor from the layer to the condenser surface is by diffusion. Using the experimentally measured solar flux and environmental conditions, and the theoretical model incorporating the vapor diffusion resistance between the layer and condenser, the MOF layer temperature and water uptake profiles are also predicted (FIG. 4C). The RHs based on the MOF layer temperature before and after the solar-assisted desorption are ~65% at 25° C. and ~10% at 66° C. and the corresponding equilibrium water uptakes under these conditions are ~0.35 kg kg$^{-1}$ and ~0.05 kg kg$^{-1}$, respectively, at a 23° C. condenser temperature (estimated from FIG. 10B). An amount of ~0.3 L kg$^{-1}$ of water can be potentially harvested by saturating the MOF layer with ambient air at a solar flux below one sun.

Because of the large spacing between the layer and condenser, and the orientation of the prototype, there is a delay in desorption. Therefore, to predict the prototype water harvesting potential under equilibrium conditions, the desorption time was extended for the simulation, results of which match the prediction from the isotherm (~0.3 L kg$^{-1}$, shown in the upper abscissa of FIG. 4C). In order to fully utilize the steep step of water uptake in the MOF-801 isotherm, a temperature difference of ~45° C. between the condenser and the layer is necessary to achieve desorption at 10% RH. For instance, if the initial RH was 20%, potentially ~0.2 L kg$^{-1}$ can be harvested with MOF-801, which is an order of magnitude greater than that for conventional adsorbents estimated from isotherms. See K. Ng et al., Experimental investigation of the silica gel-water adsorption isotherm characteristics. Applied Thermal Engineering 21, 1631 (2001), and H. Kim et al., Characterization of Adsorption Enthalpy of Novel Water-Stable Zeolites and Metal-Organic Frameworks. Scientific Reports 6, (2016), each of which is incorporated by reference in its entirety.

1. Synthesis of Microcrystalline Powder MOF-801

In a 4 L glass bottle, 72 g (0.62 mol) of fumaric acid (Fluka, 99%) and 200 g (0.62 mol) of ZrOCl$_2$.8H$_2$O (Alfa Aesar, 98%) were dissolved in a mixed solvent of DMF and formic acid (2 L and 700 mL, respectively). The mixture was then heated in an isothermal oven at 130° C. for 6 hours to give as-prepared MOF-801 as white precipitate. The precipitate was collected by filtration apparatus using a membrane filter (45 µm pore size), washed three times with 400 mL DMF, three times 400 mL methanol, and dried in air. Air-dried MOF sample was transferred to a vacuum chamber equipped with a magnetic stirring bar. The chamber was first evacuated at room temperature without stirring for 2 hours until the pressure dropped below 15 kPa. After that, with gentle stirring, the sample was further evacuated at room temperature for another 12 hours, heated in vacuum at 70° C. for 6 hours, and then at 150° C. for another 24 hours. This finally gave activated MOF-801 as a white powder (yield: 101 g). Further details can be found in a recent study. See H. Furukawa et al., Water adsorption in porous metal-organic frameworks and related materials. Journal of the American Chemical Society 136, 4369 (2014), which is incorporated by reference in its entirety.

2. Sample Fabrication and Experimental Methodology

Vacuum Chamber Experiment

Figure 5:
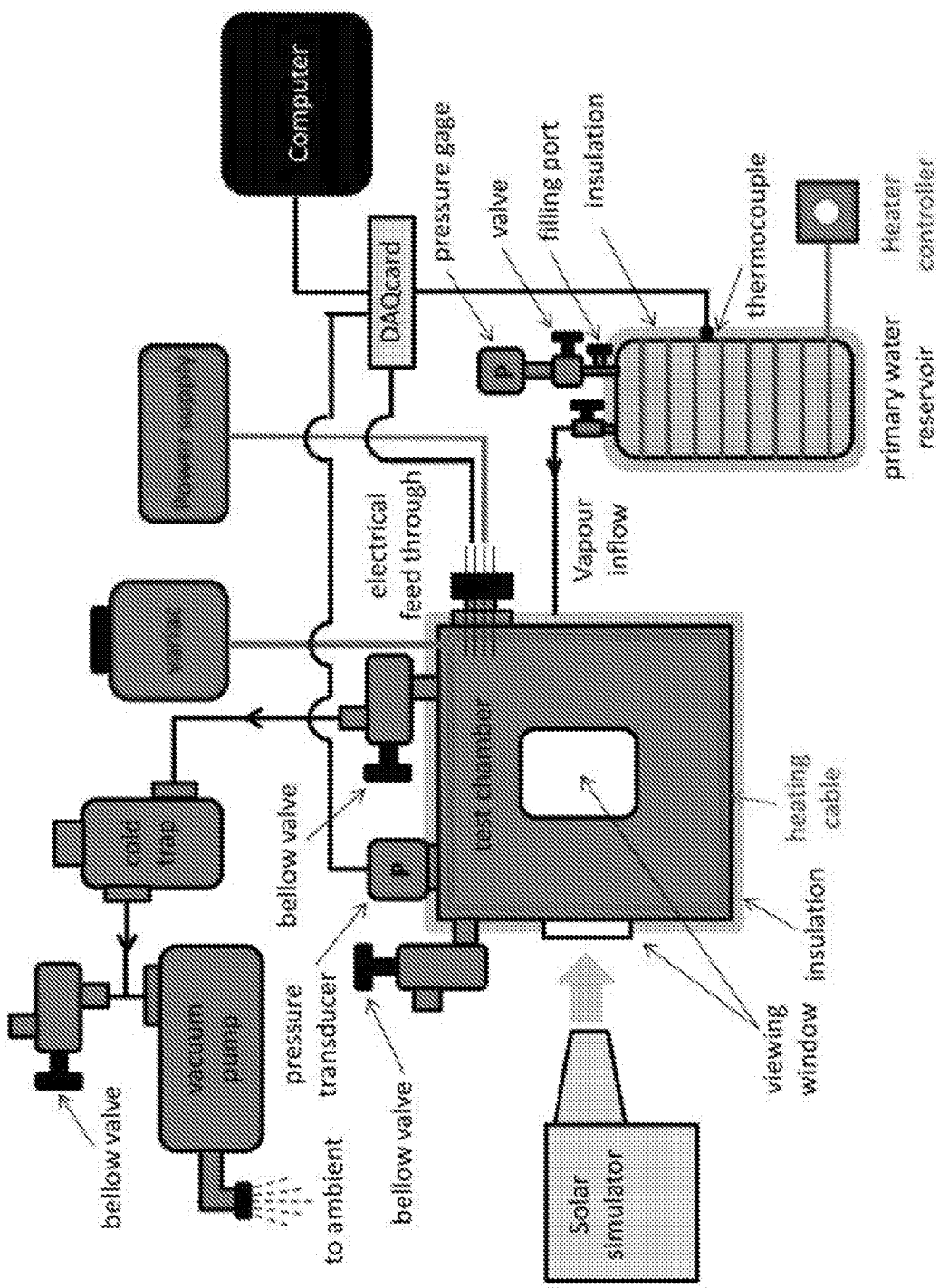
FIG. 5 shows schematic of vacuum chamber system used for water harvesting experiments.

Activated MOF-801 was infiltrated in a copper porous foam (~100 ppi), 0.41 cm thick, brazed on a (5 cm by 5 cm) copper plate with a thickness of 1.7 mm by immersing the foam-plate structure in a MOF-801 suspension in DI water. Copper foam was used to enhance structural rigidity, and to overcome the intrinsically low thermal conductivity of the porous adsorbent. See D. Liu et al., MOF-5 composites exhibiting improved thermal conductivity. International Journal of Hydrogen Energy 37, 6109 (2012), which is incorporated by reference in its entirety. The thermal conductivity, k, of the foam was estimated to be ~4 W m$^{-1}$ K$^{-1}$. The conduction resistance with the metallic foam (L k$^{-1}$, L being thickness, ~4 mm, and k being the thermal conductivity of the MOF layer) was ~10$^{-2}$ of the convective resistance (h$^{-1}$, h being a convective heat transfer coefficient). The weights of MOF-801 and copper foam-plate structures were 1.79 g and 41 g, respectively. Use of an ultra-light thermal and structural binder, such as carbon-based foam (see S. Yang, X. Huang, G. Chen, E. N. Wang, Three-dimensional graphene enhanced heat conduction of porous crystals. Journal of Porous Materials, 1 (2016), which is incorporated by reference in its entirety), can reduce the overall weight significantly. The packing density of infiltrated MOF-801 (170 kg m$^{-3}$) was characterized by letting it equilibrate in a laboratory environment for ~1 day and measuring the dehydrated weight of the surface powdered MOF-801 using an adsorption analyzer (DVS Vacuum, Surface Measurement Systems Ltd.) under high vacuum (<1E-4 Pa) at 120° C. The back side of the sample (copper plate side) was coated with a graphite spray (dgf 123 dry graphite film lubricant, Miracle Power Products Corp.) to make the surface absorptive for solar irradiance. Solar-weighted absorptivity (in the 250-2,500 nm wavelength range) was characterized to be 0.91 using a UV-Vis-NIR spectrophotometer (Cary 5000, Agilent). The sample was hung on a stand supported with metallic wires to minimize conduction losses, and an aperture was placed next to the sample, as shown in FIG. 2A. The condenser was fabricated by stacking the thermoelectric cooler (TE-127-1.0-1.5, TE technology), the heat flux sensor (HFS-4, Omega Engineering), and the copper foam using conductive pads (TFLEX 720, Laird Technologies). The copper foam attached to the condenser was used to promote condensation with a high surface area and to avoid water dripping from capillary pressure induced by the pores in the foam. Degassed reagent-grade water (Sigma-Aldrich, CAS:7732-18-5) was used during the water harvesting experiments. The simulated solar flux equivalent to 1 kW m$^{-2}$ (AM1.5 spectrum; 92192, Newport Oriel) was measured at the absorber side of the sample plane using a thermopile detector (919P-040-50, Newport) with an active diameter of 5 cm. Thermocouples (J type 5TC series, Omega Engineering) were used to measure both sides of the sample, and also vapor temperatures. Outgassing of each component during the experiments was found to be negligible, and a schematic of the vacuum chamber system used for the water harvesting experiments is shown in FIG. 5. Degassed vapor was provided from a primary water reservoir and simulated solar flux was provided through a glass view port. The chamber temperature was controlled with a heating cable and variac power supply. A data acquisition system was used to measure the MOF-801 layer, vapor, and condenser temperatures, and the heat flux readings. A power supply was used to control the condenser temperature. The effective heat transfer coefficient inside the chamber was characterized to be 7 to 9 W m$^{-2}$ K$^{-1}$ with a Kapton heater (KHL kapton flexible heater, Omega) coated with the graphite spray.

Prior to the experiments in the environmental chamber, the fabricated MOF-801 layer was evacuated at high vacuum (<1 Pa) and high temperature (~90° C.) for ~1 hour to remove initially adsorbed vapor. The chamber walls were maintained at ~35° C. throughout the entire experiment. After the evacuation process, the sample was cooled down to a temperature ~35° C. through radiative heat exchange with the chamber wall. Once the sample was thermally equilibrated with the chamber, adsorption was carried out by introducing degassed water vapor into the chamber. The vapor pressure was maintained ~1.2 kPa, monitored using a pressure sensor (722B Baratron, MKS instruments), by regulating a valve connecting a vapor source and the chamber. This pressure corresponds to 20% RH at 35° C., which allows the utilization of the step rise in water uptake observed from the adsorption isotherm shown in FIG. 1C. An isobaric condition was maintained for ~70 minutes; the sample temperature reached ~35° C. and the reduction in pressure due to adsorption was negligibly small. Then, the desorption was carried out by isolating the chamber from the vapor source and introducing simulated solar flux equivalent to 1 kW m$^{-2}$ (AM1.5 spectrum) to the graphite-coated substrate surface through a glass view port. During the desorption process, the condenser was maintained at a constant temperature of ~10° C., a saturation temperature corresponding to ~1.2 kPa using a thermoelectric cooler (TE-127-1.0-1.5, TE technology), to actively ensure an isobaric environment in the chamber. Desorbed vapor from the sample was condensed on the condenser and the heat from the condensation process was monitored using the heat flux sensor. Desorption experiment was carried out until the heat flux readings reached the baseline, which was in ~30 minutes. The vapor temperature inside the chamber was also maintained constant at ~35° C., monitored using multiple thermocouples, during the experiment.

Outdoor Proof-of-Concept Demonstration

The proof-of-concept prototype enclosure was fabricated with reflective acrylic sheets (coated with aluminum and 0.318 cm thick) to reflect incoming solar incidence during the experiment. One of the lateral faces was made of transparent plastic for visualization purposes as shown in FIG. 4A. Vacuum grease (high vacuum grease, Dow Corning), acrylic cement (TAP Plastics), and transparent food-grade wrap, and adhesive tape were used to seal the enclosure. A thermal compound (340 heat sink compound, Dow Corning) was used to bond the condenser (TE-127-1.0-1.5, TE technology) side of the enclosure onto a heat sink. The MOF-801 layer was hung on the top wall of the enclosure with nylon threads. A glass plate (solar transmittance of 0.92, measured with the UV-Vis-NIR spectrophotometer) was placed on the top of the absorber to suppress convective losses during the experiment. The finished prototype measured 7 cm×7 cm×4.5 cm, excluding the heat sink. Thermocouples were used to measure both sides of the MOF-801 layer (center of the layer), as well as the condenser. The estimated effective heat transfer coefficient experienced by the MOF-801 layer during the outdoor demonstration was ~9 W m$^{-2}$ K$^{-1}$. Further improvements can be made with an optimized spacing between the layer and the condenser (optimization of heat loss between the layer and condenser, and diffusion process for vapor condensation), and with a simple radiative insulation, such as using bubble wrap insulation for solar steamers (see G. Ni et al., Steam generation under one sun enabled by a floating structure with thermal concentration. Nature Energy 1, 16126 (2016), which is incorporated by reference in its entirety), optically transparent and thermally insulating aerogels (see A. S. Dorcheh, M. Abbasi, Silica Aerogel; Synthesis, Properties and Characterization. Journal of Materials Processing Technology 199, 10 (2008), which is incorporated by reference in its entirety), or with highly absorptive coatings for solar irradiation (e.g., Pyromark coating). For the outdoor experimental demonstration, the MOF-801 layer was left overnight on a roof at MIT overnight (day 1; Sep. 13, 2016) for vapor adsorption from ambient air. The layer was incorporated into the enclosure and sealed the next day (at 9:30 AM with ~65% RH; day 2, Sep. 14, 2016). The enclosure integrated with a heat sink was placed on a flat surface and the solar-assisted water harvesting experiment was carried out (10:00 AM-1:00 PM; day 2). The condenser temperature was set slightly below the ambient air temperature at the start of the experiment using the thermoelectric cooler and a controller (TC-720, TE technology), and was always above the dew point temperature of ambient air. A pyranometer (LP02-C, Hukseflux) was used to measure the incident solar flux on the horizontal plane (global horizontal irradiation). The ambient air temperature and RH data were obtained from a weather station on the roof.

3. Efficiency Comparison of MOF-Based Water Harvesting System

The energy efficiency of the MOF-based water harvesting system can be determined to enable comparison with refrigeration systems for water capture (dewing). From an energy balance on the MOF- and refrigeration-based water harvesting systems operating with a thermal or solar energy input (primary energy), the amount of harvested water can be defined as, COP$_{REF}$ $$(m_w)MOF = \frac{Qthermal - Qloss}{h_{ad}} \quad (1)$$

$$(m_w)REF = \frac{Qthermal \eta_{conv} COP_{REF} - Qgain}{hfg} \quad (2)$$

where $m_w$ is the amount of harvested water, $Q_{thermal}$ is thermal energy input, $Q_{loss}$ is heat loss from the MOF layer to the environment, $h_{ad}$ is the enthalpy of adsorption, $\eta_{conv}$ is thermal or solar energy to electricity conversion efficiency, COP$_{REF}$ is coefficient of performance (COP) of refrigeration cycle, $Q_{gain}$ is heat transfer from the environment to the dew collecting surface, and $h_{fg}$ is the latent heat of evaporation. In Eqn (1), sensible heat contribution is neglected, and in Eqn (2), the maximum water harvesting is when $Q_{gain}$ is minimal and this is possible only when relative humidity (RH) is high. Assuming the enthalpy of adsorption is approximately equal to the latent heat of evaporation, the ratio between the amounts of harvested water for the MOF as compared to a refrigeration cycle for equal input energy ($Q_{thermal}$) is $$\frac{(mw)MOF}{(mw)REF} \approx \frac{Qthermal - Qloss}{Qthermal \eta_{conv} COP_{REF} - Qgain} \quad (3)$$

Heat loss ($Q_{loss}$) from the MOF layer can be minimized by using thermal insulation, and for a gain high RH condition, $Q_{gain}$ can be negligible. Therefore, neglecting $Q_{loss}$ and $Q_{gain}$, a first order estimation of Eqn (3) for representative values of $COP_{REF}$ (~2) (see R. Farrington, J. Rugh, in Earth technologies forum. (NREL Washington, D.C., 2000), pp. 1-6, which is incorporated by reference in its entirety) and $\eta_{conv}$ (~20%) (see P. J. Cousins et al., in Photovoltaic Specialists Conference (PVSC), 2010 35th IEEE. (IEEE, 2010), pp. 000275-000278, which is incorporated by reference in its entirety) is 2.5. The ratio drastically increases with decreasing RHs because the temperature requirement for the dew collection decreases substantially (increasing $Q_{gain}=hA\Delta T$, where h, A, and $\Delta T$ are convective heat transfer coefficient in W m$^{-2}$ K$^{-1}$, area of dew collecting surface in m$^2$, and temperature difference between the surface and ambient air in K (>25 K at 20% RH), respectively). Note that since the refrigeration-based dew harvesting systems require a fan to blow air over to the dew surface, h is significantly greater than natural convective heat transfer coefficients (~10 W m$^{-2}$ K$^{-1}$) and air needs to be cooled well below the dew point (see D. Beysens, The formation of dew. Atmospheric Research 39, 215 (1995), which is incorporated by reference in its entirety). The upper bound of the harvested water mass ratio is when there is no water harvested with the refrigeration-based system at a given environmental condition and thermal energy input (i.e., $Q_{thermal}\eta_{conv}COP_{REF}F=Q_{gain}$). Also see a more comprehensive efficiency comparison in H. Kim, S. R. Rao, S. Narayanan, E. A. Kapustin, S. Yang, H. Furukawa, A. S. Umans, O. M. Yaghi, and E. N. Wang, Response to Comment on "Water harvesting from air with metal-organic frameworks powered by natural sunlight", Science, 358 (6367), aao3139 (2017), which is incorporated by reference in its entirety.

4. Hydrothermal Stability of MOF-801

Figure 6B:
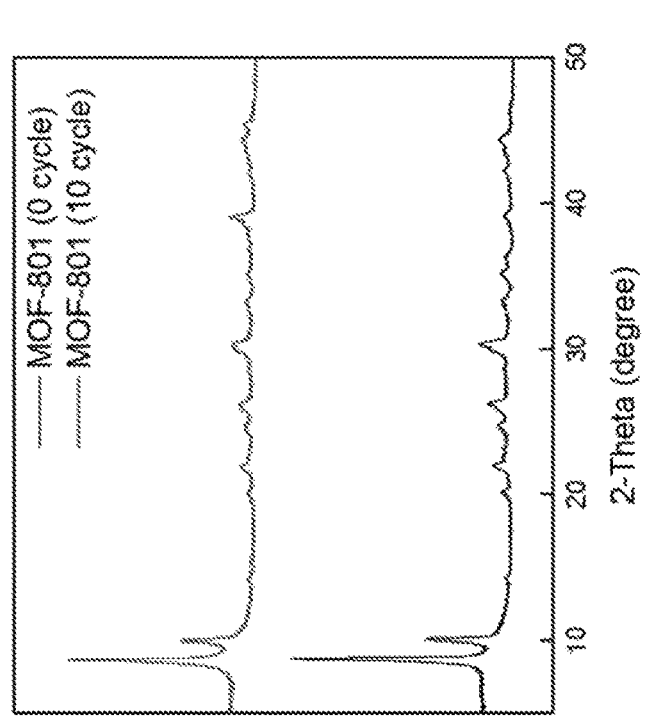

The hydrothermal stability of MOF-801 was investigated. The amount of harvested water was ~0.24 L kg.sup.-1 for MOF-801 (FIG. 6A) from the first water harvesting cycle. After the first cycle, the amount of harvested water decreased by ~10%, then remained approximately constant for the subsequent cycles. This was also observed with the powdered MOF-801 characterized using the adsorption analyzer, as shown in FIG. 6A. The adsorption and desorption conditions were 35° C. and 1.2 kPa, and 85° C. and 1.2 kPa, respectively. The x-ray diffraction (X'Pert PRO MRD, PANalytical) patterns of MOF-801, with Cu K radiation, before and after 10 adsorption-desorption cycles are shown in FIG. 6B, indicate that the crystallinity of MOF-801 remained intact after 10 cycles.

Figure 7B:
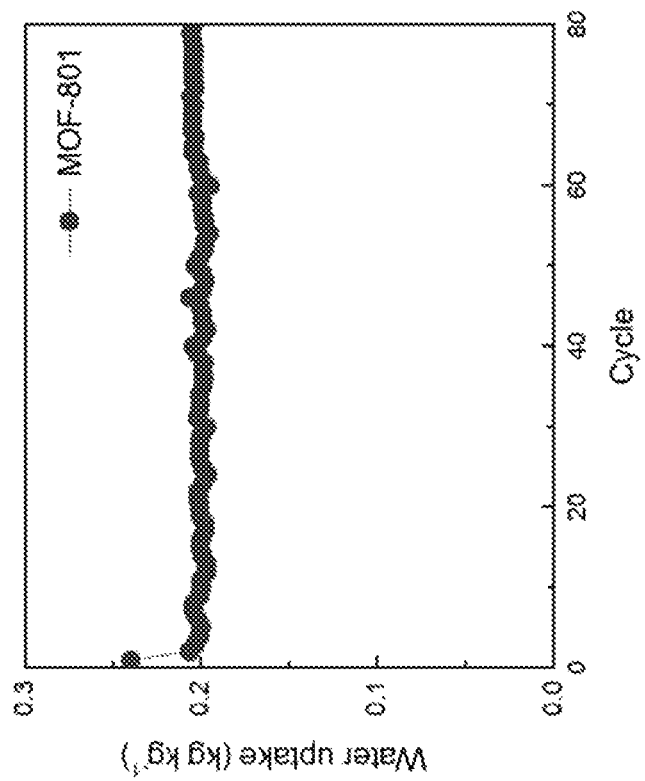
FIGS. 7A-7B show hydrothermal stability of MOF-801.
Figure 7A:
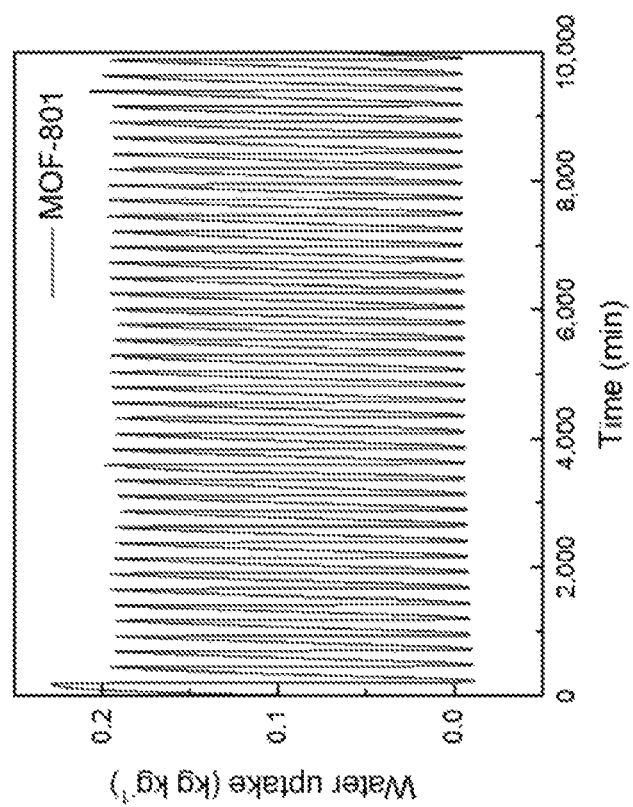

The hydrothermal stability of MOF-801 over 80 adsorption-desorption cycles under flow of nitrogen-vapor mixture at ~30% relative humidity (at room temperature) is shown in FIG. 7, characterized using a DSC-TGA instrument (Q600 SDT, TA instruments). For each cycle, room temperature adsorption for 200 min and 85° C. desorption for 30 min (with 5° C. min$^{-1}$ ramp rate) under a continuous flow of nitrogen-vapor mixture at ~30% RH. While the sorption properties are not identical to the MOF-801 used in this study, the results demonstrate that MOF-801 is exceptionally stable towards the water adsorption and desorption.

5. Theoretical Modelling

A theoretical model based on mass and energy conservation was developed to understand and predict adsorption-desorption dynamics of MOF-801 using the following governing equations (see S. Narayanan, S. Yang, H. Kim, E. N. Wang, Optimization of adsorption processes for climate control and thermal energy storage. International Journal of Heat and Mass Transfer 77, 288 (2014), S. Narayanan et al., A thermophysical battery for storage-based climate control. Applied Energy 189, 31 (2017), K. Chan, C. Y. Chao, G. Sze-To, K. S. Hui, Performance predictions for a new zeolite 13X/CaCl 2 composite adsorbent for adsorption cooling systems. International Journal of Heat and Mass Transfer 55, 3214 (2012) and I. Solmus, D. A. S. Rees, C. Yamali, D. Baker, A two-energy equation model for dynamic heat and mass transfer in an adsorbent bed using silica gel/water pair. International Journal of Heat and Mass Transfer 55, 5275 (2012), each of which is incorporated by reference in its entirety):

$$\frac{\partial C}{\partial t} + \nabla \cdot (uC) = \nabla \cdot D_v \nabla C - \frac{(1-\varepsilon)}{\delta x \varepsilon} \frac{\partial C\mu}{\partial t}$$

$$\rho c_p \frac{\partial T}{\partial t} = \nabla \cdot k \nabla T + h_{ad}(1-\varepsilon) \frac{\partial C\mu}{\partial t}$$

Eqn (4) is mass conservation of the vapor due to diffusion within the packed adsorbent, where C, ε, and ∂Cμ/∂t.differential.t are vapor concentration (mol$^{-3}$), porosity of packed adsorbent, and the average instantaneous rate of adsorption, respectively. The vapor concentration (mol m$^{-3}$) can be calculated using the ideal gas law, $C=PR^{-1}T^{-1}$, where P, R and T denote the pressure (Pa), universal gas constant (J mol$^{-1}$ K$^{-1}$), and temperature (K) of the sample. $D_v$ is the intercrystalline diffusivity of vapor (m$^2$ s$^{-1}$) through the packed MOF-801 crystals. The compressibility factor of water vapor at atmospheric pressure is nearly unity. Vapor transport due to advection ($\nabla \cdot (uC)$) in Eqn (4)) can be neglected by scaling the advection to diffusion transport using the Peclet number, $Pe=L_c u D_v^{-1}$. Here, $L_c$ is the characteristic length scale (layer thickness), and the Darcian vapor velocity, $u=-K\nabla P/\mu$, can be calculated using the permeability, K, of the porous medium (packed adsorbent), $K=(2r_c)^2\varepsilon^3(36 k_k(1-\delta)^2)^{-1}$ (see M. Kaviany, Principles of Heat Transfer in Porous Media (Springer Science & Business Media, 2012)), where μ, $r_c$, and $k_k$ are the dynamic viscosity of vapor, MOF-801 crystal radius (FIG. 9), and the Kozeny constant, respectively. The estimated Peclet number for water harvesting experiments under pure vapor condition is on the order of 10$^{-2}$. For the air-vapor mixture case where $D_v$ is much lower than the case of pure vapor, advection can be neglected because the presence of air molecules can equilibrate the pressure gradients during adsorption and desorption processes. The energy equation shown in Eqn (5) represents energy conservation within the packed adsorbent, neglecting the contribution from advection, where $pc_p$, k, and $h_{ad}$ are the locally averaged heat capacity (J m$^{-3}$ K$^{-1}$), thermal conductivity (W m$^{-1}$ K$^{-1}$), and enthalpy of adsorption (J mol$^{-1}$), ~55 kJ mol$^{-1}$ (see H. Kim et al., Characterization of Adsorption Enthalpy of Novel Water-Stable Zeolites and Metal-Organic Frameworks. Scientific Reports 6, (2016), which is incorporated by reference in its entirety). The heat capacity and thermal conductivity terms incorporate the presence of the metallic foam, MOF-801 (specific heat capacity of 760 J kg$^{-1}$ K$^{-1}$ measured using a DSC, Discovery DSC TA Instruments), and adsorbed vapor (assumed liquid phase heat capacity). Due to the high thermal conductance of the metallic binder (copper foam), advection can be neglected. Based on the Knudsen number for vapor transport, $D_v$ can be approximated as Knudsen diffusion, molecular diffusion, or a combination of both. The Knudsen number for vapor can be calculated using the mean free path of vapor and the characteristic void size of porous media. The effective vapor intercrystalline diffusivity, $D_v$, in an air-vapor mixture with consideration of both Knudsen and molecular diffusions in tortuous porous media can be estimated as (see J. R. Welty, C. E. Wicks, G. Rorrer, R. E. Wilson, Fundamentals of momentum, heat, and mass transfer. (John Wiley & Sons, 2009), T. Marshall, The diffusion of gases through porous media. Journal of Soil Science 10, 79 (1959), and P. Moldrup et al., Predicting the gas diffusion coefficient in repacked soil water-induced linear reduction model. Soil Science Society of America Journal 64, 1588 (2000), each of which is incorporated by reference in its entirety), $$D_v = \varepsilon^{\frac{3}{2}}\left(\frac{1}{D_{Vap}} + \frac{1}{D_{K,Vap}}\right) - 1 \tag{6}$$

where $D_{vap}$, $D_{K,Vap}$, and $\varepsilon$ are vapor molecular diffusivity in air, Knudsen diffusivity of vapor, and porosity of packed adsorbent, respectively. Because water harvesting experiments (FIG. 2) were conducted under pure vapor conditions at low pressures (~1.2 kPa), intercrystalline diffusivity in this case is expressed as $Dv = \varepsilon^{3/2} D_{K,Vap}$.

In Eqns (4) and (5), $C_\mu$ is the vapor concentration within an adsorbent crystal, and the average instantaneous rate of adsorption, $\partial C\mu/\partial t$, can be approximated with the linear driving force model (see S. Narayanan, S. Yang, H. Kim, E. N. Wang, Optimization of adsorption processes for climate control and thermal energy storage. International Journal of Heat and Mass Transfer 77, 288 (2014), S. Narayanan et al., A thermophysical battery for storage-based climate control. Applied Energy 189, 31 (2017), K. Chan, C. Y. Chao, G. Sze-To, K. S. Hui, Performance predictions for a new zeolite 13X/CaCl 2 composite adsorbent for adsorption cooling systems. International Journal of Heat and Mass Transfer 55, 3214 (2012), and S. Sircar, J. Hufton, Why does the linear driving force model for adsorption kinetics work? Adsorption 6, 137 (2000), each of which is incorporated by reference in its entirety).

$$\frac{\partial C\mu}{\partial t} = \frac{15}{r_c^2} D_\mu (C_{eq} - C_\mu) \tag{7}$$

Figure 10A:
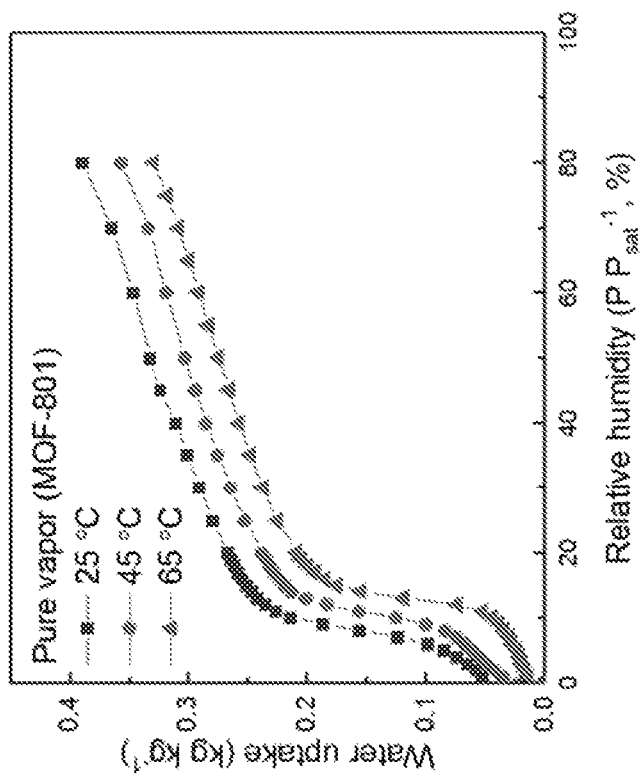

In Eqn (7), $r_c$, $D_\mu$, and $C_{eq}$ are, the adsorbent crystal radius (m), the intracrystalline diffusivity of vapor within adsorbent crystals, and the equilibrium vapor concentration based on the local temperature and vapor pressure, respectively. $r_c$ and $D_\mu$ were characterized experimentally, and $C_{eq}$ can be estimated from a linear interpolation of the adsorption isotherms, measured in the range of temperatures considered in this study (FIG. 10).

6. Packing Density and Intercrystalline Diffusivities

The effective intercrystalline diffusion is a function of spacing between the adsorbent crystals. The characteristic void size of a random packing of spherical crystals of uniform size can be estimated using a probability distribution (see S. Narayanan, S. Yang, H. Kim, E. N. Wang, Optimization of adsorption processes for climate control and thermal energy storage. International Journal of Heat and Mass Transfer 77, 288 (2014), and M. Alonso, E. Sainz, F. Lopez, K. Shinohara, Void-size probability distribution in random packings of equal-sized spheres. Chemical Engineering Science 50, 1983 (1995), each of which is incorporated by reference in its entirety), as shown, $$P(\chi) = \tag{8}$$
$$3(1+\chi)^2 \frac{\varepsilon(1-\varepsilon)(1-\varepsilon_{HCP})}{(\varepsilon-\varepsilon_{HCP})} \exp\left(-\frac{(1-\varepsilon)(1-\varepsilon_{HCP})}{(\varepsilon-\varepsilon_{HCP})}[(1+\chi)^3 - 1]\right)$$

where $\varepsilon$ and $\varepsilon_{HCP}$ are the average porosity of packed adsorbent and the porosity corresponding to the maximum packing density of spheres arranged in a hexagonal close-packed structure. The characteristic void size is calculated as $d_p = 2r_c \chi_{avg}$, where $r_c$ is the adsorbent crystal radius, and $\chi_{avg}$ is calculated as:

$$\chi avg = \frac{1}{\varepsilon}\int_0^\infty \chi P(\chi)d\chi \tag{9}$$

Figure 8B:
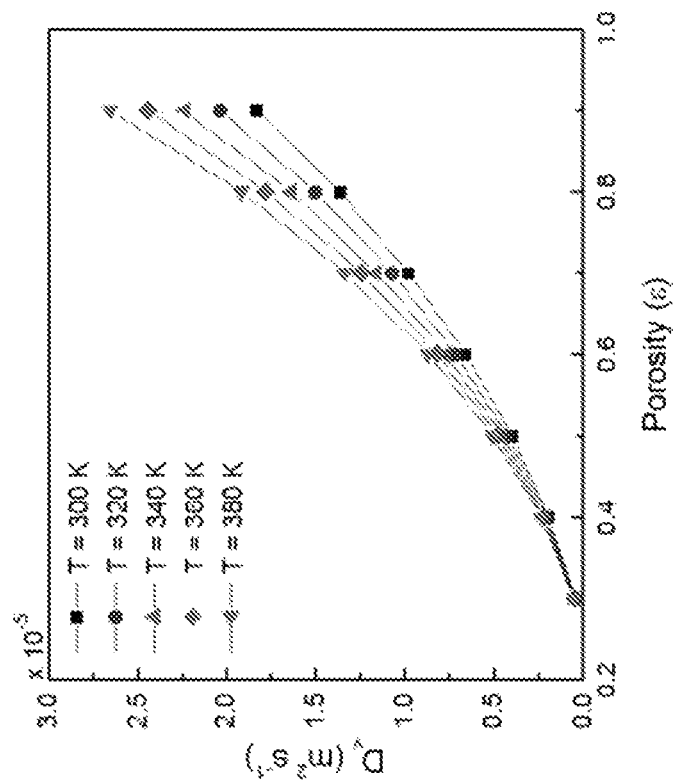
FIGS. 8A-8B show intercrystalline vapor diffusivities of packed MOF-801 in air.
Figure 8A:
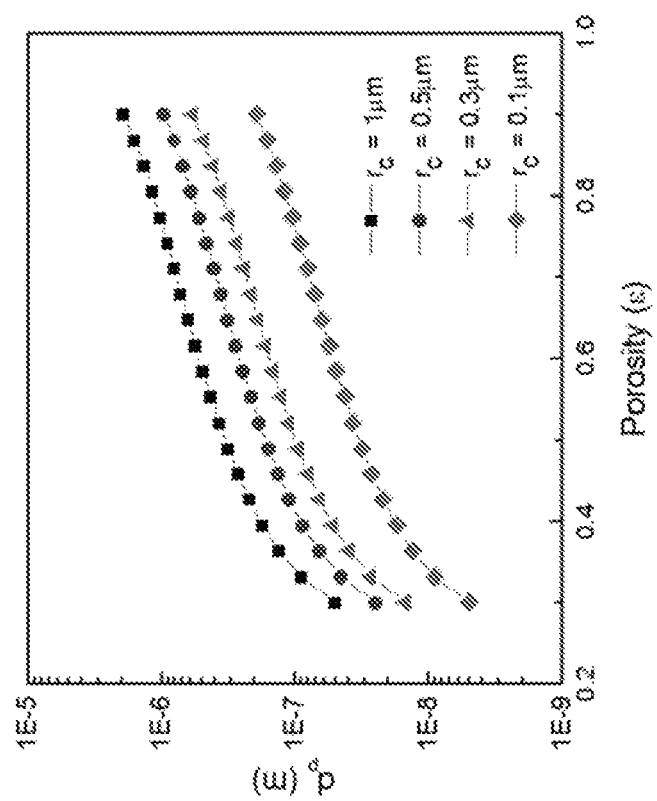

This was carried out using equations (8) and (9), as shown in FIG. 8A. The porosity of the adsorbent layer can be calculated with the following relation: $\varepsilon = 1 - \rho_{adsorbent}/\rho_{powder}$. The powdered particle density $\rho_{powder}$ of activated MOF-801 was estimated to be 1200.+–0.60 kg m.sup.-3 from the pycnometer (Micromeritics AccuPyc 1340) and BET pore volume measurements. See H. Furukawa et al., Water adsorption in porous metal-organic frameworks and related materials. Journal of the American Chemical Society 136, 4369 (2014), which is incorporated by reference in its entirety. The crystal diameter of MOF-801 (~0.6 μm) was characterized using a scanning electron microscope (6010LA SEM, JEOL), as shown in FIG. 9. The effective intercrystalline diffusivity can be computed using Eqn (6), where the Knudsen diffusivity is $D_{K,Vap} = (d_p/3)$ {square root over (8RT/.pi.M)}. The diffusion coefficient of vapor in air at atmospheric pressure as a function of temperature can be obtained using the following relation (see J. R. Welty, C. E. Wicks, G. Rorrer, R. E. Wilson, Fundamentals of momentum, heat, and mass transfer. (John Wiley & Sons, 2009), which is incorporated by reference in its entirety), $$D_{vap,T} = D_{vap,ref}\left(\frac{T}{T_{ref}}\right)^{3/2}\left(\frac{\Omega_{D,ref}}{\Omega_{D,T}}\right) \tag{10}$$

where $D_{vap}$ and $\Omega_D$ are the diffusion coefficient and collision integral based on the Lennard-Jones potential for molecular diffusion (see J. O. Hirschfelder, R. B. Bird, E. L. Spotz, The Transport Properties of Gases and Gaseous Mixtures. II. Chemical Reviews 44, 205 (1949), which is incorporated by reference in its entirety), respectively, and subscript ref denotes reference value. For the case of MOF-801, the effective intercrystalline diffusivities are plotted in FIG. 8B as a function of the packed adsorbent porosity and temperature at atmospheric pressure.

7. Adsorption Isotherms and Intracrystalline Diffusivities

Figure 11B:
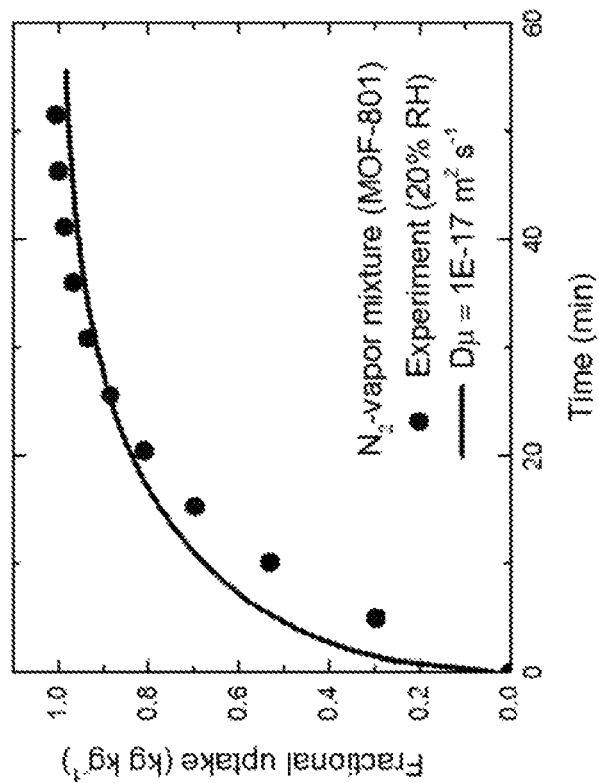
FIGS. 11A-11C show intracrystalline vapor diffusivities of MOF-801. Fractional water uptake (kg $kg^{-1}$) as a function of time for MOF-801 in pure vapor (FIG. 11A) and in nitrogen-vapor mixture characterized at 25° C. and 20% RH (FIG. 11B). The dynamic responses are recorded during the isotherm measurements shown in FIG. 10.
Figure 11A:
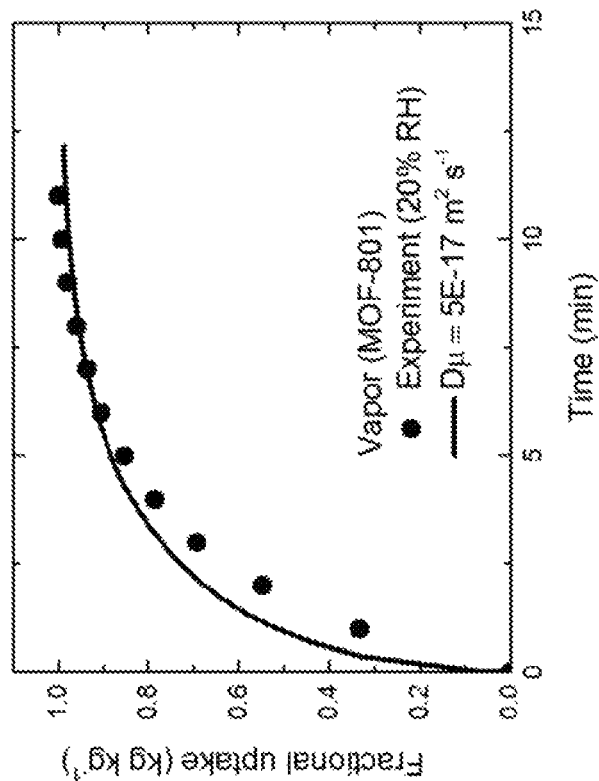
Figure 11C:
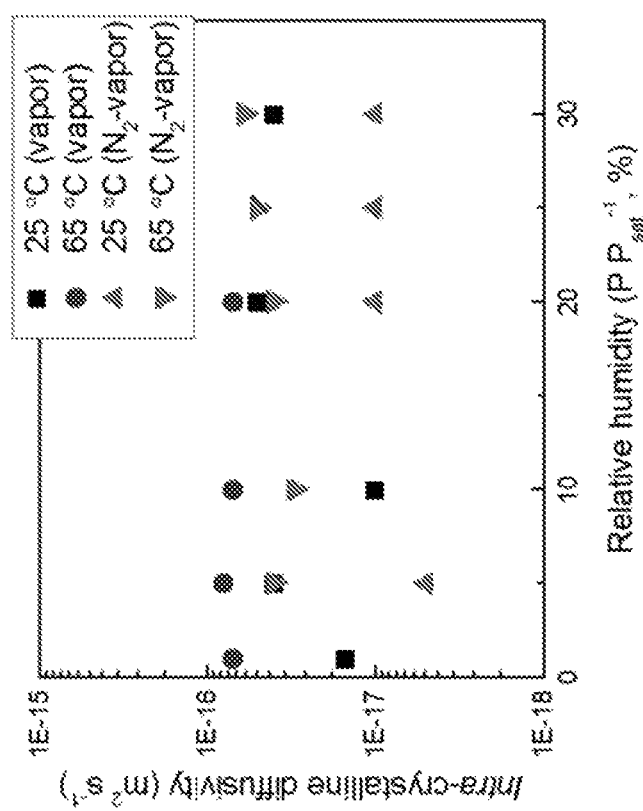

Vapor adsorption isotherms of MOF-801 were characterized using dynamic adsorption analyzers (DVS adsorption analyzer and Q5000SA, TA Instruments) at 25° C., 45° C., and 65° C., as shown in FIG. 10 in the vapor and nitrogen-vapor mixture (at atmospheric pressure) environments. Using dynamic behavior captured by these instruments, vapor intracrystalline diffusivities of MOF-801 were estimated, with assumptions of spherical crystal and isothermal diffusion, using Fick's law of diffusion given by $$\frac{\partial C}{\partial t} = \frac{1}{r^2}\frac{\partial}{\partial r}\left(D_\mu r^2 \frac{\partial C}{\partial t}\right) \quad (11)$$

where C, t, r, and $D_\mu$ are the vapor concentration, time, crystal radius, and intracrystalline diffusivity, respectively. With assumptions of homogeneous pore structure, constant spherical adsorbent crystals of radius, $r_c$, and constant surface concentration and diffusivity ($D_\mu$), the solution to Eqn (11) is [see J. Crank, The mathematics of diffusion. (Oxford university press, 1979)], which is incorporated by reference in its entirety)

$$\frac{m_r}{m_{eq}} = 1 - \frac{6}{\pi^2}\sum_{n=1}^{\infty}\left(\frac{1}{n^2}\right)\exp\left(-\frac{n^2\pi^2 D_\mu t}{r_c^2}\right) \quad (12)$$

where $m_r/m_{eq}$ the fractional water uptake with $m_r=0$ at t=0 and $m_r=m_{eq}$ as t→∞ for a sufficiently small pressure and uptake step. The effective intracrystalline (Fickian) diffusivities of MOF-801 were estimated by fitting Eqn (12) with the experimental measurements, as shown in FIG. 11, for the pure vapor and nitrogen-vapor mixture cases at 20% RH. The intracrystalline diffusivities for the mixture case are lower due to extra mass transfer resistances introduced by the presence of nitrogen gas. The intracrystalline diffusivities depend on temperature and adsorbate uptake (see R. Krishna, Describing the diffusion of guest molecules inside porous structures. The Journal of Physical Chemistry C 113, 19756 (2009), and J. Karger et al., Microimaging of transient guest profiles to monitor mass transfer in nanoporous materials. Nature Materials 13, 333 (2014), each of which is incorporated by reference in its entirety), therefore, a description of the diffusivity with the Arrhenius behavior is only satisfactory for limited cases. However, for a macroscopic modelling using the linear driving force model, it is essential to define a characteristic diffusivity. This is permissible because the intracrystalline diffusion process is not a sole mechanism for vapor transport, and this becomes predominant for the case of air-vapor mixture where intercrystalline diffusion dictates the overall transport. Using a constant intracrystalline diffusivity of 5E-17 $m^2$ $s^{-1}$ (as shown in FIG. 11A) for the theoretical model, good agreement with the experiment was achieved (FIGS. 2C and 2D). The estimated intracrystalline diffusivities were found to be fairly constant, within the order of magnitude, for the range of vapor pressures and temperatures investigated (FIG. 11C).

8. Optimization and Predictions of MOF-801 for Water Harvesting

Using the developed model and characterized properties, computational analysis was carried out using COMSOL Multiphysics for MOF-801. Since MOF-801 is classified as a physisorbent for water sorption process (see J. Canivet, A. Fateeva, Y. Guo, B. Coasne, D. Farrusseng, Water adsorption in MOFs: fundamentals and applications. Chemical Society Reviews 43, 5594 (2014), which is incorporated by reference in its entirety), the hysteresis between the adsorption and desorption isotherms is assumed to be negligible. The advective vapor transport was neglected, as stated in 5. The variations in the intracrystalline diffusivity, within the order of magnitude, have marginal effects on the overall transport processes, therefore, the intracrystalline diffusivity value of 1E-17 $m^2$ $s^{-1}$, estimated in 7, is used for the simulation. The condenser was assumed to be maintained at the ambient temperature of 25° C., a negligible vapor pressure difference between the MOF layer and the condenser surface during desorption (i.e., sufficiently small spacing between the layer and condenser), and negligible vapor pressure difference between the MOF layer surface and ambient during adsorption (i.e., negligible depletion layer thickness with sufficiently high ambient air free stream velocity or mixing (see D. Beysens, Dew nucleation and growth. Comptes Rendus Physique 7, 1082 (2006), which is incorporated by reference in its entirety)).

Figure 12A:
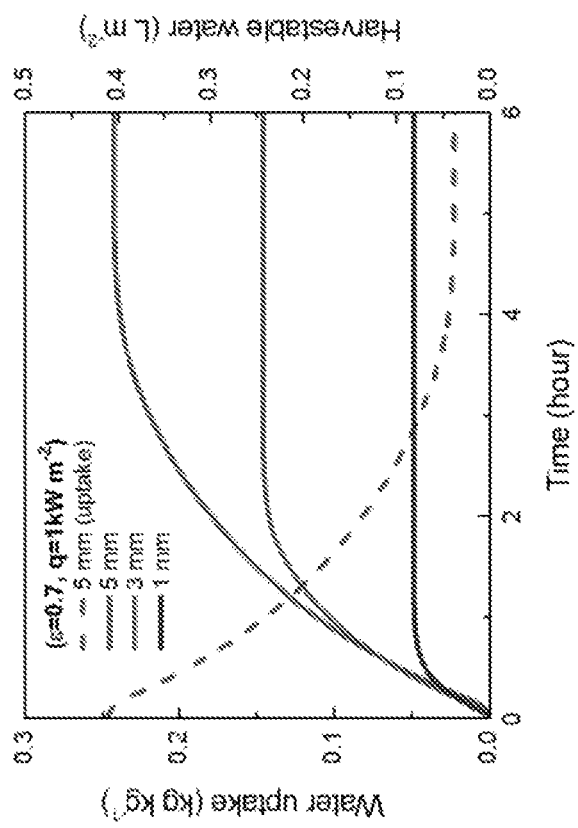
FIGS. 12A-12B show predicted desorption dynamics of MOF-801 in humid air. Predicted desorption water uptake (kg $kg^{-1}$) and harvestable water (L $m^{-2}$) with solar flux of 1 kW m.sup.-2.
Figure 12B:
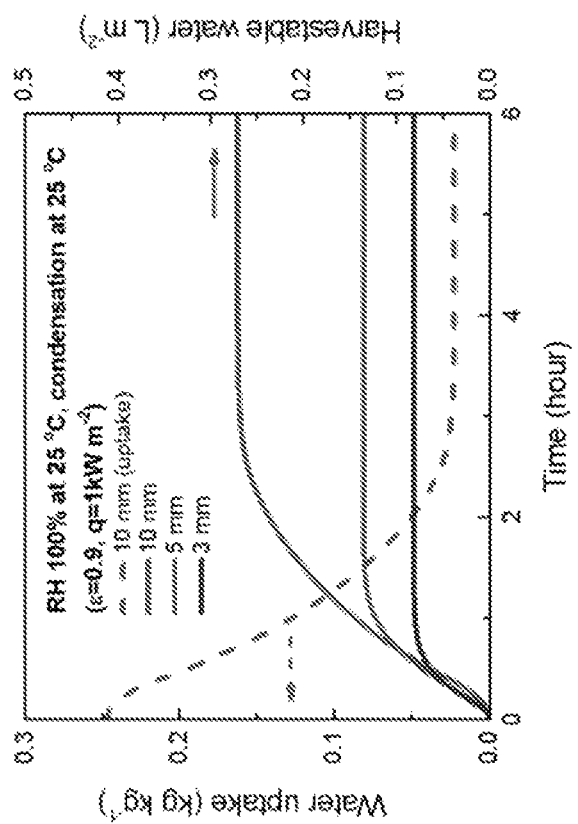
Figure 12C:
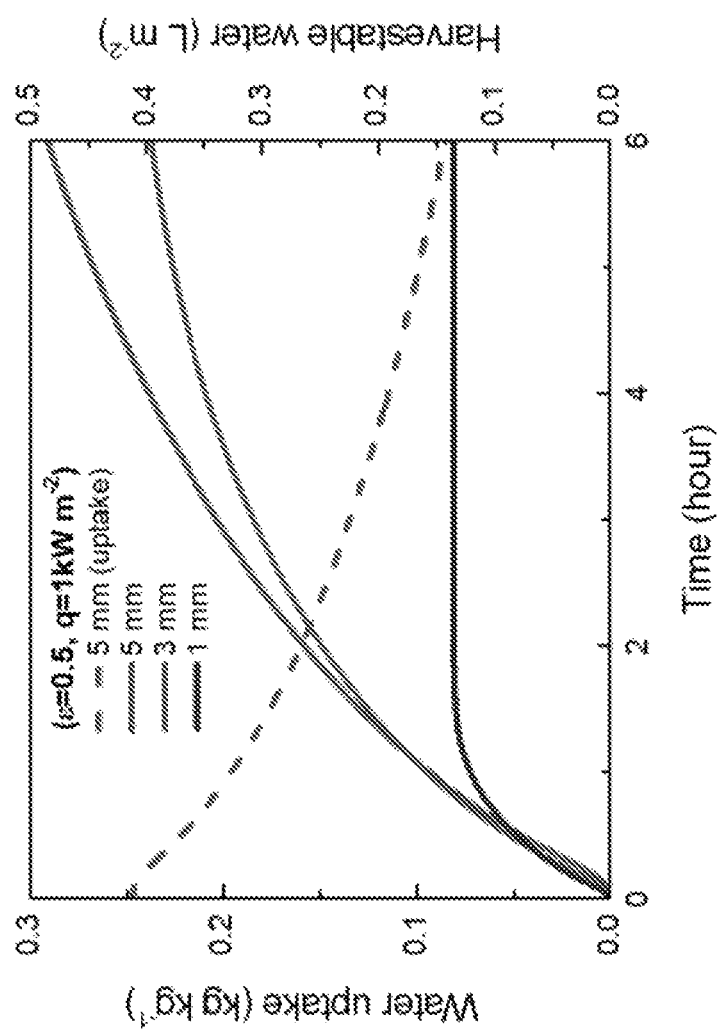
FIG. 12C shows ε of 0.5 with layer thickness of 1, 3, 5 mm.

The predicted desorption-adsorption behaviors of MOF-801 with various packing porosities and layer thicknesses with one sun (1 kW $m^{-2}$) under an atmospheric condition are shown in FIGS. 3 and 12. FIGS. 12A-12B shows predicted desorption dynamics of MOF-801 in humid air. Predicted desorption water uptake (kg $kg^{-1}$) and harvestable water (L $m^{-2}$) with solar flux of 1 kW $m^{-2}$. MOF-801 was initially equilibrated at 20% RH, at 25° C., and the vapor partial pressure rapidly increased to 100% RH at 25° C. during desorption for vapor condensation. Mass transfer resistance is predominantly due to Knudsen diffusion at ε of ~0.5.

Among various porosities, ε of 0.7 yielded the most water. Note that the adsorption process takes considerably longer than the desorption process (at 1 kW $m^{-2}$); this becomes predominant with a decrease in porosity or increase in layer thickness. Both of these have significant effects on the intercrystalline diffusion ($D_v=f(\varepsilon,r_c)\sim L_{c2}t^{-1}$). Because vapor condensation is done with presence of noncondensables (air), transport of desorbed vapor to the condenser surface is via diffusion. The time-averaged vapor pressure difference between the layer and condenser can be estimated using following relation (see J. R. Welty, C. E. Wicks, G. Rorrer, R. E. Wilson, Fundamentals of Momentum, Heat, and Mass Transfer (John Wiley & Sons, 2009), which is incorporated by reference in its entirety), $$L_S = \frac{C_t \cdot D_{vap} \cdot MW_w}{J_w}\ln\left(\frac{1-y_{w,cond}}{1-y_{w,layer}}\right) \quad (13)$$

Eqn (13) assumes steady state vapor diffusion where $L_s$, $C_t$, $MW_w$, $J_w$, $y_{w,cond}$, $y_w$,layer are the spacing between the layer and condenser (m), total molar concentration of gas (mol $m^{-3}$), molecular weight of water (kg $mol^{-1}$), time-averaged mass flux of desorbed vapor (kg $m^{-2}$ s-1), and mole fractions of vapor at the condenser surface and the layer surface, respectively. The time scale of vapor diffusion in few centimeters is significantly small compared to the time scale for complete desorption, therefore, steady state assumption is valid. Using the predicted desorption flux for the case of porosity of 0.7 and 1 mm layer thickness, if the spacing is ~4 cm, the estimated time-averaged vapor pressure at the layer surface is ~2 times of the condenser vapor pressure. This will delay the desorption process as the driving potential for desorption decreases with increase in vapor pressure. However, RH is an exponential function of temperature and the adsorption isotherm shifts down with increase in temperature for MOF-801, therefore, marginal increase in temperature can overcome the challenge as the vapor pressure difference will ultimately vanish. Alternatively, vapor transport can be enhanced with density gradient, i.e., buoyancy, with geometric orientation of the layer and condenser. In addition, heat loss from the layer to the condenser during desorption increases with the decreasing spacing, and there will be an optimum based on considerations of heat loss and pressure difference. Under a natural convection condition in air, heat transfer coefficients ranges between 3 and 25 W m$^{-2}$ K$^{-1}$, and with forced convection, 10 and 200 W m$^2$ K$^{-1}$ (see A. F. Mills, Heat Transfer (Prentice Hall, 1999), which is incorporated by reference in its entirety). Therefore, a finned condenser can dissipate condensation heat with temperature difference between the condenser and ambient less than 5° C. For all predictions, MOF-801 composite thermal conductivity was assumed of 4 W m$^{-1}$ K$^{-1}$ (infiltrated in a copper foam binder), convective heat transfer coefficient of 10 W m.sup.-2 K$^{-1}$, temperature of surrounding air-vapor mixture of 25° C., and black body solar absorber. In addition, temperature and water uptake profiles of the MOF prototype (FIG. 4C) were predicted, assuming the initial equilibrium state at 65% RH, using the theoretical model incorporating vapor diffusion resistance between the layer and condenser. Here, Fick's law of diffusion, 1-dimensional form of Eqn (11), is used to correlate the vapor pressure at the layer surface from the condenser saturation pressure at ~23° C. The experimentally measured solar flux (including solar transmittance and absorptance losses) and environmental conditions with effective heat transfer coefficient of ~9 W m$^{-2}$ K$^{-1}$ are used for the boundary conditions.

Examples

Adsorption-Based Atmospheric Water Harvesting Device for Arid Climates

In certain embodiments, an air-cooled adsorption-based atmospheric water harvesting device using metal-organic framework (MOF)-801 [(Zr$_6$O$_4$(OH)$_4$(fumarate)$_6$] can be operated in an exceptionally arid climate with 10-40% relative humidity (RH) and sub-zero dew points (Tempe, Ariz., United States). In these conditions, water harvesting with refrigeration-based atmospheric water generators (AWGs) is infeasible due to low humidity content as well as the necessity to freeze water (sub-zero dew points). Overnight saturation of the device with vapor from ambient air and exposure to sunlight during the day led to the formation of many water droplets which grew and coalesced to become up to ~1 cm in diameter. This clearly indicated that this device was working to harvest water vapor from the atmosphere and produce liquid water from a 10-40% RH environment. With the combination of experimental data and computational simulations, this device is predicted to deliver over 0.25 liters of water per kg of MOF (or ~0.34 liters per m$^2$ of MOF layer) for a single cycle (night and day). The water quality showed that the MOF compound was stable to water and the metal ions and organic linkers did not leach from the framework into the harvested water. The successful demonstration of this MOF-based water harvesting device in exceptionally dry climates paves a path towards the development of a viable water harvesting strategy to address significant water shortages globally.

Water scarcity is a particularly severe challenge in arid and desert climates. A substantial amount of water is present in the form of vapor in the atmosphere, this water can be harvested by dewing, i.e., cooling air below the dew point and facilitating condensation. This approach can be extremely energy intensive and impractical, particularly when the relative humidity (RH) is low (i.e., below ~40%). In contrast AWGs that utilize sorbents enable capture of vapor at low RH conditions and can be driven by the abundant source of solar-thermal energy, and consequently exhibit higher efficiency under these conditions. High-efficiency adsorbent-based water harvesting will enable significant increases in distributed and portable water generation globally.

Enabling access to fresh potable water in desert and arid regions is a critical challenge and tightly coupled to social and economic development. See M. M. Mekonnen and A. Y. Hoekstra, Science Advances, 2016, 2, e1500323, which is incorporated by reference in its entirety. Water scarcity is difficult to address in areas that are landlocked and have limited infrastructure, such that mature water purification technologies, i.e., reverse osmosis and multi-stage flash, is challenging to implement. Atmospheric water generators (AWGs) can take advantage of solar energy via photovoltaics (refrigeration-based) or solar thermal (sorption-based) to harvest moisture from air. See R. V. Wahlgren, Water Research, 2001, 35, 1-22, E. D. Wikramanayake, O. Ozkan and V. Bahadur, Energy, 2017, 138, 647-658, H. Kim, S. Yang, S. R. Rao, S. Narayanan, E. A. Kapustin, H. Furukawa, A. S. Umans, O. M. Yaghi and E. N. Wang, Science, 2017, 356, 430-434, J. Ji, R. Wang and L. Li, Desalination, 2007, 212, 176-182, Zero Mass Water-SOURCE your water, zeromasswater.com, (2017), and Simone, M. & Siegfried, E. Water extraction from air moisture using an innovative sorption method, https://www.igb.fraunhofer.de/content/dam/igb/en/documents/sheets/pt/1510-_PB-pt _wasserausluft_en.pdf, (2017), each of which is incorporated by reference in its entirety. Typical AWGs utilize refrigeration to cool large volumes of air well below the dew point to condense water. The amount of energy consumed to harvest water from the air dramatically increases as the humidity or ambient temperature decreases. Desert and arid regions, unfortunately, have day-time relative humidities P (RH; P$_{vap}$/P$_{sat}$, vapor pressure over saturation pressure) as low as ~10% with a vapor content of approximately 3 liters of liquid water for every one million liters of air. For these conditions, the dew point can be sub-zero, requiring a large amount of energy to freeze and collect water out of air. Though the typical night-time RH can be as high as ~40%, the lower ambient temperature (~20° C.) prevents water harvesting with refrigeration based AWGs. As a result, the practical implementation of refrigeration-based AWGs is infeasible. See E. D. Wikramanayake, O. Ozkan and V. Bahadur, Energy, 2017, 138, 647-658, which is incorporated by reference in its entirety.

AWGs that take advantage of solar-thermal processes are a promising alternative to capture and deliver water in arid regions. In this approach, a sorbent is first saturated with water from air and subsequently heated to release and condense the water. By selecting the desired sorbent characteristics (e.g., shape and step position of the isotherm, saturation capacity, and binding energy), solar-thermal driven water harvesting is viable and efficient even in low RH conditions. Recently, metal-organic frameworks (MOFs) are particularly attractive because they can capture more water and require lower regeneration temperatures for its release compared to conventional sorbents (e.g., zeolites/silica gels or liquid brines). See H. Kim, S. Yang, S. R. Rao, S. Narayanan, E. A. Kapustin, H. Furukawa, A. S. Umans, O. M. Yaghi and E. N. Wang, Science, 2017, 356, 430-434, which is incorporated by reference in its entirety. In addition, their step-like isotherms suggest that a small change in temperature and/or RH can lead to a large change in uptake and water release. The previous proof-of-concept device showed that with MOF-801, water harvesting is possible (Cambridge, Mass., United States, with ~65% RH), with a temperature differential of ~45 K between the MOF layer and condenser. Here, an air-cooled MOF-801 based water harvesting device (FIG. 13) was experimentally demonstrated to be operated in the extreme arid climate of southwestern United States (Tempe, Ariz., United States) with a day-time RH as low as 10% and under sub-zero dew points. During adsorption, air is circulated around the MOF layer and water from air is adsorbed. Passive radiative cooling lowers the MOF layer temperature below ambient by dissipating thermal radiation to clear cold sky to increase the effective RH for adsorption. During water production, optically transparent and thermally insulating (OTTI) aerogel is stacked on top of the MOF layer to suppress convective heat loss from the solar absorber. The desorbed vapor is condensed on a condenser and heat of condensation is rejected to the ambient by a heat-pipe heat sink. In addition, the water from the adsorption-desorption/condensation process with MOF-801 was analyzed and confirmed that the MOF compound is stable to water, and the metal ions and organic linkers do not contaminate the produced water.

Cyclic water harvesting (i.e., multiple adsorption-desorption cycles a day) is challenging in extremely arid regions due to the low day-time humidity (~10% RH) which prevents water adsorption, i.e., the RH is lower than the adsorption step of MOF-801. Consequently, to achieve maximum water production for a single cycle, in this work, several design improvements were implemented. The device was optimized and engineered to completely saturate during the night-time humidity swing (20-40% RH). Furthermore, with an optical concentration of less than 2× and buoyancy-assisted vapor transport during condensation, the overall thermal efficiency (i.e., latent heat of water times mass of harvested water per unit input solar energy) can be increased by ~5× and enable complete regeneration with MOF-801.

Operation in such arid regions also opens an interesting avenue for increasing water harvesting output with passive radiative cooling by leveraging the typically clear sky. The clear night sky and low vapor content in the atmosphere enables dissipation of long-wavelength (infrared) thermal radiation from the device to the cold sky to cool it below its ambient temperature. By facing the device to the sky during adsorption, a ~3 K temperature drop was achieved, which corresponds to an increase in 5-7% RH experienced by the adsorbent. This passive cooling can lead to opportunities to utilize other adsorbents which have their adsorption steps located beyond the typical levels of RH in specific regions.

In certain embodiments, the operational principle can involve a single daily cycle where adsorption occurs during night-time at a higher humidity (20-40% RH) and solar-assisted desorption/water production occurs during day-time at a lower humidity (10-20% RH), schematically described in FIG. 13. The device consists of two key components, an adsorbent layer (MOF) and an air-cooled condenser in an enclosure. The back side of the MOF layer is coated black and serves as a solar absorber. During night-time adsorption, the enclosure side walls are opened and the MOF layer is saturated with vapor from the natural flow of ambient air and passively cooled with radiation to the sky. During day-time water production, the enclosure is closed and the solar absorber side is covered with an optically transparent thermal insulator (OTTI aerogel). See L. Zhao, S. Yang, B. Bhatia, E. Strobach and E. N. Wang, AIP Advances, 2016, 6, 025123, and E. Strobach, B. Bhatia, S. Yang, L. Zhao and E. N. Wang, Journal of Non-Crystalline Solids, 2017, 462, 72-77, each of which is incorporated by reference in its entirety. The MOF layer is heated by exposure to solar irradiance, causing water release (desorption). The desorbed water vapor diffuses from the MOF layer to the condenser due to a concentration gradient. Accumulation of vapor in the enclosure leads to saturation conditions and consequently, the condensation process occurs at ambient temperature. The heat of condensation is dissipated to the ambient by a heat sink. The adsorbent need to be selected based on the typically available ambient RH for water adsorption. MOF-801 was chosen because it exhibits an adsorption step located around 20% RH and is well-suited for the specific climate tested (Tempe, Ariz., United States). Furthermore, MOF-801 is hydrothermally stable and well-characterized for water adsorption including having high stability to cycling water in and out of the pores. See H. Kim, S. Yang, S. R. Rao, S. Narayanan, E. A. Kapustin, H. Furukawa, A. S. Umans, O. M. Yaghi and E. N. Wang, Science, 2017, 356, 430-434, and H. Furukawa, F. Gandara, Y.-B. Zhang, J. Jiang, W. L. Queen, M. R. Hudson and O. M. Yaghi, Journal of the American Chemical Society, 2014, 136, 4369-4381, each of which is incorporated by reference in its entirety.

Figure 13A:
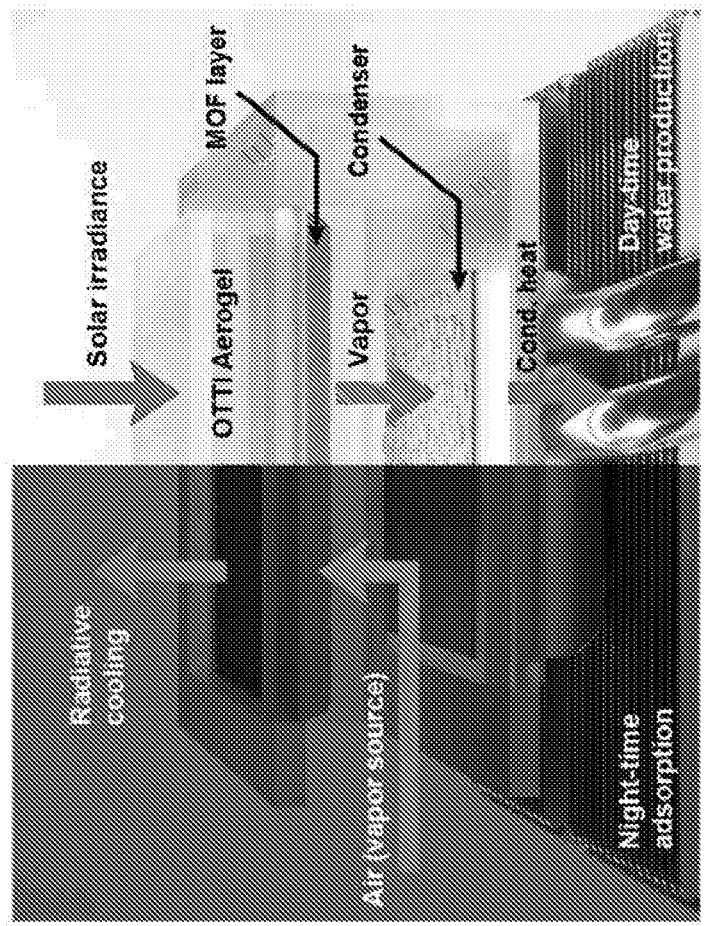
FIGS. 13A-13B show working principle of MOF-801 based water harvesting device and adsorption isotherms.
Figure 13B:
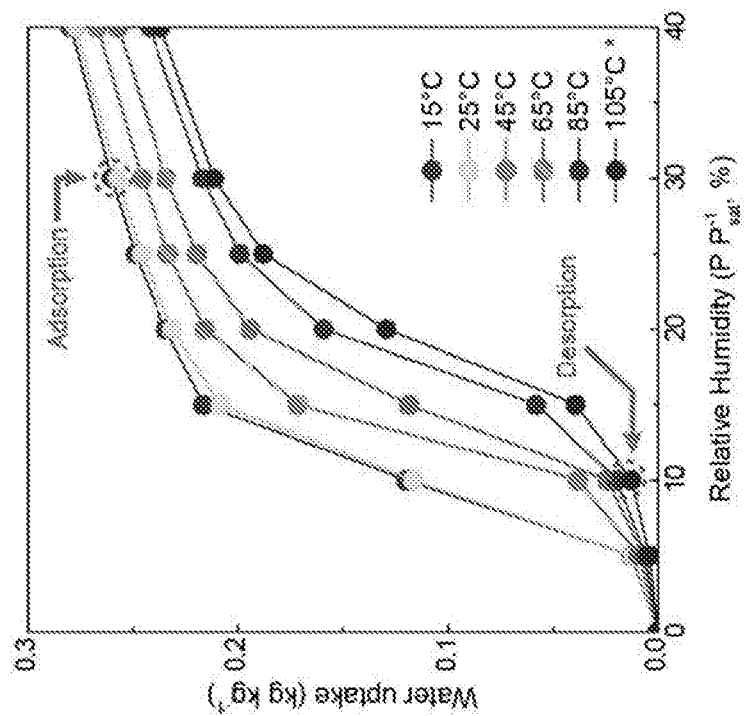

The amount of water that can be harvested in a single cycle using MOF-801 can be evaluated based on the adsorption isotherm shown in FIG. 13B. FIG. 13B shows water adsorption isotherms of MOF-801 in kg kg$^{-1}$ (kg of water per kg of MOF-801) as a function of relative humidity (P P.sub.sat.sup.-1, vapor pressure over saturation pressure) at temperatures of 15° C., 25° C., 45° C., 65° C., and 85° C. measured using a sorption analyzer (Q5000 SA, TA Instruments). Isotherm at 105° C. was predicted using the characteristic curve based on the isotherm at 85° C. See M. F. de Lange, K. J. Verouden, T. J. Vlugt, J. Gascon and F. Kapteijn, Chemical Reviews, 2015, 115, 12205-12250, which is incorporated by reference in its entirety. Dotted red circles indicate representative conditions achieved during night-time adsorption and day-time water production in Arizona, United States.

For representative conditions at the test location, with a night-time ambient temperature of 15-25° C. and RH of ~30% during adsorption, the equilibrium uptake is estimated to be ~0.25 kg kg$^{-1}$ (kg of water per kg of MOF-801). To achieve complete desorption (at ~10% RH, see FIG. 13B), with a day-time ambient (condenser) temperature of 30° C. (saturation vapor pressure, $P_{sat}$=4.2 kPa), the adsorbent must be heated to a minimum of 77° C. ($P_{sat}$=42 kPa). This corresponds to a target temperature difference of ~45 K between the adsorber and the condenser.

Figure 20A:
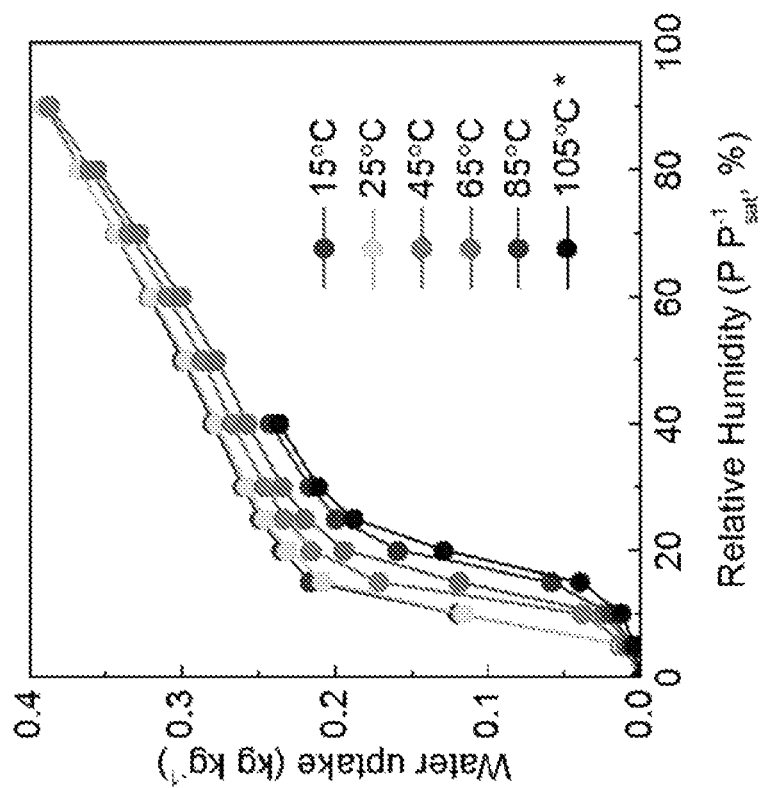
FIG. 20A shows vapor adsorption isotherms of MOF-801 at 15, 25, 45, 65, and 85° C.

To attain these operating conditions, the prototype design described in the recent study was further optimized and engineered (section S8). A MOF layer (base of 5 cm by 5 cm with ~3 g of MOF-801) was fabricated using a porous copper foam. The solar absorber side of the MOF layer was coated with pyromark paint with a solar absorptance of ~0.95. The MOF layer density and thickness were optimized (FIG. 22) for operation in arid climates based on the transport properties of MOF-801. Predicted adsorption-desorption dynamics with a packing porosity of 0.67, desorption heat flux of 1 kW m$^{-2}$, natural convective heat transfer coefficient of 10 W m$^{-2}$ K$^{-1}$, ambient temperature of 25° C., and thicknesses of 1, 3, and 5 mm. MOF-801 is initially equilibrated at 30% RH (25° C.), and the partial vapor pressure rapidly increased from 30% RH to 100% RH (at 25° C.) for condensation/water harvesting at 25° C. with a desorption heat flux of 1 kW m$^{-2}$. Durations of solar exposure for 1, 3, and 5 mm thick MOF layer are 0.8, 2.1, and 4 hours, respectively. After desorption, solar exposure is stopped and the surrounding RH reverted to 30% RH for water adsorption from air. The temperature profile of a 5 mm thick MOF layer is also shown. Based on the predicted performance for the porosity of 0.67, the MOF layer thickness should be ~3 mm to enable complete saturation under the limited time window for adsorption (approximately under 8 hours in 20-40% RH environment). For simplicity, constant intracrystalline diffusion coefficient of 3E-17 m$^2$ s$^{-1}$ is used for the simulation (FIG. 20C) and sufficiently fast air freestream velocity is assumed to keep the RH of 30% at the MOF layer.

Figures 14A, 14B:
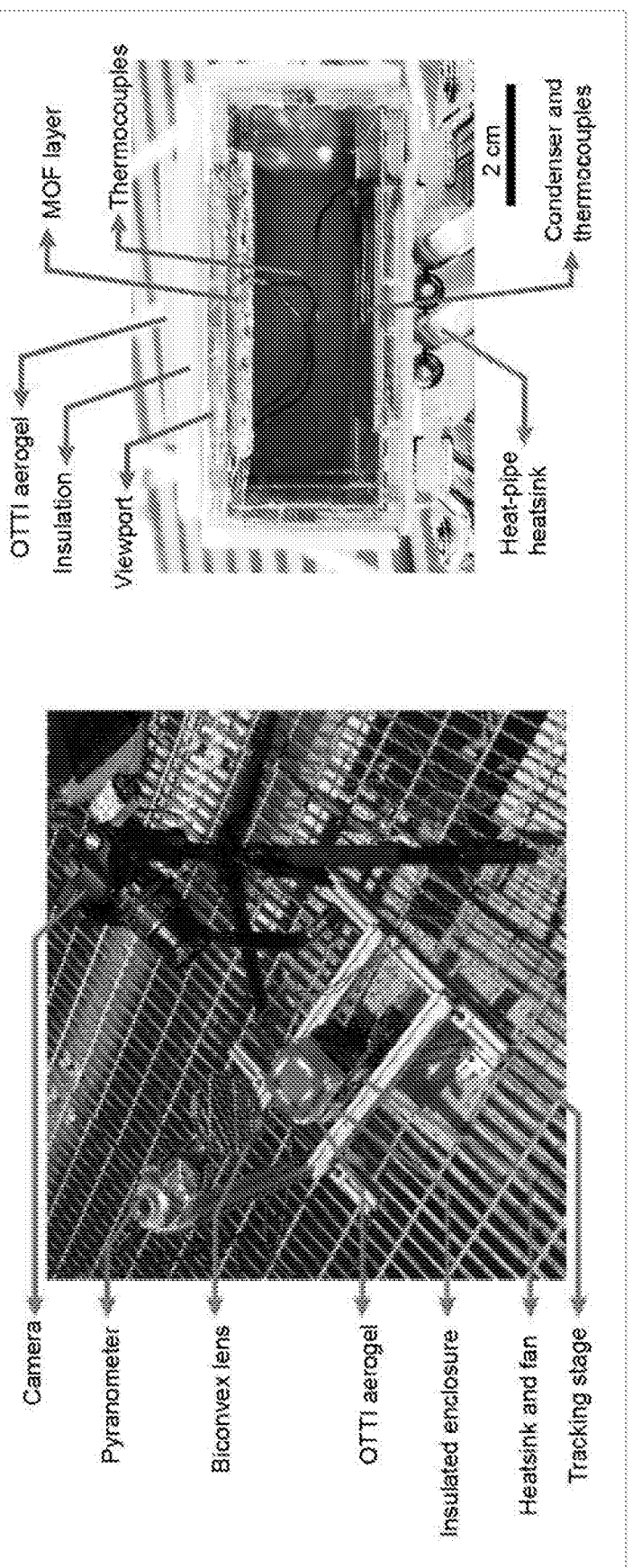
FIG. 14A-14B show water harvesting device test apparatus.
Figure 17:
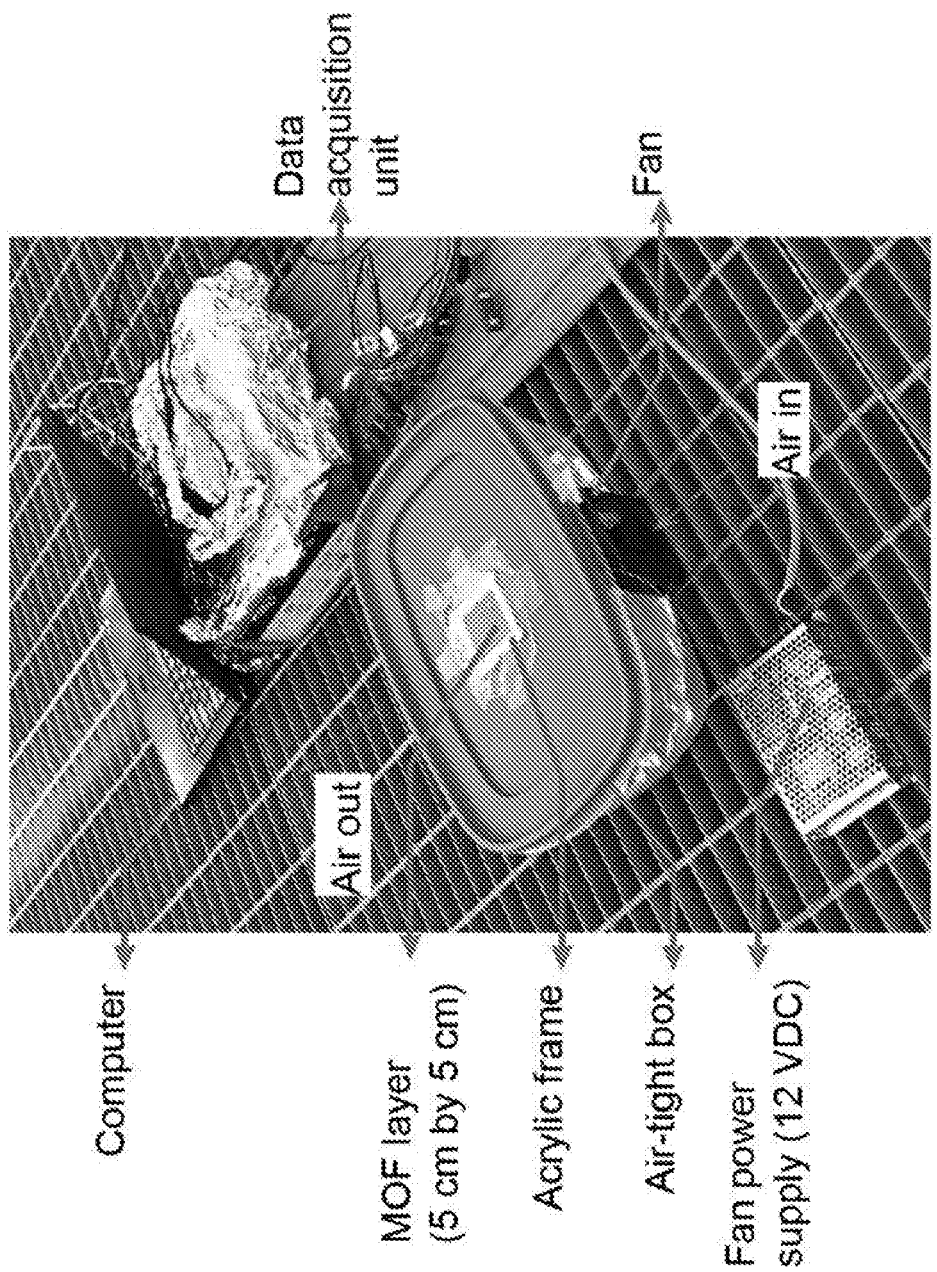
FIG. 17 shows a photo of experimental setup during night-time adsorption.
Figure 20B:
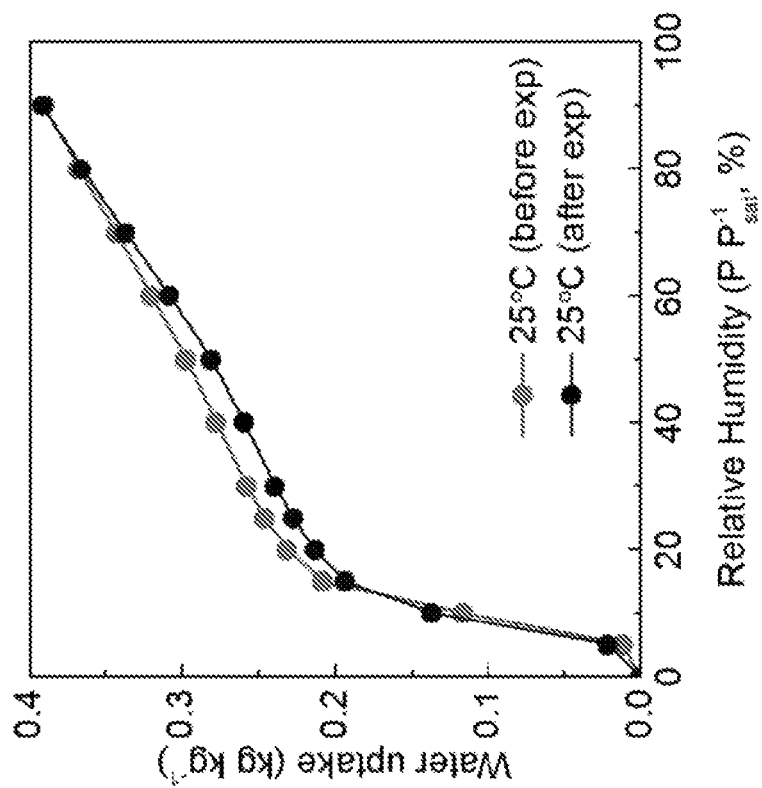
FIG. 20B shows vapor adsorption isotherms of MOF-801 at 25° C. before (red) and after climate testing (black).
Figure 21B:
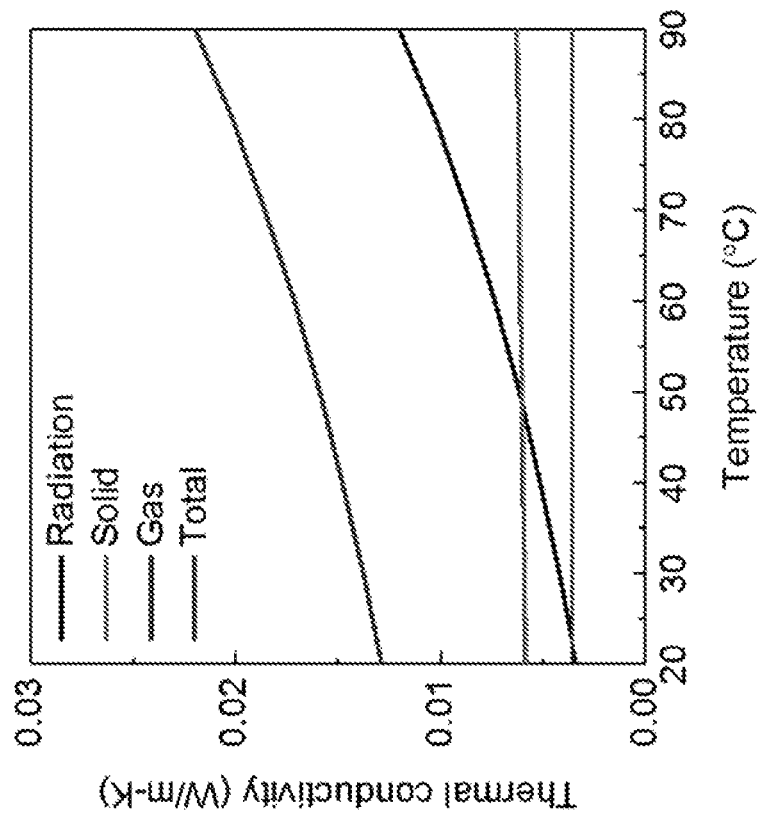
FIG. 21B shows predicted thermal conductivity of an aerogel sample.
Figure 21A:
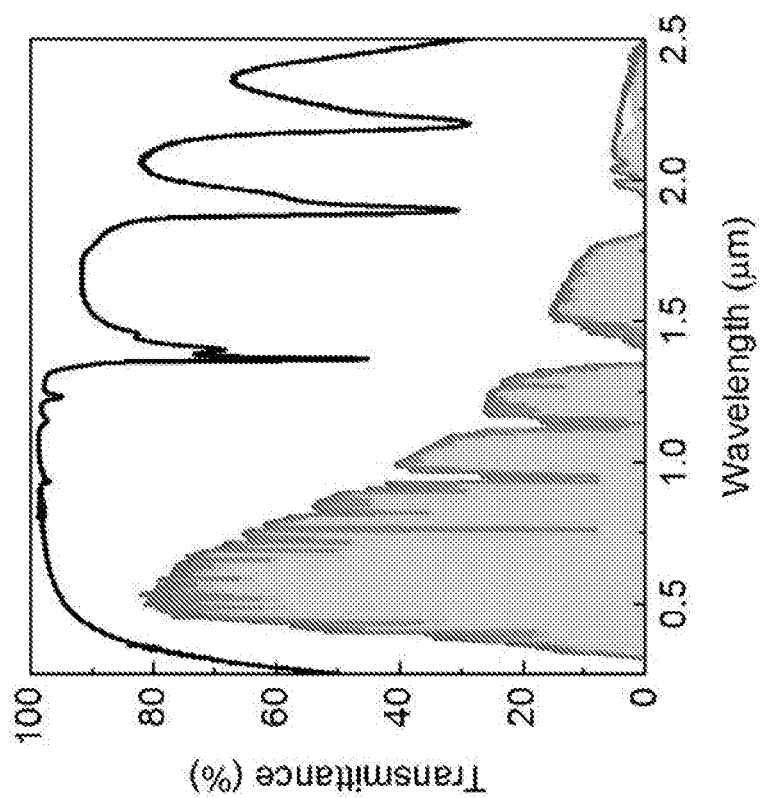
FIG. 21A shows measured transmittance of an aerogel sample using UV-Vis-NIR spectrophotometer.

A packing porosity of 0.67 (or packing density of 464 kg m.sup.-3) and thickness of 2.57 mm were chosen for the MOF layer. These optimized parameters enable saturation within the limited time window, i.e., during the humidity swing (increase) in the night-time (roughly under 8 hours in a 20 to 40% RH environment) and to maximize water harvesting capacity. Due to the fixed side walls of the small-scale device (unlike FIG. 13A), which prevented access to air flow (vapor source), the MOF layer was secured in a separate enclosure which allowed adequate access to air (FIG. 17). The MOF layer with its acrylic frame was mounted into cover of an air-tight plastic storage container with the pyromark coated side up for night-time radiative cooling. A ~5 kg metal block was placed inside to secure the apparatus against wind. The sides of the air-tight container were modified to fit a fan (0.9 W; 12 VDC) and enable cross flow of ambient air (vapor source). Initially, the black absorber side was covered with aluminum foil to reach thermal equilibrium with the ambient. At the start of the adsorption experiment, the aluminum foil was removed and a temperature drop due to the passive radiative cooling was observed (FIGS. 15 and 23). The condenser of the device was fabricated with a copper plate (4 cm by 4 cm and 0.6 cm thick) attached to a commercial air-cooled heat sink (NH-L9x65, Noctua) to efficiently dissipate the heat from condensation to the ambient. The condenser was air-cooled throughout the entire experiment. To suppress convective heat loss from the solar absorber side of the MOF layer during solar-assisted desorption, an optically transparent and thermally insulating (OTTI) aerogel with a thermal conductivity of less than 0.03 W m$^{-1}$ K$^{-1}$ and solar transmittance of ~0.94 (FIG. 21) was stacked on the MOF layer as shown in FIGS. 13A and 14. FIG. 14A shows a photo of the device test apparatus during the solar-assisted water production with 1.8x optical concentration (test location: Tempe, Ariz., United States). FIG. 14B shows a photo of the water harvesting device showing the MOF layer (5 cm by 5 cm base, porosity of 0.67 or packing density of 464 kg m$^{-3}$ with 2.57 mm thickness), condenser (4 cm by 4 cm), and thermocouples through the view port. OTTI aerogel, heat-pipe heat sink, and insulation are also shown. FIG. 21A measured transmittance of an 8 mm thick aerogel sample using UV-Vis-NIR spectrophotometer (Cary 5000, Agilent). The AM1.5 solar spectrum is shown for comparison (red line). The orange area represents the transmitted spectrum by the aerogel. The solar weighted transmission of the sample is 94.5%. FIG. 20B shows predicted thermal conductivity of an 8 mm thick aerogel sample. Contributions from radiation, solid conduction, and gas convection are also shown.

The use of OTTI aerogel is well-suited for arid climates due to the inherently low RH. Furthermore, no degradation during testing was observed. In order to prevent vapor leak during desorption, a transparent plastic wrap (solar transmittance of ~0.93) was used to seal the device, leading to an overall solar transmittance and absorptance loss of ~17% (83% sun to thermal conversion efficiency) with an effective heat loss coefficient of 9 to 10 W m.sup.-2 K.sup.-1. To help overcome these solar-thermal losses and improve water harvesting thermal efficiencies, experiments were also performed with a biconvex lens (9 cm diameter) which was used to achieve an optical concentration of 1.8x during desorption. The spacing between the MOF layer and condenser (~1.8 cm) was also reduced in comparison to the prior study to enable faster vapor diffusion during condensation while maintaining a small heat loss from the MOF layer to the condenser. One of the lateral walls of the device was made transparent to serve as a view port for visualization.

Water Harvesting Experiments

Five water harvesting cycles were performed between May 11-18, 2017 (Tempe, Ariz., United States) with the same MOF layer. Prior to the first cycle, the MOF layer was heated and dehydrated under direct solar radiation to ~50° C. and in an ambient of 35° C. and RH less than 20% for ~1.5 hours. The water harvesting cycle was initiated around 20:00 hour local time. The absorber (black) side was positioned to face the clear sky to enable passive radiative cooling, reducing the MOF layer temperature below its ambient. Temperature drops of ~3 K were consistently observed throughout the adsorption phase of the five consecutive water harvesting cycles. This reduction in temperature corresponds to a 5 to 7% increase in effective RH experienced by the MOF layer. While the ambient vapor pressure is constant, in this case the saturation pressure is now defined by the temperature of the cooler adsorbent layer. After the overnight adsorption process, the MOF layer was installed back into the device between 06:00 and 07:00 hours local time, before the ambient RH starts to decrease. The solar-assisted desorption phase of the water harvesting cycle started typically between 10:00 and 11:00 hours local time. For water harvesting cycles with non-concentrated solar irradiance, the global horizontal irradiance (GHI) was measured directly using a pyranometer. For water harvesting cycles with 1.8x optical concentration with direct normal irradiance (DNI) was achieved by facing the sun, and the measured global normal irradiance (GNI) was used to evaluate DNI for a clear day in Arizona, United States (see section S3). In addition, as a consequence of tilting of the device at the elevation angle of solar irradiance, mass transfer was promoted due to buoyancy-assisted transport and condensation of the hot desorbed vapor (section S9). Due to the limited quantity of MOF-801 used in the device (~3 g), accurate measurement of the quantity of harvested water was not possible, albeit ~0.75 g of water production was expected. Therefore, validated computational predictions (see H. Kim, S. Yang, S. R. Rao, S. Narayanan, E. A. Kapustin, H. Furukawa, A. S. Umans, O. M. Yaghi and E. N. Wang, Science, 2017, 356, 430-434, which is incorporated by reference in its entirety) was used based on the measured conditions during the water harvesting cycles (ambient and condenser temperatures, RH, and appropriate solar flux) to evaluate deliverable water capacity (section S9).

Figures 15A, 15B:
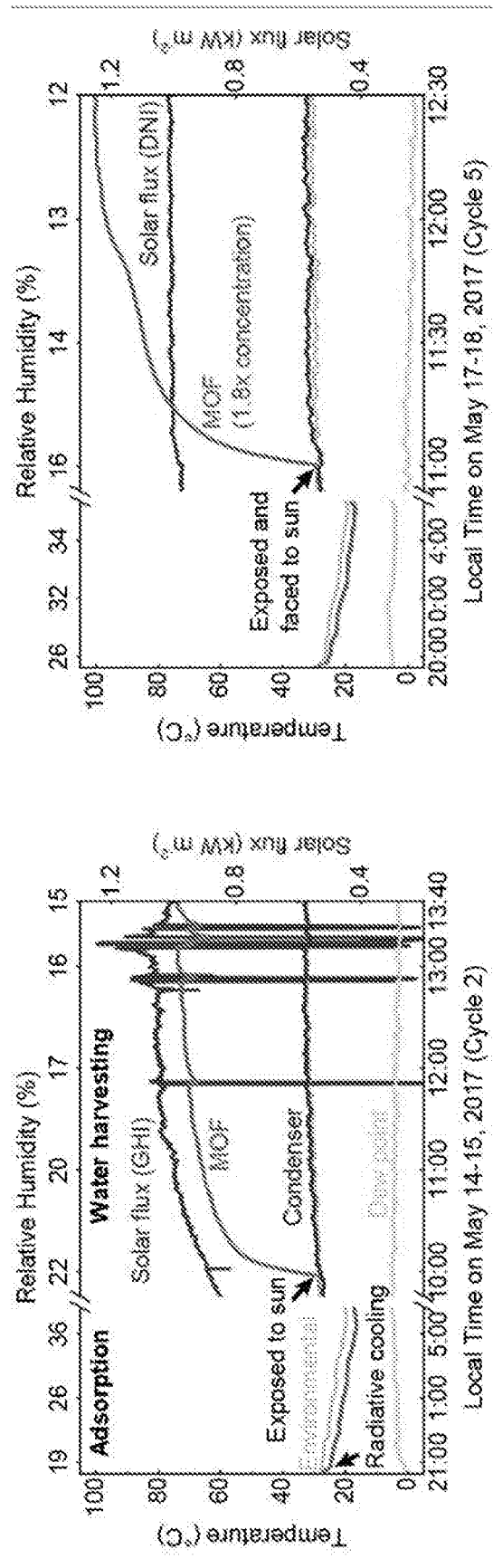
FIGS. 15A-15D show water harvesting test results.
Figure 15C:
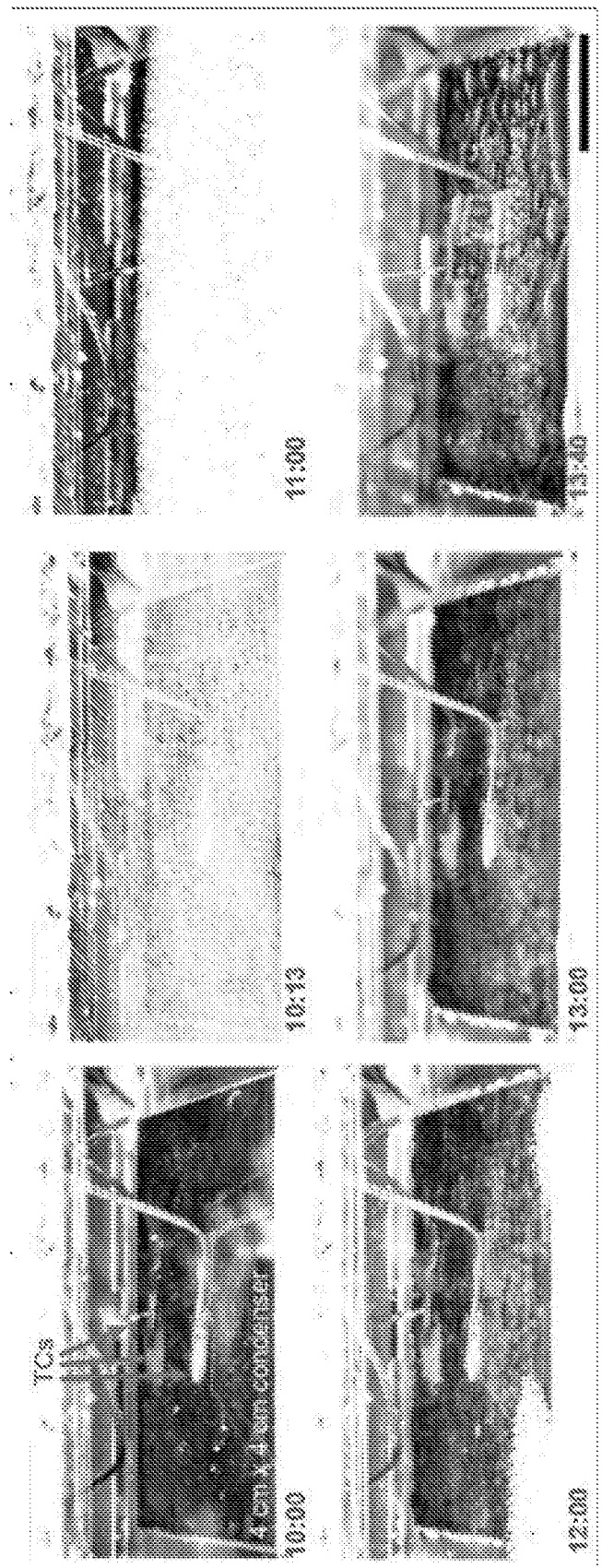
Figure 15D:
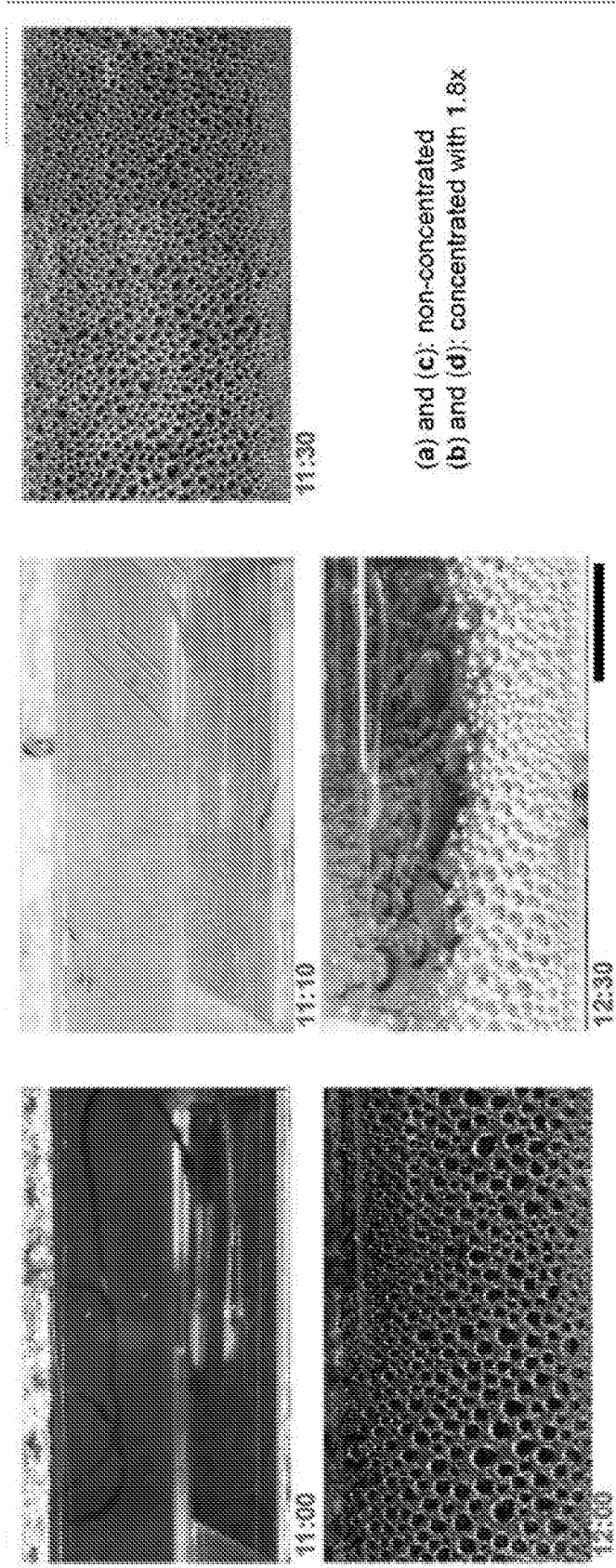

Representative water harvesting cycles: non-concentrated (May 14-15, 2017) and concentrated (May 17-18, 2017) with temperature profiles (MOF layer, environmental, dew point, and condenser), solar flux (global horizontal irradiance (GHI) or direct normal irradiance (DNI)), and RH measurements as a function of local time for representative non-concentrated (Cycle 2, May 14-15, 2017) and concentrated with 1.8× (Cycle 5, May 17-18, 2017) cycles, respectively, are shown in FIGS. 15A and 15B, respectively. In both figures, the upper abscissa indicates the measured RH at the local time of day (lower abscissa). The radiative cooling during the adsorption phase (between 20:00 and 06:00 hours) is also shown. During the desorption phase (starting between 10:00 and 11:00 hours the next day), the MOF layer temperature increased when exposed to incoming solar irradiation. FIGS. 15C-15D show representative photos illustrating droplet condensation on the copper plate condenser (4 cm by 4 cm) during water harvesting process as a function of local time for representative non-concentrated (cycle 2) and concentrated (cycle 5) cycles, respectively. Shortly after the solar exposure, the view port is fogged due to condensation of desorbed vapour for both cycles. Thermocouples (TCs) measuring the condenser, air gap, and the MOF layer temperatures are also shown. Due to the higher solar flux with the concentration, the rate of temperature increase of the MOF layer is significantly faster than the non-concentrated cycle, reducing the time required for desorption. Temperature slope change at ~11:45 local time indicates near completion of desorption. Predicted amount of harvested water for non-concentrated (cycle 2) and concentrated (cycle 5) cycles are ~0.12 L and ~0.28 L per kg of MOF, respectively. Scale bars are 1 cm.

The desorption started immediately following exposure to the solar irradiation and water condensation was observed on both the view port (fogging) and the condenser. The amount of fogging reduced over time as the enclosure walls and the air-vapor mixture inside the device heated up.

For the cycles carried out with optical concentration, the higher desorption temperatures (or desorption driving potential), can be inferred from FIG. 15B. In addition, the rate of regeneration was significantly faster than the predictions (section S9 and FIG. 25) due to buoyancy-assisted vapor transport during condensation (as the stage was tilted and faced the sun at the elevation and azimuth angles). The higher desorption temperatures associated with the concentrated case enabled complete desorption and this can be qualitatively deduced from the change in slope of the adsorber temperature in FIG. 15B (~11:45 local time). After complete desorption, most of the incident solar energy was available for sensible temperature rise leading to the slope change.

Figure 20D:
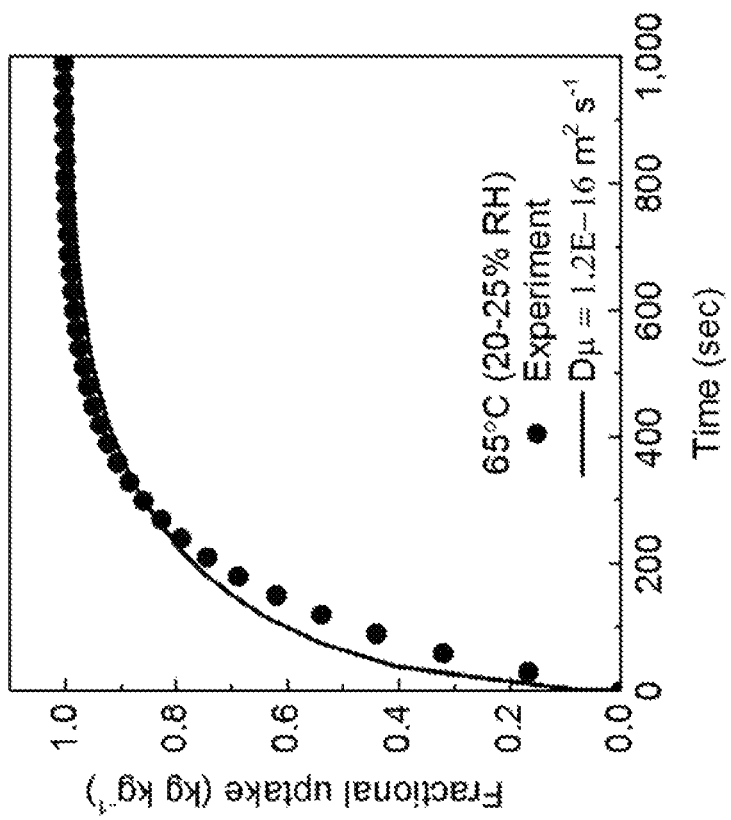
FIGS. 20C and 20D show fractional water uptake (kg $kg^{-1}$) as a function of time for MOF-801 characterized at 25 and 65° C. at 25% RH, respectively.
Figure 20C:
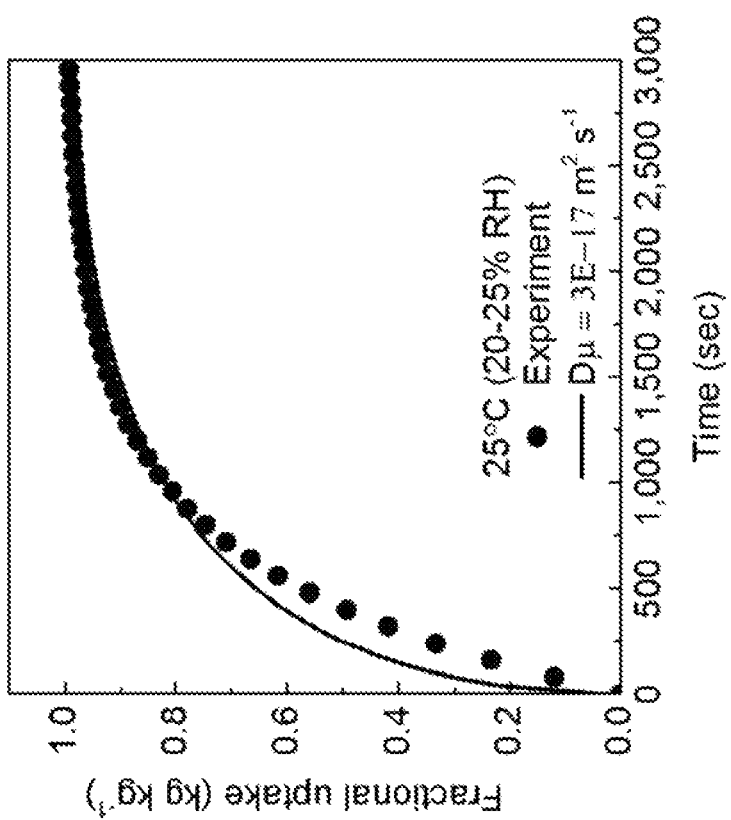
Figures 24A, 24B:
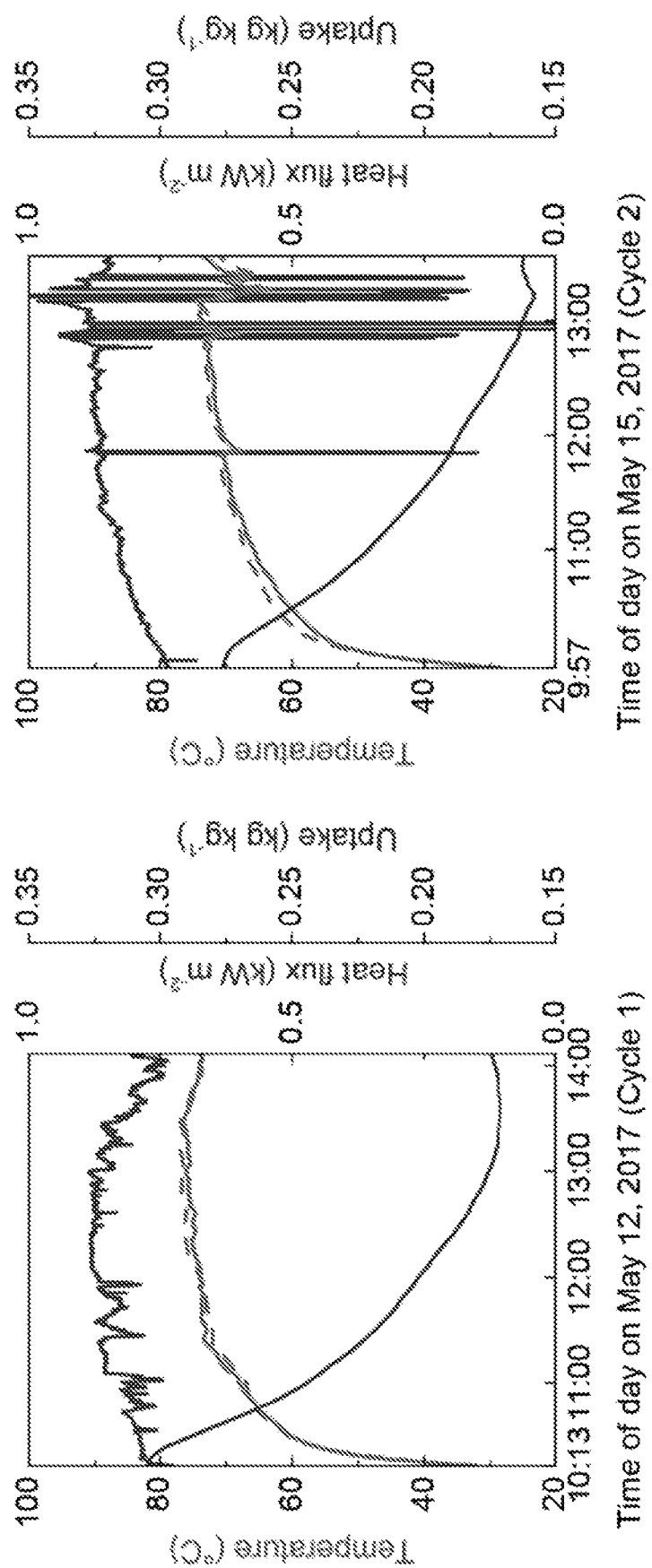
FIGS. 24A-24C show temperature profiles, heat flux for desorption and predicted vapor uptake during the water harvesting as a function of time of day for cycles 1, 2, and 3, respectively.
Figure 24C:
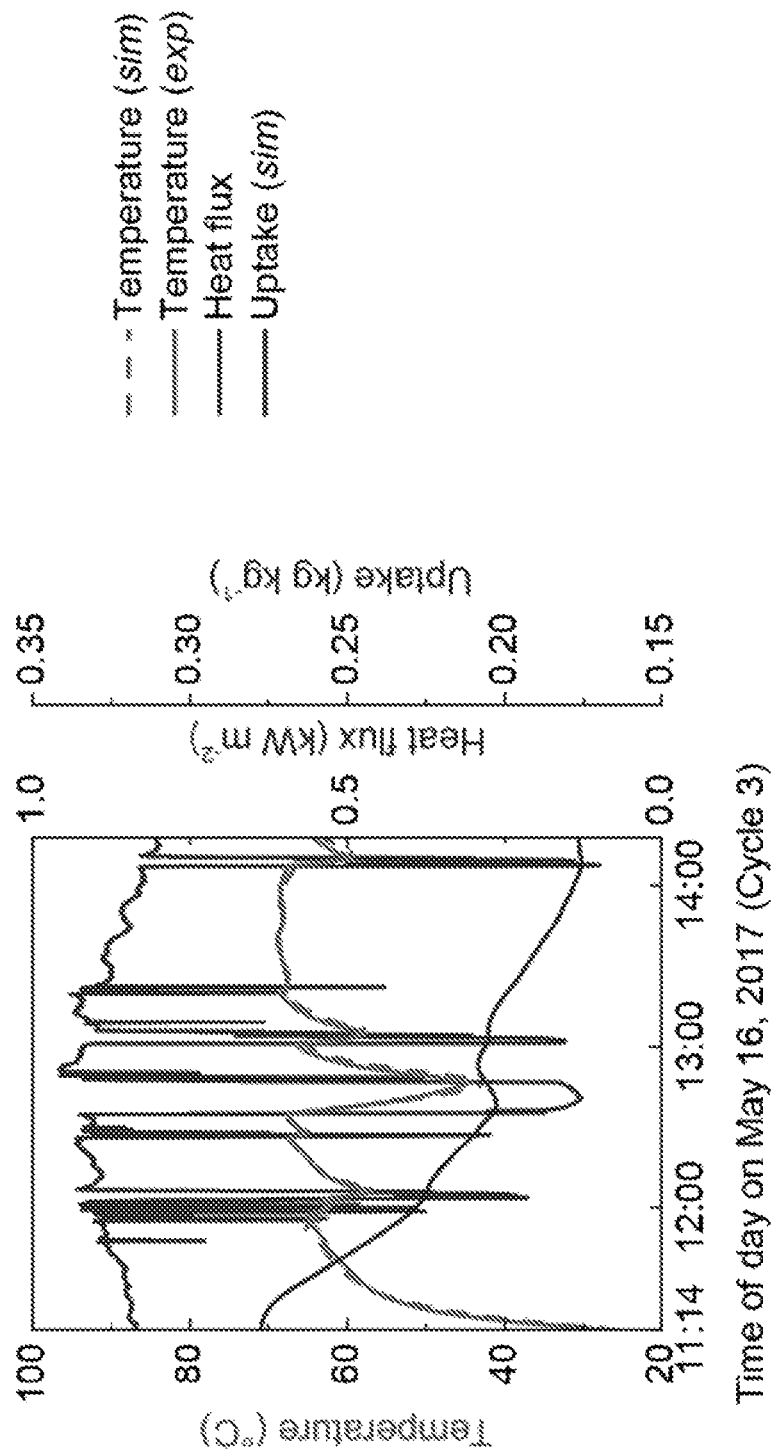

High-fidelity computational simulations based on the characteristics of MOF-801 (FIGS. 24 and 25) was used to predict the water harvesting capacity of the device. FIGS. 24A-24C show temperature profiles [Experimental (red solid line); predicted (red dotted line)], heat flux for desorption [(solar flux)*(optical and absorptance loss)], and predicted vapor uptake during the water harvesting as a function of time of day for cycles 1, 2, and 3, respectively. For cycle 1, an initial equilibrium RH of 55%, and for cycles 2 and 3, an initial RH of 40% was assumed based on the RH and radiative cooling measurements shown in FIGS. 15 and 23. For simplicity, a constant intracrystalline diffusion coefficient of $1.2E{-}16$ m$^2$ s$^{-1}$ was used for the simulation (FIG. 20D).

Figures 25A, 25B:
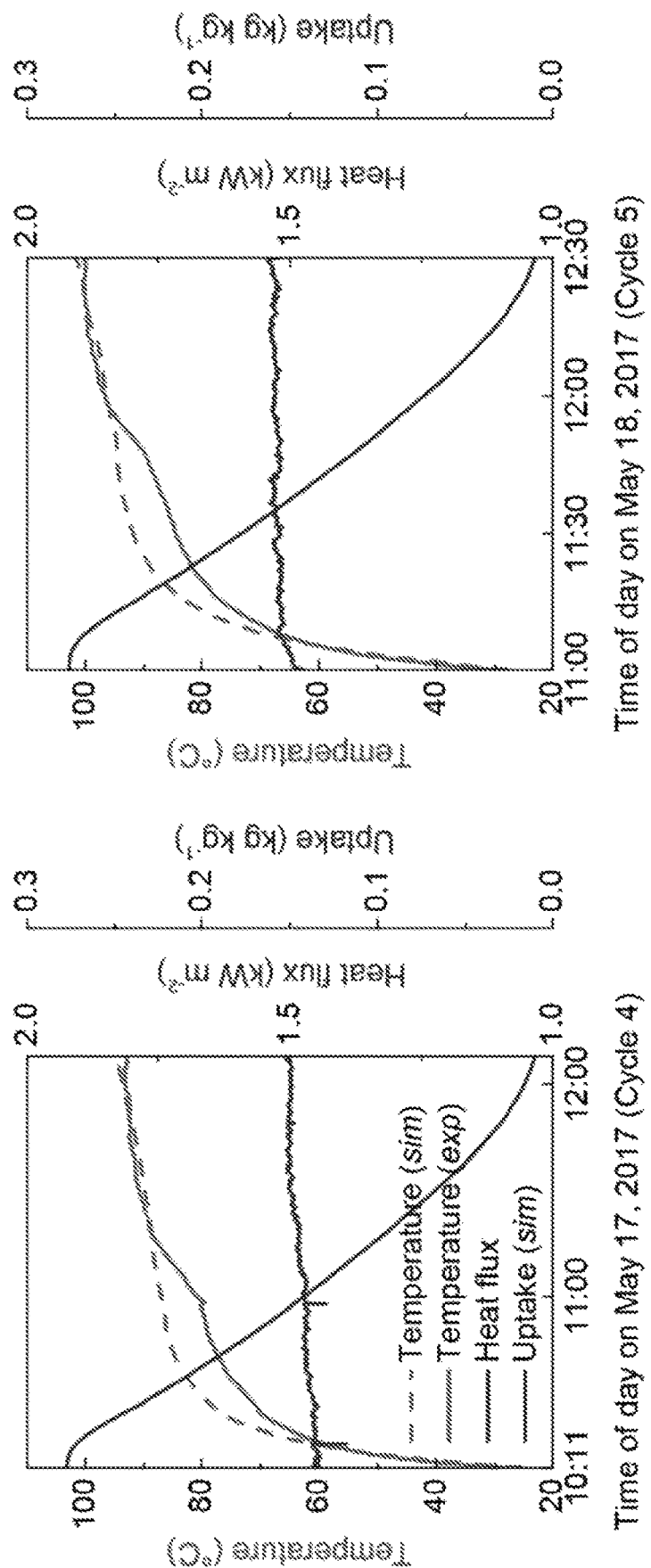
FIGS. 25A-25B show temperature profiles, heat flux for, and predicted vapor uptake during water harvesting as a function of time of day for cycles 4 and 5, respectively.

FIGS. 25A-25B show temperature profiles [Experimental (red solid line); predicted (red dotted line)], heat flux for desorption [(solar flux)*(optical and absorptance loss)*(optical concentration)], and predicted vapor uptake during water harvesting as a function of time of day for cycles 4 and 5, respectively. For both cycles, an initial equilibrium RH of 40% was assumed based on the RH and radiative cooling measurements shown in FIGS. 15 and 23. For simplicity, a constant intracrystalline diffusion coefficient of $1.2E{-}16$ m$^2$ s$^{-1}$ was used for the simulation (FIG. 20D).

Experimentally-measured ambient and condenser temperatures, solar flux, and RHs were used for the initial and boundary conditions. For the representative non-concentrated cycle, ~0.12 L of water per kg of MOF-801 was delivered following saturation at 40% RH (equilibrium uptake of ~0.28 kg kg$^{-1}$). From the equilibrium considerations presented in FIG. 13B, after the desorption phase, the residual uptake at ~13% RH (adsorber at 74° C. and P.sub..sat of 37 kPa; condenser at 33° C. and $P_{sat}$ of 5 kPa) is ~0.09 kg kg$^{-1}$, leading to a net water production capacity of ~0.19 L kg$^{-1}$ (liters per kg of MOF). However, due to the kinetic limitations, the residual uptake at the end of the desorption is predicted to be only ~0.16 kg kg$^{-1}$, leading to ~0.12 L kg$^{-1}$ water production capacity. The kinetic limitations are dictated by intra/intercrystalline diffusion within the MOF layer as well as the vapor diffusion between the MOF layer and condenser. Similarly, for a representative cycle with an optical concentration (1.8×), an adsorber temperature of 100° C. ($P_{sat}$ of 101 kPa) and a condenser temperature of 33° C. ($P_{sat}$ of 5 kPa), the water production capacity is predicted to be ~0.28 L kg$^{-1}$. This prediction is consistent with the estimate from the simulation (FIG. 25). Here, the kinetic limitations are overcome by the higher adsorber temperature as well as the buoyancy-assisted vapor transport during condensation.

As a result of the optical concentration and tilting of the device, a thermal efficiency gain is predicted to be ~5× in comparison to the non-concentrated cycle. Accordingly, with the concentration, the thermal efficiency is ~14% with input solar energy (product of DNI and optical concentration; herein, DNI is ~93% of GNI for the test location) and is ~3% for the non-concentrated cycle with GHI. The present device configuration and ambient conditions can deliver over ~0.34 L m$^{-2}$ cycle$^{-1}$ (liters per m$^2$ of MOF layer base area per cycle) with the 1.8× solar concentration.

Figure 27:
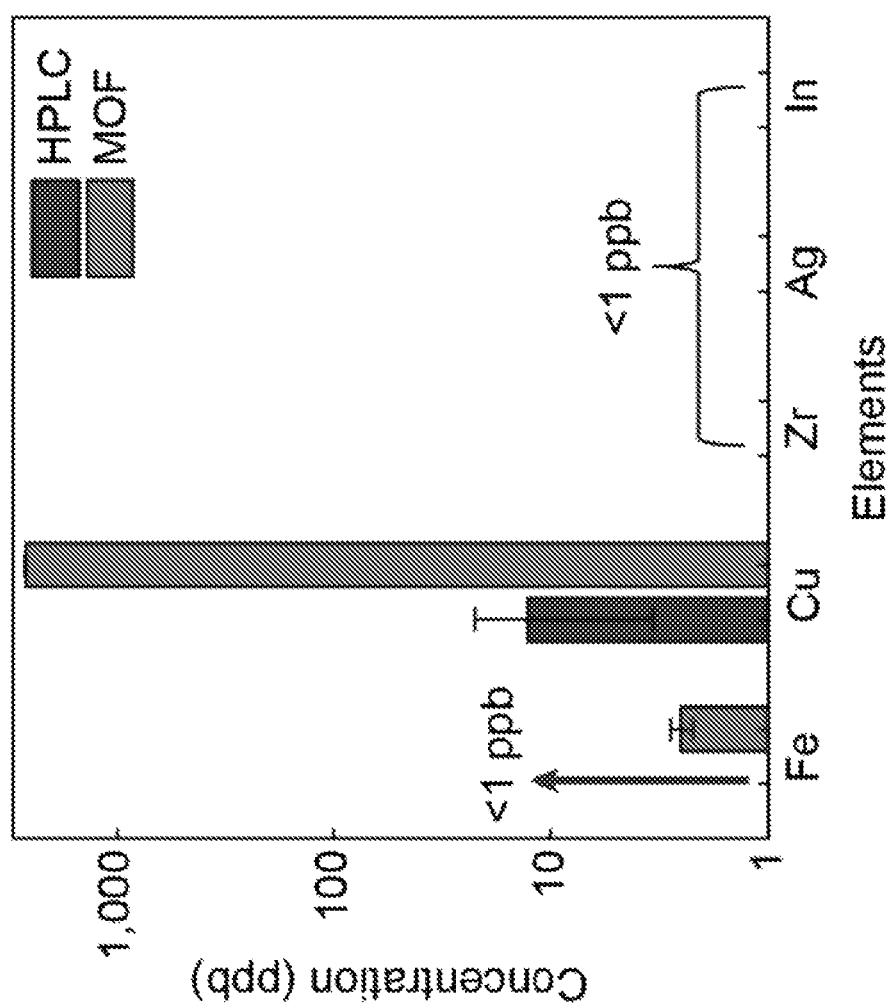
FIG. 27 shows ICP-MS analysis of control water (HPLC) and water collected from MOF-801 (MOF).
Figure 28:
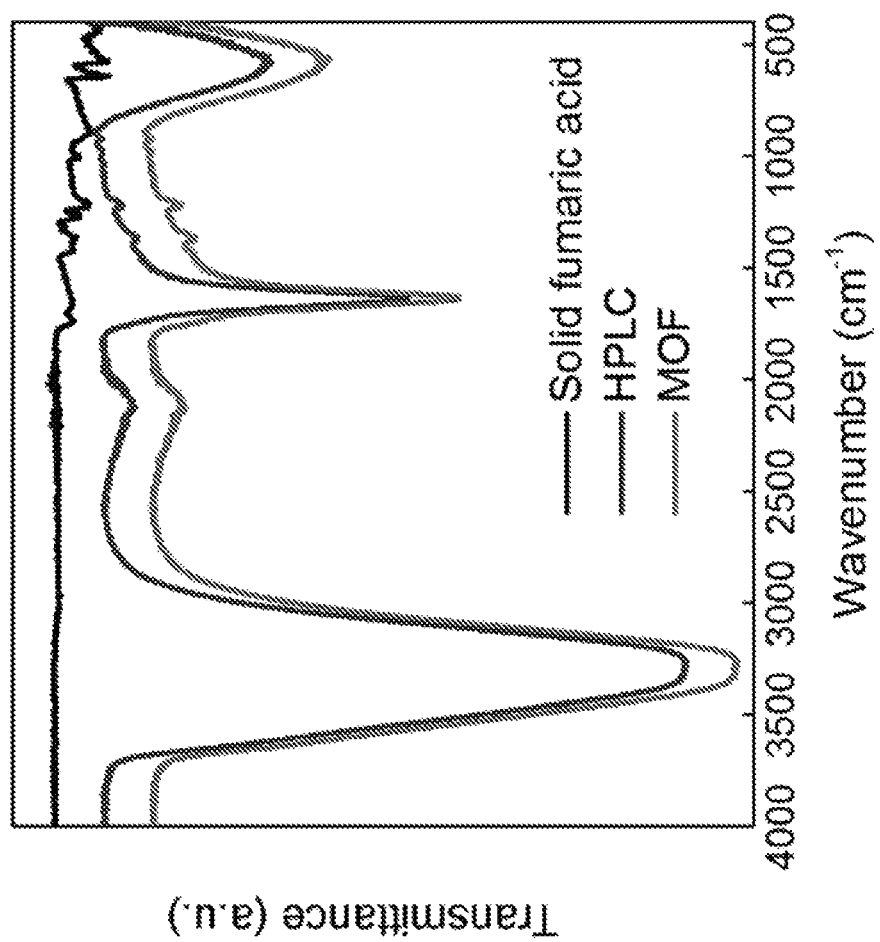
FIG. 28 shows comparison of FT-IR spectra (transmittance as a function of wavenumber) for solid fumaric acid, HPLC grade water (HPLC), and water collected from MOF-801 (MOF).

Though hydrothermal stability of MOF-801 has been extensively studied and well-established, the quality of the harvested water was quantitatively characterized using a bench-top adsorption cycling system that enables sufficient water collection (FIG. 26). Results from inductively coupled plasma-mass spectroscopy (ICP-MS) analysis indicate that the zirconium concentration in the water was found to be less than 1 ppb (parts per billion). In addition, the harvested water was analyzed using infrared spectroscopy and evidence of organic linkers (fumarate) was not found, indicating that the compositions from MOF-801 did not contaminate the harvested water (FIGS. 27 and 28). Iron (Fe; 56), copper (Cu; 63), zirconium (Zr; 90 and 91), silver (Ag; 107), and indium (In; 115) concentrations were analyzed. Zirconium, silver, and indium concentrations in both HPLC and MOF samples were found to be less than 1 ppb (part per billion), indicating that the compositions from MOF-801 did not contaminate the harvested water. Iron concentrations in the harvested water (MOF) and control water (HPLC) were ~3 ppb and less than 1 ppb, respectively.

The concept of using night-time radiative cooling to increase the effective RH experienced by the adsorber layer was also introduced and discussed in this work. This approach opens possibilities to use MOFs, such as MOF-841 (see H. Furukawa et al., Water adsorption in porous metal-organic frameworks and related materials. Journal of the American Chemical Society 136, 4369 (2014), which is incorporated by reference in its entirety) or $Co_2Cl_2BTDD$ (see J. Canivet, A. Fateeva, Y. Guo, B. Coasne, D. Farrusseng, Water adsorption in MOFs: fundamentals and applications. Chemical Society Reviews 43, 5594 (2014), which is incorporated by reference in its entirety) with adsorption step located at 25-30% RH, which have higher water uptake values and need even lower regeneration temperatures can be used in climates offer ~20% RH for adsorption.

While the chosen MOF-801 in this study can deliver ~0.34 L m$^{-2}$ cycle$^{-1}$ (or ~0.25 L kg$^{-1}$ cycle$^{-1}$), further improvements can be realized with the development of other adsorbents. For instance, with an identical device design and optimization, a cobalt-based MOF ($Co_2Cl_2BTDD$) with an adsorption capacity greater than 0.8 kg kg.sup.-1 at ~30% RH can lead to ~1 L m$^{-2}$ cycle$^{-1}$ of water output. While sorption kinetics of this MOF is relatively slower than MOF-801, the development of new adsorbents with enhanced sorption capacities and kinetics can ultimately lead to a significant increase in water harvesting output. Passive operation can be enabled with concentrating thermal energy with larger absorber areas or with stationary reflectors which eliminates the need for solar tracking (also see section S11). See G. Ni, G. Li, S. V. Boriskina, H. Li, W. Yang, T. Zhang and G. Chen, Nature Energy, 2016, 1, 16126, and S. A. Kalogirou, Progress in Energy and Combustion Science, 2004, 30, 231-295, each of which is incorporated by reference in its entirety.

Furthermore, considerations presented in this work can be extended to a higher output system by integrating multi-layer adsorbent stacks into a compact bed-type architecture, common to many classes of adsorption systems. See H. Demir, M. Mobedi and S. Ulku, Renewable and Sustainable Energy Reviews, 2008, 12, 2381-2403, S. Narayanan, X. Li, A. Umans, H. Kim and E. N. Wang, Annual Review of Heat Transfer, 2017, 19, 1989, and S. Narayanan, H. Kim, A. Umans, S. Yang, X. Li, S. N. Schiffres, S. R. Rao, I. S. McKay, C. A. R. Perez and C. H. Hidrovo, Applied Energy, 2017, 189, 31-43, each of which is incorporated by reference in its entirety. The merit of the bed-type architecture is that in addition to solar-thermal, waste heat or low-infrastructure sources of energy such as biomass can be used to drive the desorption process (eliminating the need for a planar adsorber). While such a system configuration can enable higher output, the limitation of this approach is the need for auxiliary components (e.g., pumps) and higher system complexity to efficiently route the thermal energy to the various layers in the stack. The required heat storage capacity and source temperatures would need to be determined based on the required temperature difference between the adsorber and the condenser, which can be inferred from the adsorption isotherm. This demonstration indicates that adsorption-based water harvesting strategy is applicable and a promising solution to solve water scarcity in arid climates.

S1. Synthesis and Characterization of Microcrystalline Powder MOF-801

In a 500 mL screw-capped jar, 5.8 g (50 mmol) of fumaric acid (Fluka, 99%) and 16 g (50 mmol) of $ZrOCl_2.8H_2O$ (Alfa Aesar, 98%) were dissolved in a mixed solvent of DMF and formic acid (200 mL and 70 mL, respectively). The mixture was then heated in an isothermal oven at 130° C. for 6 hours to give as-prepared MOF-801 as white precipitate. The precipitate from three reaction jars was collected by filtration apparatus using a membrane filter (45 μm pore size), washed three times with 100 mL DMF, three times 100 mL methanol, and dried in air. Air-dried MOF sample was transferred to a vacuum chamber. The chamber was first evacuated at room temperature for 5 hours until the pressure dropped below 1 kPa. After that, the sample was heated in vacuum at 70° C. for 12 hours, and then at 150° C. for another 48 hours. This finally gave activated MOF-801 as a white powder (yield: 30 g).

Figure 16:
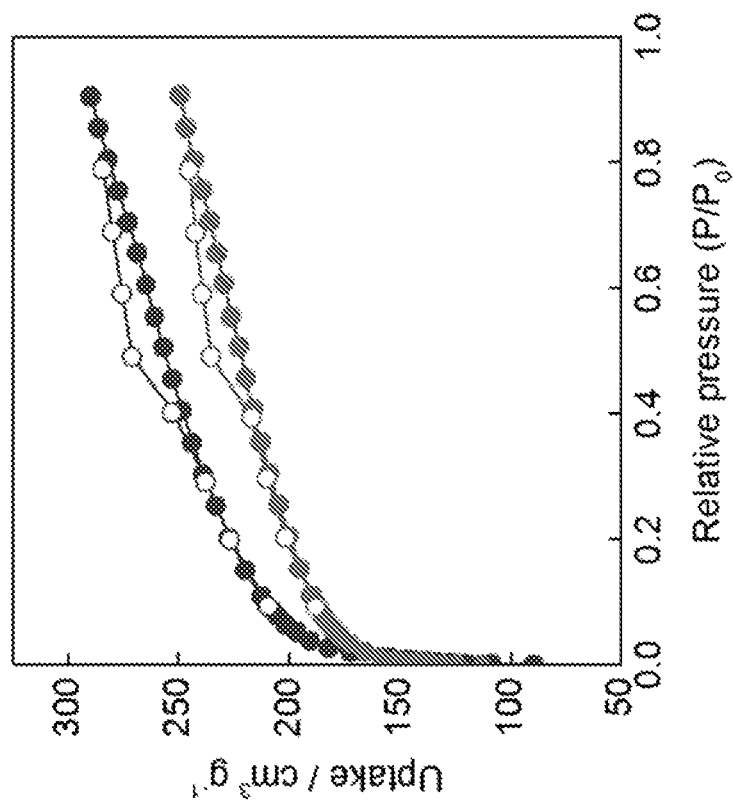
FIG. 16 shows S1-N2 (red) and Ar (blue) isotherm of MOF-801 at 77 K and 87 K as functions of relative pressure, respectively.

Low-pressure gas ($N_2$ and Ar) adsorption isotherms (FIG. 16) were measured using volumetric gas adsorption analyzer (Autosorb-1, Quantachrome). Liquid nitrogen and argon baths were used for the measurements at 77 and 87 K, respectively. The powdered particle density ($\rho_p$) of activated MOF-801 was estimated to be 1400±20 kg m$^{-3}$ from the pycnometer (Ultrapyc 1200e, Quantachrome) (skeletal density $\rho_s$=2.6991 g cm$^{-3}$) and BET pore volume measurements ($V_P$=0.3425 cm$^{-3}$ g) using the following equation: $\rho_s=1/(V_P+1/\rho_S)$.

S2. Device Fabrication

The adsorber layer was fabricated by first brazing a porous copper foam (~100 pores per inch or ppi), 0.26 cm thick, onto a copper plate (5 cm×5 cm×0.17 cm). The activated MOF-801 was infiltrated into this foam-plate structure by immersion drying in a ~50 wt. % aqueous dispersion. The copper foam provided structural rigidity and helped intrinsically low thermal conductivity of the porous MOF. The layer was then dried under vacuum for 4 hours at temperature of 70° C. and the total mass dehydrated MOF-801 was characterized to be 2.98 g. This corresponds to a packing density of 464 kg m$^{-3}$ (dry) and a porosity of 0.67. In order to enhance solar absorption, the back side of the adsorber was coated with Pyromark paint. This coating was optically characterized using a UV-Vis-NIR spectrophotometer (Cary 5000, Agilent) and found to have a solar-weighted absorptivity of 0.95.

The adsorber layer was then integrated into an enclosure constructed with acrylic sheets (0.318 cm thick). The top face was designed with a cut-out, equal in size to the adsorber layer (5 cm×5 cm) and pilot holes to suspend the adsorber layer with nylon strings. Any gaps found between the side walls of the adsorber layer and the cut out were sealed with high temperature vacuum grease (Dow Corning). In addition, a layer of transparent polyethylene wrap was stretched over the entire top face and sealed against the side walls. Both these measures prevented leakage of any desorbed vapor. Thermal insulation (white in color) was attached on all side walls except the view port. The adsorber side was completed by placing a piece of optically transparent and thermally insulating aerogel (OTTI) measuring 5 cm×5 cm×1 cm. The optical characterization of the OTTI aerogel is presented in section S6. The bottom face of the enclosure was made with a 4 cm×4 cm cut-out to enable integration with a condenser assembly. The condenser assembly comprised a 4 cm×4 cm×0.6 cm polished copper piece which was bonded with high conductivity thermal epoxy (Omega Therm, Omega Engineering) to a heat pipe heat sink (NH-L9x65, Noctua). The air-cooled heat sink, consists of a finned heat pipe array with a fan which consumes ~0.9 W of electrical power to dissipate the condensation heat. The finished device measured 7 cm×7 cm×3.2 cm (excluding the heat sink, fan, insulation, and aerogel) and was mounted on a stage with adjustable tilt to enable experiments under both global horizontal (no optical concentration, no tilt) and normal irradiance (with optical concentration of 1.8× and tilt at elevation angles of 55 to 75 degrees and azimuth angles of 100 to 180 degrees).

S3. Experimental Procedure

The water harvesting experiment comprised of two phases: night-time vapor adsorption and day-time water harvesting and condensation. During vapor adsorption, typically started at 20:00 hours local time (UTC/GMT—7 hours), the adsorber layer with its acrylic frame was mounted into cover of an air-tight food storage container with the pyromark coated side up for night-time radiative cooling (FIG. 17). The sides of the air-tight container were modified to fit a fan (0.9 W; 12 VDC) and enable cross flow of ambient air (vapor source). Two T-type thermocouple (5TC series, Omega Engineering) were used to measure the temperature of the adsorber layer during adsorption. In order to estimate the extent of radiative cooling and ambient temperature, another T-type thermocouple was placed in the air stream of another fan. Relative humidity measurements were made with a capacitive RH sensor (RH820U, Omega Engineering). Transparent polyethylene wrap was used to suppress convective heat loss on the black absorber side of the layer. Prior to the exposure to the clear sky, the MOF layer was let it equilibrated to the ambient air by covering the container cover with aluminum foil. Upon the exposure to the sky for radiative cooling by removing the foil, an instant temperature drop of ~3 K below ambient was observed, as shown in FIGS. 15A and 15B. Adsorption was allowed to occur overnight and the sample was sealed into the device (between 06:00 and 07:00 hours local time) to prevent undesired loss of water due to the RH swing.

The procedure for water release and condensation typically started between 10-11:00 hours local time. In addition to the two T-type thermocouples embedded into the adsorption layer, three additional T-type thermocouples were used to measure temperatures: two for the copper condenser plate and one for the vapor space between the adsorber layer and the condenser plate. Ambient humidity and temperature conditions were recorded as described during the adsorption phase. The heat of condensation was dissipated to the ambient through the heat sink and fan operating at 0.9 W. The incoming solar irradiation (both global horizontal (GHI) and global normal (GNI) irradiations) were measured with a pyranometer (LP02-C, Hukseflux). The measured GNI was used to evaluate the DNI as: DNI=GNI-DI (diffuse irradiance) according to the weather data available from a weather station in Tucson, Ariz. (available at NREL, SOLRMAP University of Arizona (OASIS)) for clear days in May 2017. The ratio between the GNI and DNI was found to be 0.93 and it matched well to an available correlation'. The area ratio between the lens and solar absorber surface is ~2.5, however, the achieved optical concentration of 1.8× was due to transmittance loss of the lens and the square solar absorber area being circumscribed by the circular concentrated solar irradiance (FIG. 14A). The actual optical concentration achieved with the concentrating lens was characterized to be 1.8× for the focal distance during the outdoor experiments with a thermopile detector (919P-040-50, Newport) and a solar simulator (92192, Newport Oriel). Solar transmittance of the transparent polyethylene wrap, ~0.93, was characterized with the pyranometer under direct solar irradiance. Images were acquired with a digital camera (EOS DS126211, Canon) to visualize the condensation process (FIG. 15). At the end of desorption, the MOF layer and its acrylic frame were extracted from the device to prevent re-adsorption of condensed water and isolated in an air-tight box. The adsorber assembly was only removed in the evening time to restart the adsorption phase for the next cycle.

S4. Theoretical Modeling Framework

A theoretical model based on mass and energy conservation was used to predict the adsorption-desorption dynamics and the extent of regeneration for MOF-801 during the solar-assisted desorption process using the following governing equations (see K. Chan, C. Y. Chao, G. Sze-To and K. S. Hui, International Journal of Heat and Mass Transfer, 2012, 55, 3214-3224. Solmu, D. A. S. Rees, C. Yamali and D. Baker, International Journal of Heat and Mass Transfer, 2012, 55, 5275-5288, S. Narayanan, S. Yang, H. Kim and E. N. Wang, International Journal of Heat and Mass Transfer, 2014, 77, 288-300, S. Narayanan, H. Kim, A. Umans, S. Yang, X. Li, S. N. Schiffres, S. R. Rao, I. S. McKay, C. A. R. Perez and C. H. Hidrovo, Applied Energy, 2017, 189, 31-43, and H. Kim, S. Yang, S. R. Rao, S. Narayanan, E. A. Kapustin, H. Furukawa, A. S. Umans, O. M. Yaghi and E. N. Wang, Science, 2017, 356, 430-434, each of which is incorporated by reference in its entirety:

$$\frac{\partial C}{\partial t} = \nabla \cdot D_v \nabla C - \frac{(1-\varepsilon)}{\delta x \varepsilon} \frac{\partial C_\mu}{\partial t} \tag{S14}$$

$$\rho c_p \frac{\partial C}{\partial t} = \nabla \cdot k \nabla T + h_{ad}(1-\varepsilon) \frac{\partial C_\mu}{\partial t} \tag{S15}$$

Eqn (4) describes mass conservation of the vapor during diffusion and adsorption/desorption within the packed MOF layer. Here, C, is the local vapor concentration (mol m$^{-3}$), is $\partial C_\mu/\partial t$ the average instantaneous rate of vapor adsorption/desorption, $\varepsilon$ is the porosity, and $D_v$ is the intercrystalline diffusivity of vapor (m$^2$ s$^{-1}$). The vapor concentration (mol m$^{-3}$) can be expressed from the ideal gas law, C=PR$^{-1}$T$^{-1}$, where P, R, and T denote the pressure (Pa), universal gas constant (J mol$^{-1}$ K$^{-1}$), and temperature (K). The effective vapor intercrystalline diffusivity, $D_v$, in an air-vapor mixture with consideration of both Knudsen and molecular diffusions in tortuous porous media can be estimated as (see H. Kim, S. Yang, S. R. Rao, S. Narayanan, E. A. Kapustin, H. Furukawa, A. S. Umans, O. M. Yaghi and E. N. Wang, Science, 2017, 356, 430-434, J. R. Welty, C. E. Wicks, G. Rorrer and R. E. Wilson, Fundamentals of Momentum, Heat, and Mass Transfer, John Wiley & Sons, 2009, T. Marshall, Journal of Soil Science, 1959, 10, 79-82, and P. Moldrup, T. Olesen, J. Gamst, P. Schjonning, T. Yamaguchi and D. Rolston, Soil Science Society of America Journal, 2000, 64, 1588-1594, each of which is incorporated by refenrece in its entirety), $$D_v = \varepsilon^{3/2} \left( \frac{1}{D_{vap}} + \frac{1}{D_{K,vap}} \right)^{-1} \tag{S16}$$

where $D_{vap}$ and $D_{K,vap}$ are vapor molecular diffusivity in air and Knudsen diffusivity of vapor, respectively.

In Eqns (4) and (5), $C_\mu$ is the vapor concentration within an adsorbent crystal, and the average instantaneous rate of adsorption/desorption, $\partial C_\mu/\partial t$, can be approximated with the linear driving force model (see K. Chan, C. Y. Chao, G. Sze-To and K. S. Hui, International Journal of Heat and Mass Transfer, 2012, 55, 3214-3224, S. Narayanan, S. Yang, H. Kim and E. N. Wang, International Journal of Heat and Mass Transfer, 2014, 77, 288-300, S. Narayanan, H. Kim, A. Umans, S. Yang, X. Li, S. N. Schiffres, S. R. Rao, I. S. McKay, C. A. R. Perez and C. H. Hidrovo, Applied Energy, 2017, 189, 31-43, H. Kim, S. Yang, S. R. Rao, S. Narayanan, E. A. Kapustin, H. Furukawa, A. S. Umans, O. M. Yaghi and E. N. Wang, Science, 2017, 356, 430-434, and S. Sircar and J. Hufton, Adsorption, 2000, 6, 137-147, each of which is incorporated by reference in its entirety).

$$\frac{\partial C\mu}{\partial t} = \frac{15}{r_c^2} D_u (C_{eq} - C_u) \quad \text{(S17)}$$

In Eqn (S17), $D_\mu$, represents the diffusivity of vapor inside an adsorbent crystal (intracrystalline), $r_c$ is adsorbent crystal radius (m), and $C_{eq}$ is the equilibrium vapor concentration corresponding to instantaneous local temperature and vapor pressure. $r_c$ and $D_\mu$ were characterized experimentally, and $C_{eq}$ can be estimated from a linear interpolation of the adsorption isotherms (FIG. 20A). Isotherm at 105° C. was predicted from the characteristic curve (see M. F. de Lange, K. J. Verouden, T. J. Vlugt, J. Gascon and F. Kapteijn, Chemical Reviews, 2015, 115, 12205-12250, which is incorporated by reference in its entirety) based on the 85° C. isotherm.

Eqn (5) represents energy conservation within the MOF layer. Here, $pc_p$ represents the average heat capacity (J m$^{-3}$K$^{-1}$), k is the thermal conductivity (W m$^{-1}$ K$^{-1}$), and h$_{ad}$ is the enthalpy of adsorption (J mol$^{-1}$) for MOF-801 and water (~55 kJ mol$^{-1}$). See H. Kim, H. J. Cho, S. Narayanan, S. Yang, H. Furukawa, S. Schiffres, X. Li, Y.-B. Zhang, J. Jiang and O. M. Yaghi, Scientific Reports, 2016, 6, which is incorporated by reference in its entirety. The effective thermophysical properties were evaluated to include the contributions from the metallic copper foam (~3 W m$^{-1}$ K$^{-1}$, porosity of ~0.95), MOF-801 (specific heat capacity of 760 J kg$^{-1}$ K$^{-1,6}$), and the adsorbed water (assumed to be in a liquid state). In Eqn (5), the advection term is neglected due to the high effective thermal conductivity of the MOF layer owing to the metallic binder (copper foam).

During the solar-assisted desorption, desorbed vapor is transported and condensed via diffusion in air. For the orientation of the device described in FIG. 13A, diffusional vapor transport between the MOF layer and the condenser can be approximated using Fick's law of diffusion where x represents the spatial coordinate:

$$\frac{\partial C}{\partial t} = D_{vap} \frac{\partial^2 C}{\partial x^2} \quad \text{(S18)}$$

S5. Packing Density and Estimation of Intercrystalline Diffusivities

The effective intercrystalline diffusion is a function of spacing between the packed adsorbent particles and temperature. The characteristic void size of a random packing of spherical particles of uniform size can be estimated using a probability distribution (see S. Narayanan, S. Yang, H. Kim and E. N. Wang, International Journal of Heat and Mass Transfer, 2014, 77, 288-300 and M. Alonso, E. Sainz, F. Lopez and K. Shinohara, Chemical Engineering Science, 1995, 50, 1983-1988, each of which is incorporated by reference in its entirety), on the basis of its average packing porosity (c) and the porosity corresponding to the maximum packing density of hexagonally packed spheres ($c_m$)) as:

$$P(\chi) = 3(1+\chi)^2 \quad \text{(S19)}$$
$$\frac{\varepsilon(1-\varepsilon)(1-\varepsilon_{HCP})}{(\varepsilon - \varepsilon_{HCP})} \exp\left(-\frac{(1-\varepsilon)(1-\varepsilon_{HCP})}{(\varepsilon - \varepsilon_{HCP})}[(1+\chi)^3 - 1]\right)$$

The average porosity (c) was calculated from the measured MOF layer density ($\rho_{layer}$) and the estimated particle density ($\rho_p$) of the activated MOF-801 (1400.+−0.20 kg m$^{-3}$) using Eqn (S20). The porosity of the MOF-801 layer is determined to be 0.67.

$$\varepsilon = 1 - \frac{\rho_{layer}}{\rho_p} \quad \text{(S20)}$$

The characteristic void size ($d_p$) based on this distribution can be estimated as, $d_p = 2r_c X_{avg}$, where $r_c$ is the MOF crystal radius, and $X_{avg}$ is defined as:

$$\chi_{avg} = \frac{1}{\varepsilon} \int_0^\infty \chi P(\chi) d\chi \quad \text{(S21)}$$

Figure 18:
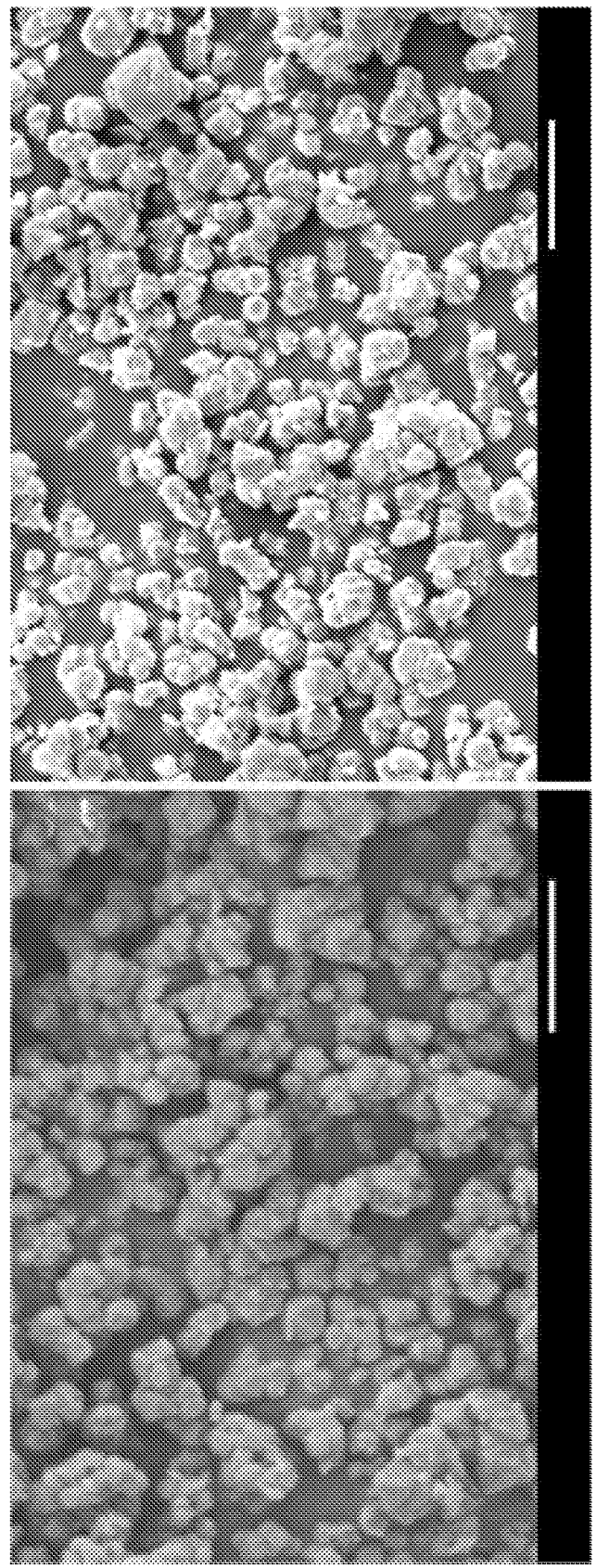
FIG. 18 shows SEM images of powdered MOF-801.

The average crystal diameter of MOF-801 (~1 μm) was characterized using a scanning electron microscope (6010LA SEM, JEOL), as shown in FIG. 18 (crystal diameter of MOF-801 is 1.+−0.015 μm, mean value and error (standard deviation) were obtained from image analysis using ImageJ software. Scale bars are 5 μm), and assumed uniform for the estimation of the void size.

Figure 19:
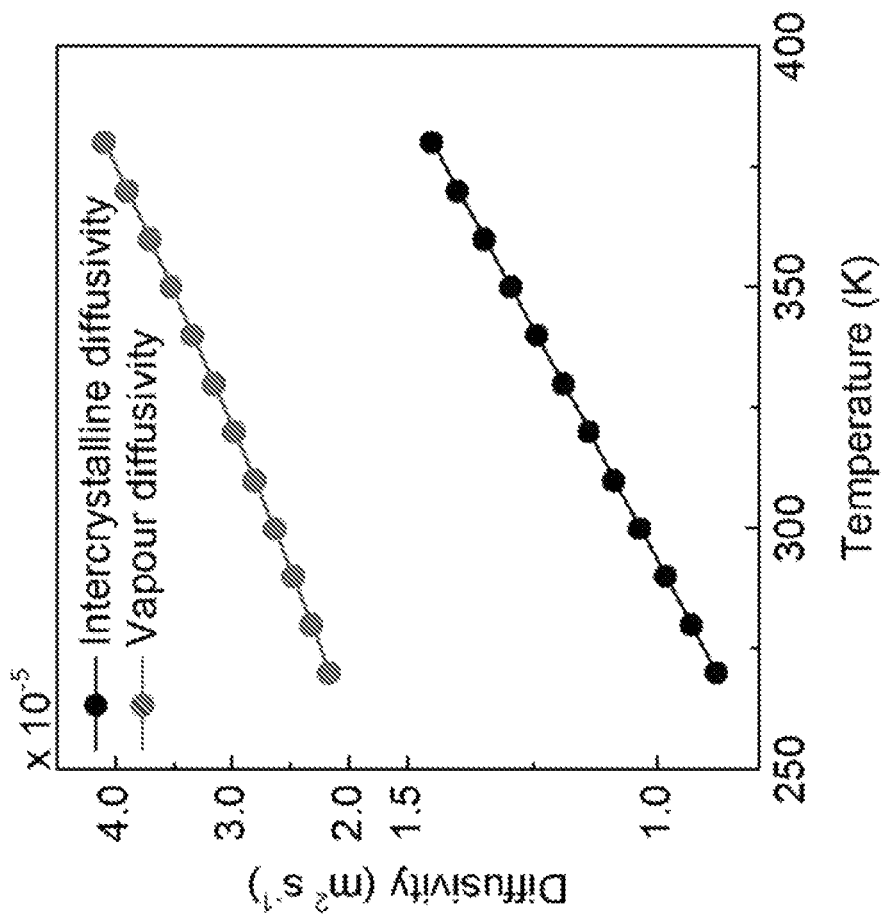
FIG. 19 shows effective intercrystalline vapor diffusivity of packed MOF-801 in air (black) as a function of temperature for the porosity of 0.67 and crystal diameter of 1 μm. Vapor diffusivity in air (red) as a function of temperature is also shown for comparison.

The effective intercrystalline diffusivity can be computed using Eqn (S16), where the Knudsen diffusivity is $D_K$, vap=$(d_p/3)$ {square root over (8RT/.pi.M)}, and the $d_p$ is ~0.34 μm for the porosity of 0.67 and uniform crystal diameter of 1 μm. The diffusion coefficient of vapor in air at atmospheric pressure as a function of temperature can be obtained using the following relation (see J. R. Welty, C. E. Wicks, G. Rorrer and R. E. Wilson, Fundamentals of Momentum, Heat, and Mass Transfer, John Wiley & Sons, 2009, which is incorporated by reference in its entirety), $$D_{vap,T} = D_{vap,ref} \left(\frac{T}{T_{ref}}\right)^{3/2} \left(\frac{\Omega_{D,ref}}{\Omega_{D,T}}\right) \quad \text{(S22)}$$

where $D_{vap}$ and $\Omega_D$ are the vapor diffusion coefficient and collision integral (see J. O. Hirschfelder, R. B. Bird and E. L. Spotz, Chemical Reviews, 1949, 44, 205-231, which is incorporated by reference in its entirety), respectively, and subscript ref denotes reference value. Effective intercrystalline and vapor diffusivities in air are plotted in FIG. 19 using Eqns (S16) and (S22), respectively.

S6. Adsorption Isotherms and Estimation of Intracrystalline Diffusivities of MOF-801

Vapor adsorption isotherms of MOF-801 were characterized using an adsorption analyzer (Q5000 SA, TA instruments) at 15, 25, 45, 65, and 85° C. (FIG. 20A). The adsorption isotherm at 105° C. was predicted using the characteristic curve based on the 85° C. isotherm, vapor uptake as a function of adsorption potential: A=RT ln(P$_{sat}$/P). See M. F. de Lange, K. J. Verouden, T. J. Vlugt, J. Gascon and F. Kapteijn, Chemical Reviews, 2015, 115, 12205-12250, which is incorporated by reference in its entirety. The vapor adsorption isotherm of MOF-801 before and after water harvesting cycles is also shown in FIG. 20B, indicating the hydrothermal stability of MOF-801. Dotted data (experimental) and solid line (fitting from Eqn (12)).

Using the dynamic adsorption behavior (i.e., rate of mass adsorbed as a function of time), intracrystalline vapor diffusivity of MOF-801 was estimated using the following relation (see J. Crank, The Mathematics of Diffusion, Oxford University Press, 1979, which is incorporated by reference in its entirety) where homogeneous pore structure is assumed, constant spherical adsorbent crystals of radius ($r_c$), and constant surface concentration and diffusivity ($D_\mu$), $$\frac{m_r}{m_{eq}} = 1 - \frac{6}{\pi^2} \sum_{n=1}^{\infty} \left(\frac{1}{n^2}\right) \exp\left(-\frac{n^2 \pi^2 D_\mu t}{r_c^2}\right) \quad (S23)$$

where m.sub.t/m.sub.eq is the fractional water uptake with $m_r=0$ at $t=0$ and $m_r=m_{eq}$ as $t \to \infty$ for a sufficiently small pressure and uptake step. The effective intracrystalline (Fickian) diffusivity of MOF-801 at 25 and 65° C. were estimated by fitting Eqn (12) with the experimental measurements, as shown FIGS. 20C and 20D, respectively. For the macroscopic modelling framework outlined, it is essential to define a characteristic intracrystalline diffusivity.sup.6, therefore, constant intracrystalline diffusivities at 25° C. or 65° C. (25% RH) were used for the theoretical prediction.

S7. Synthesis and Optical Characterization of OTTI Aerogel

The optically transparent and thermally insulating (OTTI) silica aerogel was synthesized by sol-gel polymerization of tetramethyl orthosilicate (TMOS, 131903, Sigma Aldrich), using an ammonia solution ($NH_3$, 2.0M in Methanol, 341428, Sigma Aldrich) as a catalyst to promote both hydrolysis and condensation reactions. See E. Strobach, B. Bhatia, S. Yang, L. Zhao and E. N. Wang, Journal of Non-Crystalline Solids, 2017, 462, 72-77, and L. Zhao, S. Yang, B. Bhatia, E. Strobach and E. N. Wang, AIP Advances, 2016, 6, 025123, each of which is incorporated by reference in its entirety. TMOS was diluted by methanol (MeOH, 322415, Sigma Aldrich) followed by addition of NH.sub.3 and water. The mixing molar ratio of chemicals was NH.sub.3:TMOS:water:methanol=0.004:1:4:6. Then, the solution was gelled in a disposable polystyrene container. After 2 weeks, the container was dissolved away using acetone. The mother solvent was replaced with ethanol (EtOH, 89234-848, VWR) to be prepared for critical point drying (CPD, model 931, Tousimis) as EtOH is miscible with liquid $CO_2$. To dry the wet gels in EtOH without cracks, it is important to dry them slowly to minimize capillary pressure during the CPD process. A bleed rate of 100 psi/hr was used to decrease the CPD chamber pressure from ~1300 psi to ambient pressure. After drying, the monolithic aerogels were annealed at 400° C. for 24 hours to maximize their transmittance. The aerogel was cut to the final size using a laser cutter (Epilog Zing). Experimentally measured solar transmittance and predicted thermal conductivity (see U. Heinemann, R. Caps and J. Fricke, International Journal of Heat and Mass Transfer, 1996, 39, 2115-2130, and L. W. Hrubesh and R. W. Pekala, Journal of Materials Research, 1994, 9, 731-738, each of which is incorporated by reference in its entirety) of the 8 mm thick OTTI aerogel are shown in FIGS. 21A and 21B, respectively.

S8. Optimization of MOF Layer

Figure 22:
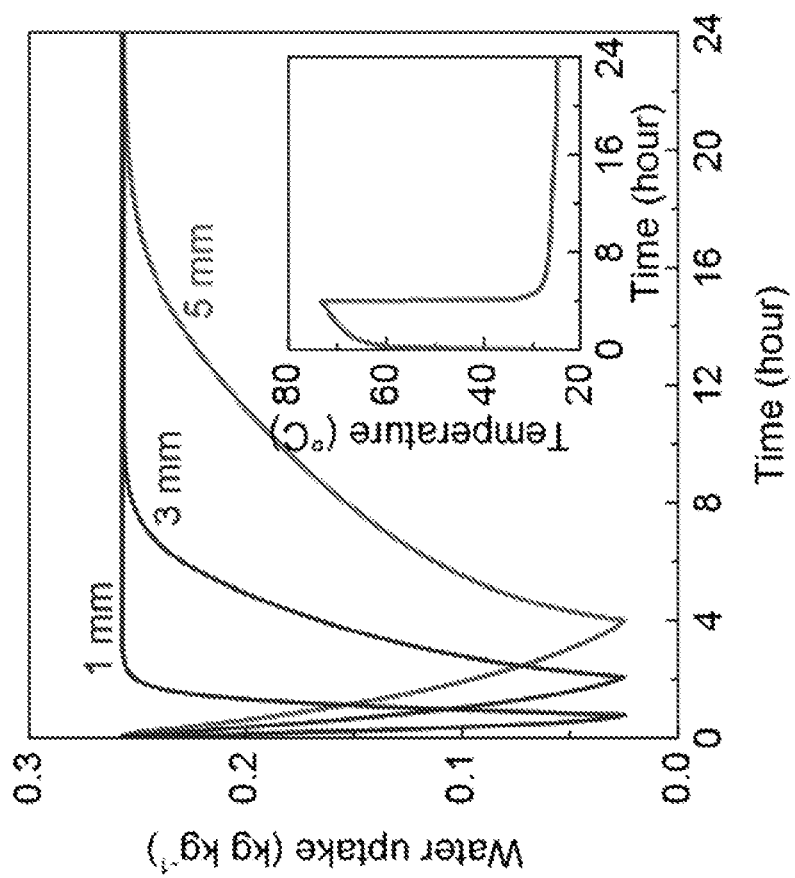
FIG. 22 shows adsorption-desorption dynamics of MOF-801 in ambient air at 30% RH.
Figures 23A, 23B:
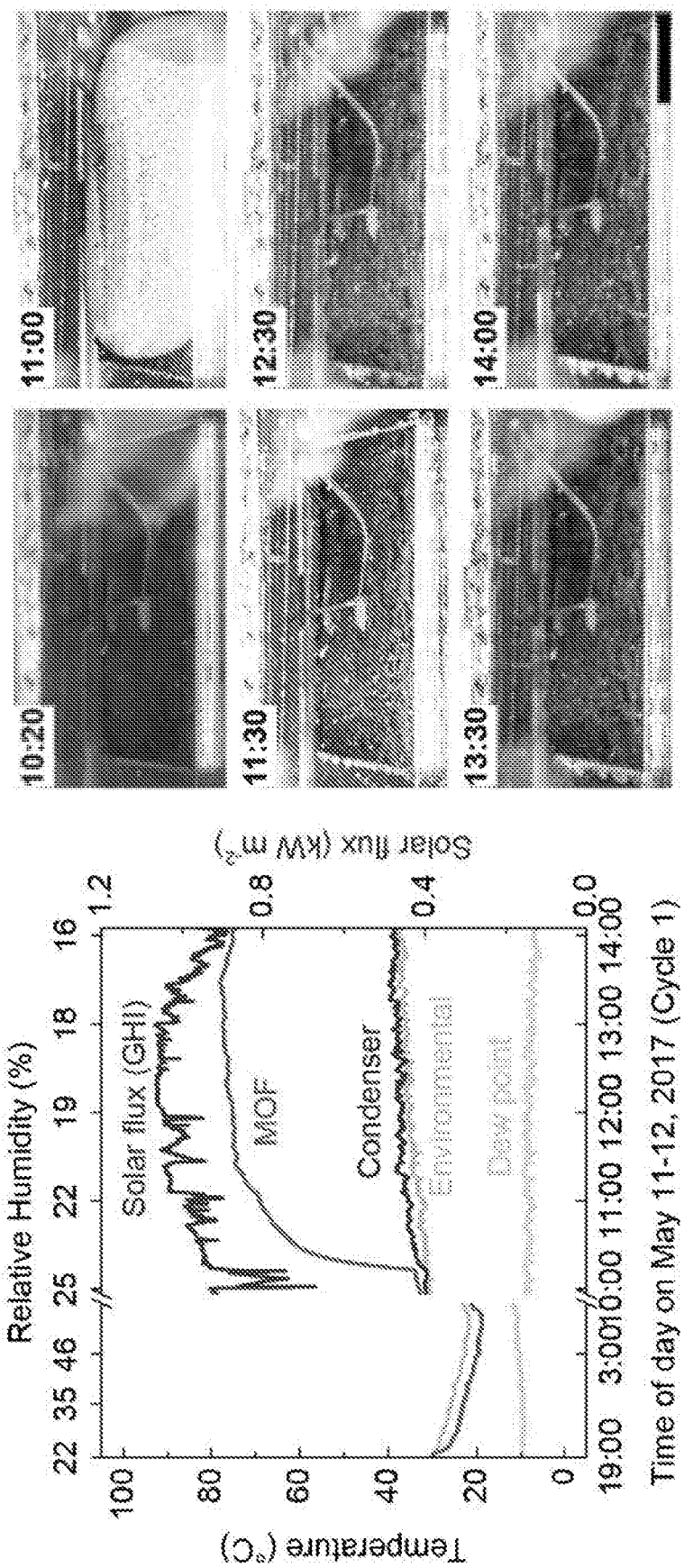
FIG. 23A shows representative temperature profiles (environmental, MOF layer, dew point, and condenser) and solar flux (global horizontal irradiance (GHI)) as a function of local time for the cycle 1.
FIG. 23B shows representative photos illustrating droplet condensation on the copper condenser (4 cm by 4 cm) during desorption process as a function of local time for the cycle 1.
Figures 23C, 23D:
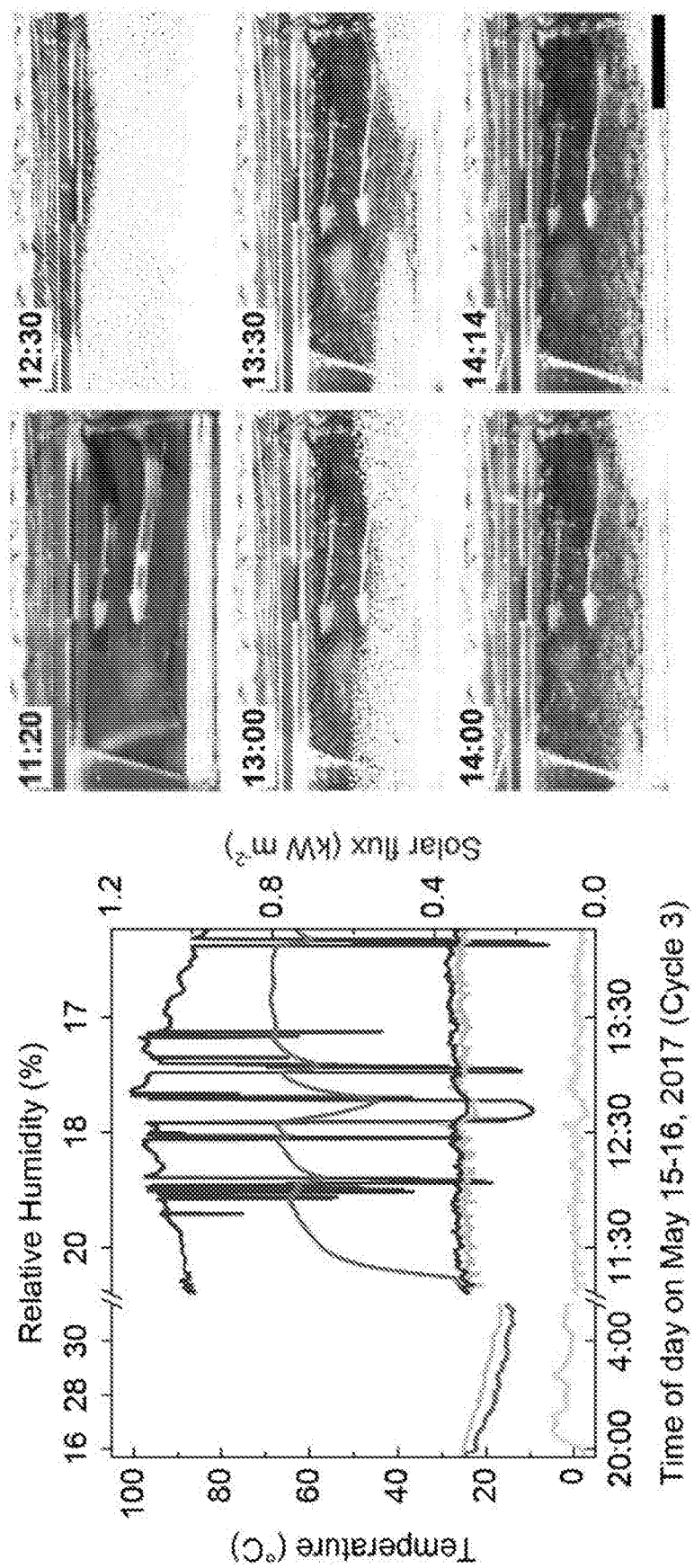
FIGS. 23C-23F represent temperature profiles, solar flux (GHI for cycle 3 and direct normal irradiance (DNI) for cycle 4), and representative photos of droplet condensation for cycle number 3 and 4, respectively.
Figure 23F:
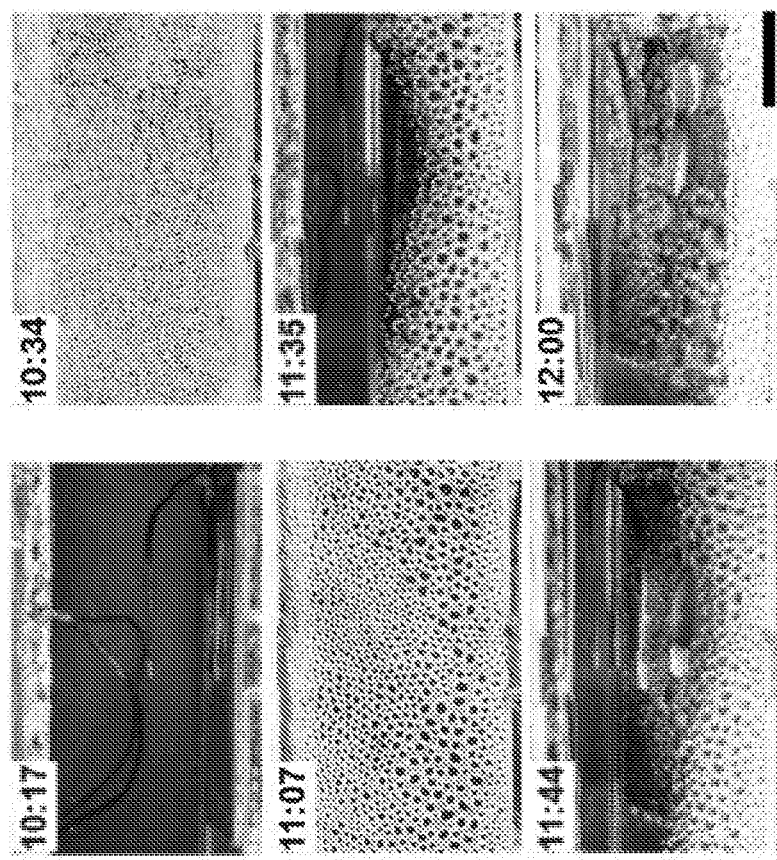
Figure 23E:
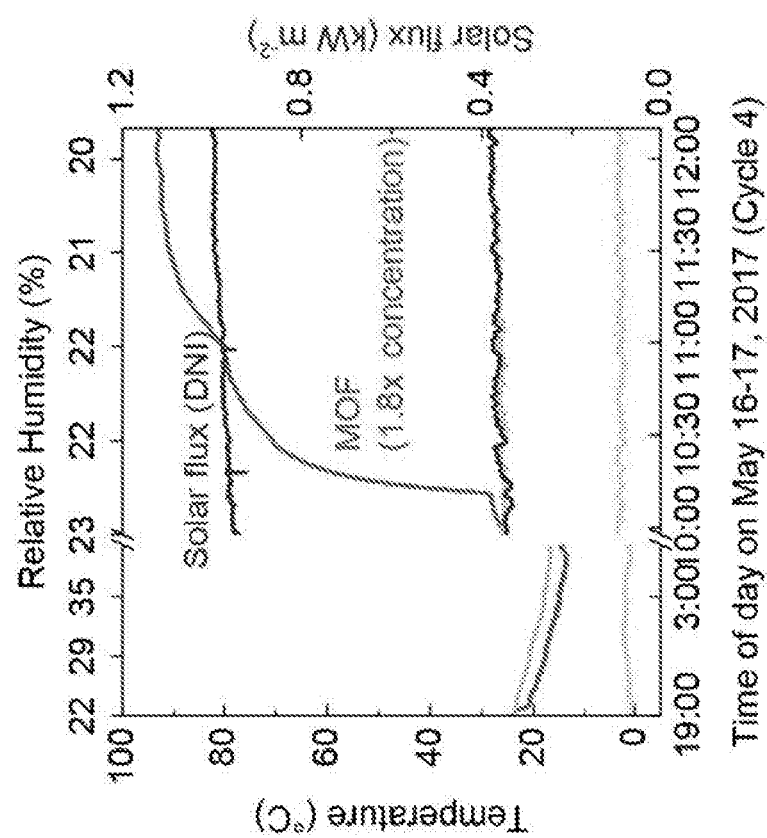

To enable sufficient vapor diffusion kinetics along with reasonably high water production, findings from the previous study suggests that the optimum packing porosity for the MOF-801 based water harvesting device is ~0.7. See H. Kim, S. Yang, S. R. Rao, S. Narayanan, E. A. Kapustin, H. Furukawa, A. S. Umans, O. M. Yaghi and E. N. Wang, Science, 2017, 356, 430-434, which is incorporated by reference in its entirety. Using the theoretical framework presented and characterized properties, adsorption-desorption dynamics for MOF-801 were simulated, as shown in FIG. 22, and used as a guideline for selecting the optimum MOF layer thickness.

S9. Water Harvesting Cycles: Experiments and Predictions

Using the theoretical framework outlined and characterized properties, computational simulations were carried out using COMSOL Multiphysics to evaluate the extent of regeneration during the solar-assisted water harvesting (FIGS. 24 and 25). Temperature (MOF layer, environmental, dew point, and condenser) and solar flux profiles, and photos of condensed droplets of the water harvesting (adsorption-desorption) cycles for the cycle numbers 1, 3, and 4 are shown in FIG. 23 (scale bars are 1 cm). Note that cycles 1 to 3 were carried out under global horizontal irradiance (GHI), and cycles 4 and 5 were carried out with 1.8× optical concentration with direct normal irradiance (DNI). For the cycle 4 and 5, due to buoyancy-assisted condensation with tilting of the stage, the regeneration was significantly faster than the predictions as evident in the change in temperature slope shown in FIG. 25 after ~45 minutes of desorption.

The thermal efficiency of the water harvesting cycle is defined as $$\eta_{thermal} = \frac{m_{water} h_{fg}}{Q_{solar}} \quad (S24)$$

where $m_{water}$, $h_{fg}$, and $Q_{solar}$ are predicted amount of harvested water, latent heat, and input solar energy, respectively. For the non-concentrated cycle number 2, $\eta_{thermal}$ is predicted to be ~3% (with GHI) and for the concentrated cycle number 5, $\eta_{thermal}$ is predicted to be ~14% (with GNI times optical concentration of 1.8×). The efficiency for the concentrated cycle was evaluated on the basis of the time at which a change in the slope of the MOF temperature was observed. Despite the near complete desorption, at the time of the slope change, the simulation predicts ~0.1 kg kg.sup.-1 of residual uptake (FIG. 25). This is due to fact that the simulation does not take into account the enhanced vapor transport due to buoyancy. Furthermore, the enhanced rate of desorption driven by the enhanced vapor transport (lower interface vapor pressure) is evident from the lower MOF layer temperature observed in comparison to the simulations. This can also be qualitatively deduced from the significantly greater amount of water condensation on the viewport compared to the non-concentrated cycles.

S10. Water Quality Analysis

In order to quantitatively characterize the harvested water, a bench-top adsorption cycling system was constructed. A schematic of the water collection apparatus for ICP-MS analysis is shown in FIG. 26A. The system consists of five main components, namely, adsorption and condenser chambers, a glass flask which serves as a reservoir for HPLC water (OmniSolv HPLC grade water, VWR), two temperature controlled thermoelectric stages (CP-200HT-TT, TE Tech), and a vacuum pump. The adsorption and condenser chamber were custom designed copper vacuum chambers (2 cm×2 cm×1 cm) with a removable lid. The adsorption chamber additionally had a layer of copper foam (2 cm×2 cm×0.8 cm) brazed to the bottom, which was infiltrated with activated MOF-801 (~1.5 g). These chambers were individually placed in thermal contact with a temperature controlled thermoelectric stage which allowed for continuous cycling. Thermocouples (5TC series, Omega Engineering) were inserted into pilot holes made in the side walls of the copper chambers. For cycling, a pair of electronically controlled vacuum valves were used to link the adsorbent chamber to either the water reservoir during adsorption or the condenser chamber during desorption.

Figure 26B:
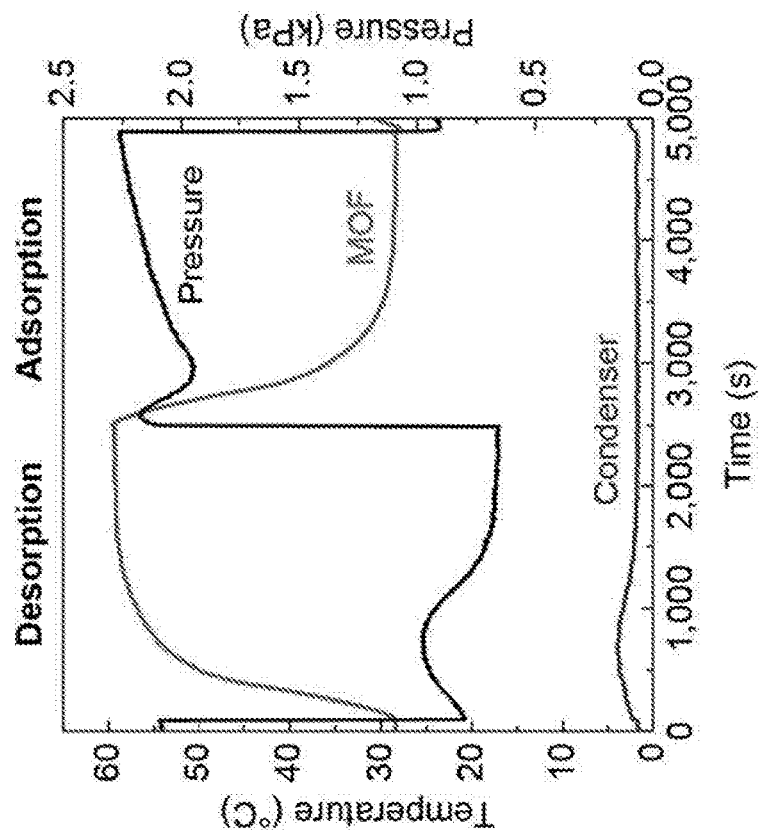
FIG. 26B shows representative temperature (MOF chamber and condenser chamber) and pressure profile (MOF chamber) for a desorption-adsorption cycle as a function of time.
Figure 26A:
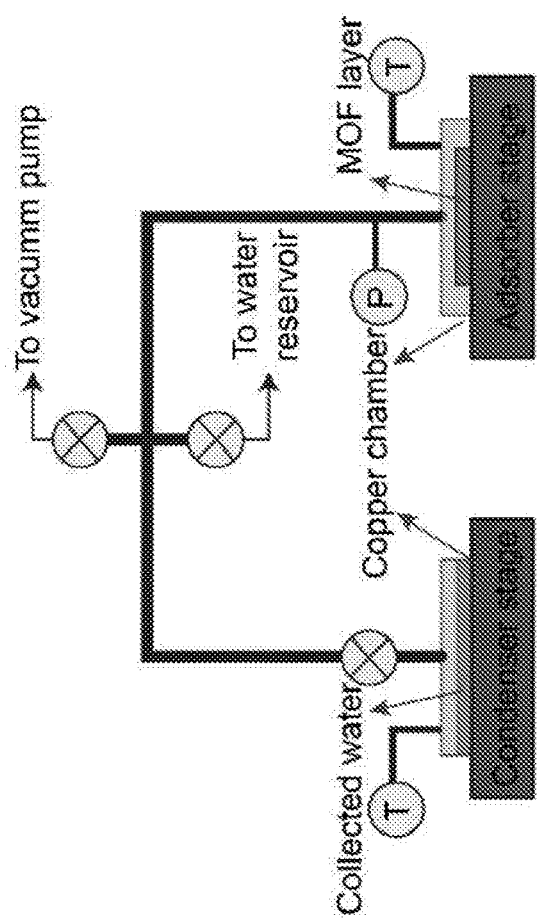
FIG. 26A shows schematic of water collection apparatus with MOF-801 layer.

The adsorption-desorption cycles were performed under evacuated conditions to enable efficient transport of vapor across distances of ~0.5 m through the hoses and valves as shown in FIG. 26. The water in the glass flask was first degassed to remove non-condensable gases by connecting it to the vacuum pump and freezing the water. The flask was then heated to melt the ice under evacuation and reduce the solubility of non-condensable gasses. This cycle was repeated three times. The adsorption and condenser chambers were heated to 60° C. for 2 hours under evacuated conditions to ensure there was no residual water in the system. The cycling experiments started with the adsorption phase, where the water reservoir was exposed to the adsorbent chamber. The dry adsorbent triggers evaporation and generated vapor was adsorbed. During adsorption, the chamber was held at a constant temperature of 30° C. to extract the adsorption heat as well as prevent any condensation of vapor from the reservoir kept at ~20° C. After complete adsorption (~40 minutes), the adsorption chamber was isolated from the water reservoir and exposed to the condenser chamber. The thermoelectric stage of the adsorption chamber was programmed to ramp up to 60° C. at this stage while the condenser stage was always maintained at 0.5° C. The desorption was allowed to continue for 40 minutes at the end of which the adsorption chamber was opened to the reservoir and simultaneously cooled to 30° C. for the next cycle. Representative temperature and pressure profiles for a desorption-adsorption cycle are shown in FIG. 26B. This cycle was repeated 18 times and about 8 g of condensed water was collected (i.e., ~0.3 L of water per kg of MOF per cycle).

The HPLC grade water from the reservoir was used as a control sample. The concentration of potentially contaminant elements was analyzed using an inductively coupled plasma-mass spectroscopy system (ICP-MS, Agilent 7900, 68403 A). Both the harvested water and control sample were analyzed for the following elements: iron (from tubes/hoses), copper (from foam, chambers, and braze), silver, indium (both from braze), and zirconium (from MOF compound). Results shown in FIG. 27 indicate that zirconium concentration in both the collected and control water was found to be indistinguishable and less than 1 ppb (part per billion), indicating that the metal ions (Zr) from MOF-801 did not leach the harvested water. The largest difference in composition was found in concentrations of iron and copper (which are both absent in MOF-801 compound) due to oxidation reactions occurring during the cycling experiments. While the concentration of iron (~3 ppb) in the harvested water was negligible, the concentration of copper (~2.6 ppm) can be eliminated through material choices. Copper was chosen in this study for its high thermal conductivity and ease of machinability (i.e., milling and fabrication of chambers), which enabled an isothermal condenser. In a practical system, the use of galvanized steel is envisioned as a candidate material for the condenser and thermal binder. In addition, FT-IR spectra (FIG. 28) of control water (HPLC grade) and collected water from MOF-801 were collected in-house using a Bruker ALPHA Platinum ATR-FT-IR Spectrometer equipped with a single reflection diamond ATR module. The FT-IR spectra indicated that signature of organic linkers (fumaric acid) was absent.

S11. Thermal Analysis for Passive Operation

Our proposed approach can harvest water solely based on solar-thermal energy without any additional input of electrical energy (i.e., in a passive manner) for remote/arid climates. In this section, thermal analysis shows that complete passive solar-thermal operation is realistic without any additional input of energy. See Kim, S. Yang, S. R. Rao, S. Narayanan, E. A. Kapustin, H. Furukawa, A. S. Umans, O. M. Yaghi and E. N. Wang, Science, 2017, 356, 430-434, which is incorporated by reference in its entirety.

First, night-time adsorption and the processing of air can be managed through the natural flow of air encountered in open areas (wind). For instance, for the representative conditions for the experiments (30% RH and 25° C.) during night-time adsorption, the water content in air is approximately 0.006 kg of water per kg of air. Assuming the MOF layer is freely exposed to the natural flow of air at a calm wind speed of 0.3 m/s flowing onto the layer, the incident vapor flux at this condition is 0.003 kg m$^{-2}$ s$^{-1}$ (or 10.8 kg m$^{-2}$ hour$^{-1}$). For the optimized MOF layer porosity (0.67) and thickness (~3 mm) from FIG. 22, the amount of MOF-801 is ~1.4 kg per m$^2$. The average flux of vapor adsorption shown in FIG. 22 is ~2E-5 kg m$^{-2}$ s$^{-1}$. The approximately two orders of magnitude difference between the incident vapor and the vapor adsorption flux confirms that the natural flow of air is sufficient to ensure complete night-time adsorption.

During day-time operation, the dissipation of heat from the condenser to the ambient can also be managed by passive means of buoyant convection and the natural flow of air. Though, it is a common practice to assume ambient temperature condensers for thermodynamic analysis, a simple analysis is shown to indicate that passive operation is possible. It starts by developing an energy balance during the steady-state operation which can be expressed as $$Q_{dissipation} Q_{condensation} Q_{gain} \quad (S25)$$

Where $Q_{dissipation}$ is the rate of heat dissipation from a finned heat sink to the ambient, $Q_{condensation}$ is the rate of heat released during the condensation of water, and $Q_{gain}$ is the rate of heat addition from the MOF layer to the condenser. Eqn (S25) can be expressed as $$h_{dissipation} A_{heat\ sink}(T_{condenser} - T_{ambient}) = m_{water} h_{gain} A_{condenser}(T_{MOF} - T_{condenser}) \quad (S26)$$

In Eqn (S26), h, A, and T are the heat transfer coefficient in W m$^{-2}$ K$^{-1}$, heat transfer area in m$^2$, and temperature, respectively. $m_{water}$ is the rate of condensation. Here, an equal area of the MOF layer and condenser is assumed. In order to estimate the required heat transfer coefficient ($h_{dissipation}$) to enable passive operation, a reasonable area ratio ($A_{heatsink}/A_{condenser}$) of 20 (see A. Bar-Cohen, M. Iyengar and S. Benjaafar, International Journal of Transport Phenomena, 2002, 4, 43-58, which is incorporated by reference in its entirety), is assumed and a temperature difference of 5 K between the condenser and the ambient $m_{water}$ is estimated based on complete desorption in 1 hour (~1E-4 kg m$^{-2}$ s$^{-1}$ or ~0.36 L m.sup.-2 hour.sup.-1). Based on the experimentally measured temperatures shown in FIG. 15B, for $T_{MOF}$=100° C., $T_{ambient}$=35° C., and $h_{gain}$=10 W m$^{-2}$ K$^{-1}$, $T_{condenser}$ can be maintained at 40° C. with an $h_{dissipation}$ of only ~10 W m$^{-2}$ K$^{-1}$. This confirms that passive operation is achievable with buoyant convection and the naturally occurring flow of air.

Other embodiments are within the scope of the following claims.

The invention claimed is:

1. A water-harvesting system comprising:
   (i) a water vapor adsorbent layer; and
   (ii) a water condenser adjacent to the adsorbent layer,
   wherein the adsorbent layer comprises a porous metal-organic framework material infiltrated in a porous binder, and the metal-organic framework has a packing porosity of between 0.5 and 0.9.

2. The water-harvester system of claim 1, wherein the binder comprises a copper foam.

3. The water-harvester system of claim 1, wherein the binder comprises a carbon-based foam.

4. The water-harvesting system of claim 1, wherein the system further comprises a coating on the adsorbent layer, wherein the coating is optically transparent and thermally insulating.

5. The water-harvesting system of claim 1, wherein the system further comprises a coating on the adsorbent layer, wherein the coating is optically transparent and thermally insulating, wherein the coating comprises an aerogel.

6. The water-harvesting system of claim 1, wherein the system further comprises a coating on the adsorbent layer, wherein the coating is absorptive for solar irradiation.

7. The water-harvesting system of claim 1, wherein the system further comprises a coating on the adsorbent layer, wherein the coating is absorptive for solar irradiation, wherein the coating comprises a graphite or a solar absorbing paint.

8. The water-harvesting system of claim 1, wherein the metal-organic framework comprises zirconium (Zr).

9. The water-harvesting system of claim 1, wherein the metal-organic framework comprises MOF-801 ($Zr_6O_4(OH)_4(fumarate)_6$).

10. The water-harvesting system of claim 1, wherein the metal-organic framework comprises cobalt (Co).

11. The water-harvesting system of claim 1, wherein the metal-organic framework comprises $Co_2Cl_2BTDD$, wherein BTDD is bis(1H-1,2,3-triazolo[4,5-b],[4',5'-i])dibenzo[1,4]dioxin).

12. The water-harvesting system of claim 1, wherein the system is powered solely by solar irradiance, waste or biomass.

13. A method of water-harvesting comprising:
   (a) adsorbing water from ambient atmosphere using a water-harvesting system of claim 1;
   (b) applying energy to the water-harvesting system to desorb vapor; and
   (c) collecting water with the condenser.

14. A method of water-harvesting comprising:
   (a) adsorbing water from ambient atmosphere using a water-harvesting system comprising an adsorbent layer and a condenser adjacent to the adsorbent layer;
   (b) applying energy to the water-harvesting system to desorb vapor; and
   (c) collecting water with the condenser,
   wherein the adsorbent layer comprises a porous metal-organic framework material infiltrated in a porous binder, and the ambient atmosphere has a relative humidity of less than 30%.

15. The water-harvesting method of claim 14, wherein the binder comprises a copper foam.

16. The water-harvesting method of claim 14, wherein the binder comprises a carbon-based foam.

17. The water-harvesting method of claim 14, wherein the system further comprises a coating on the adsorbent layer, wherein the coating is optically transparent and thermally insulating.

18. The water-harvesting method of claim 14, wherein the system further comprises a coating on the adsorbent layer, wherein the coating is absorptive for solar irradiation.

19. The water-harvesting method of claim 14, wherein the metal-organic framework comprises:
   (a) zirconium (Zr);
   (b) MOF-801 ($Zr_6O_4(OH)_4(fumarate)_6$);
   (c) cobalt (Co); or
   (d) $Co_2Cl_2BTDD$, wherein BTDD is bis(1H-1,2,3-triazolo [4,5-b], [4',5'-i])dibenzo [1,4]dioxin).

20. The water-harvesting method of claim 14, wherein the system is powered solely by solar irradiance, waste or biomass.

* * * * *